US012460260B2

(12) United States Patent
Newman et al.

(10) Patent No.: US 12,460,260 B2
(45) Date of Patent: Nov. 4, 2025

(54) METHODS UTILIZING SINGLE CELL GENETIC DATA FOR CELL POPULATION ANALYSIS AND APPLICATIONS THEREOF

(71) Applicant: The Board of Trustees of the Leland Stanford Junior University, Stanford, CA (US)

(72) Inventors: Aaron M. Newman, San Mateo, CA (US); Gunsagar S. Gulati, Roxbury, MA (US); Michael F. Clarke, Menlo Park, CA (US); Shaheen Shabbir Sikandar, Mountain View, CA (US)

(73) Assignee: The Board of Trustees of Leland Stanford Junior University, Stanford, CA (US)

( * ) Notice: Subject to any disclaimer, the term of this patent is extended or adjusted under 35 U.S.C. 154(b) by 682 days.

(21) Appl. No.: 16/883,915

(22) Filed: May 26, 2020

(65) Prior Publication Data

US 2020/0370112 A1    Nov. 26, 2020

Related U.S. Application Data

(60) Provisional application No. 62/852,231, filed on May 23, 2019.

(51) Int. Cl.
*C12Q 1/6869* (2018.01)
*C12N 5/00* (2006.01)
*C12N 15/113* (2010.01)
*C12Q 1/6883* (2018.01)

(52) U.S. Cl.
CPC ......... *C12Q 1/6869* (2013.01); *C12N 5/0068* (2013.01); *C12N 15/113* (2013.01); *C12Q 1/6883* (2013.01); *C12N 2506/30* (2013.01)

(58) Field of Classification Search
None
See application file for complete search history.

(56) References Cited

U.S. PATENT DOCUMENTS

2017/0270241 A1    9/2017    Garry et al.

FOREIGN PATENT DOCUMENTS

WO    2008013492 A1    1/2008

OTHER PUBLICATIONS

Lafzi et al. Tutorial: guidelines for the experimental design of single-cell RNA sequencing studies. Nature Protocols 2018, vol. 13, pp. 2742-2757 (Year: 2018).*
Buenrostro et al. Integrated Single-Cell Analysis Maps the Continuous Regulatory Landscape of Human Hematopoietic Differentiation. Cell 2018, 173, pp. 1535-1548 and STAR Methods, pp. e1-e5 (Year: 2018).*
Hwang et al. Single-cell RNA sequencing technologies and bioinformatics pipelines. Experimental & Molecular Medicine 2018, 50: 96, pp. 1-14 (Year: 2018).*

(Continued)

*Primary Examiner* — Karlheinz R. Skowronek
*Assistant Examiner* — Noah A. Auger
(74) *Attorney, Agent, or Firm* — KPPB LLP

(57) ABSTRACT

Processes to infer stemness, cell lineage, and/or differentiation status are provided. In some instances, single cell RNA sequencing is used to infer a cell's stemness, cell lineage, and/or differentiation status. In some instances, a collection of cells is ordered based on each cell's differentiation status.

18 Claims, 62 Drawing Sheets

(56) References Cited

OTHER PUBLICATIONS

Aljanahi et al. An Introduction to the Analysis of Single-Cell RNA-Sequencing Data. Molecular Therapy: Methods and Clinical Development 2018, vol. 10, pp. 189-196 (Year: 2018).*
Corces et al. Lineage-specific and single-cell chromatin acessibility charts human hematopoiesis and leukemia evolution. Nature Genetics 2016, vol. 48, No. 10, pp. 1193-1203 and Online Methods (Year: 2016).*
Kim et al. Application of single-cell RNA sequencing in optimizing a combinatorial therpaeutic strategy in metastatic renal cell carcinoma. Genome Biology 2016, 17:80, pp. 1-17 (Year: 2016).*
Hou, Y., Song, L., Zhu, P., Zhang, B., Tao, Y., Xu, X., . . . & Wang, J. (2012). Single-cell exome sequencing and monoclonal evolution of a JAK2-negative myeloproliferative neoplasm. Cell, 148(5), 873-885. (Year: 2012).*
De Matos, L. L., Trufelli, D. C., De Matos, M. G. L., & da Silva Pinhal, M. A. (2010). Immunohistochemistry as an important tool in biomarkers detection and clinical practice. Biomarker insights, 5, BMI-S2185. (Year: 2010).*
Xu, Y., Li, H. D., Pan, Y., Luo, F., & Wang, J. (Dec. 2018). BioRank: A similarity assessment method for single cell clustering. In 2018 IEEE International Conference on Bioinformatics and Biomedicine (BIBM) (pp. 157-162). IEEE. (Year: 2018).*
Van Dijk, D., Sharma, R., Nainys, J., Yim, K., Kathail, P., Carr, A. J., . . . & Pe'er, D. (2018). Recovering gene interactions from single-cell data using data diffusion. Cell, 174(3), 716-729. (Year: 2018).*
Crow, M., Paul, A., Ballouz, S., Huang, Z. J., & Gillis, J. (2018). Characterizing the replicability of cell types defined by single cell RNA-sequencing data using MetaNeighbor. Nature communications, 9(1), 884. (Year: 2018).*
Fiers, M. W., Minnoye, L., Aibar, S., Bravo González-Blas, C., Kalender Atak, Z., & Aerts, S. (2018). Mapping gene regulatory networks from single-cell omics data. Briefings in functional genomics, 17(4), 246-254. (Year: 2018).*
Trapnell, C., Cacchiarelli, D., Grimsby, J., Pokharel, P., Li, S., Morse, M., . . . & Rinn, J. L. (2014). The dynamics and regulators of cell fate decisions are revealed by pseudotemporal ordering of single cells. Nature biotechnology, 32(4), 381-386. (Year: 2014).*
Loh et al., "Mapping the Pairwise Choices Leading from Pluripotency to Human Bone, Heart, and Other Mesoderm Cell Types", Cell, vol. 166, No. 2, Jul. 14, 2016, pp. 451-467, http://dx.org/j.cell.2016.06.011.
Lun et al., "A step-by-step workflow for low-level analysis of single-cell RNA-seq data with Bioconductor", F1000 Research, vol. 5, No. 2122, Nov. 29, 2016, 64 pgs., First published: Aug. 31, 2016, 5:2122 (doi: 10.12688/f1000research.9501.1) Latest published: Oct. 31, 2016, 5:2122 (doi: 10.12688/f1000research.9501.2).
Macaulay et al., "Single-Cell RNA-Sequencing Reveals a Continuous Spectrum of Differentiation in Hematopoietic Cells", Cell Reports, vol. 14, Feb. 2, 2016, pp. 966-977, http://dx.doi.org/10.1016/j.celrep.2015.12.082.
Malta et al., "Machine Learning Identifies Stemness Features Associated with Oncogenic Dedifferentiation", Cell, vol. 173, No. 2, Apr. 5, 2018, pp. 338-354, https://doi.org/10.1016/j.cell.2018.03.034.
Muller et al., "Regulatory networks define phenotypic classes of human stem cell lines", Nature, vol. 455, No. 7211, Aug. 24, 2008, pp. 401-405, doi:10.1038/nature07213.
Nakamura et al., "A developmental coordinate of pluripotency among mice, monkeys and humans", Nature, vol. 537, Aug. 24, 2016, pp. 57-62 doi: 10.1038/nature 19096.
Olsson et al., "Single-cell analysis of mixed-lineage states leading to a binary cell fate choice", Nature, vol. 537, No. 7622, Sep. 29, 2016, pp. 698-702, doi: 10.1038/nature19348.
Packer et al., "A lineage-resolved molecular atlas of C. elegans embryogenesis at single-cell resolution", Science, vol. 365, No. 6459, eaax1971, Sep. 20, 2019, 8 pgs.
Pal et al., "Construction of Developmental Lineage Relationships in the Mouse Mammary Gland by Single-Cell RNA Profiling", Nature Communications, vol. 8, No. 1, Nov. 20, 2017, 14 pgs., DOI: 10.1038/s41467-007-01560-x.
Picelli et al., "Full-length RNA-seq from single cells using Smart-seq2", Nature Protocols, vol. 9, No. 1, Jan. 2, 2014, pp. 171-181, DOI: 10.1038/nprot.2014.006.
Plass et al., "Cell type atlas and lineage tree of a whole complex animal by single-cell transcriptomics", Science, vol. 360, No. 875, May 25, 2018, 11 pgs., DOI: 10.1126/science.aaq1723.
Qiu et al., "Deciphering Pancreatic Islet β Cell and α Cell Maturation Pathways and Characteristic Features at the Single-Cell Level", Cell Metabolism, vol. 25, No. 5, May 2, 2017, pp. 1194-1205, http://dx.doi.org/10.1016/j.cmet.2017.04.003.
Qiu et al., "Reversed Graph Embedding Resolves Complex Single-Cell Trajectories", Nature Methods, vol. 14, No. 10, Oct. 2017, 17 pgs., doi:10.1038/nmeth.4402.
Qiu et al., "Single-cell mRNA quantification and differential analysis with Census", Nature Methods, vol. 14, Jan. 23, 2017, 7 pgs., DOI:10.1038/NMETH.4150.
Raouf et al., "Transcriptome Analysis of the Normal Human Mammary Cell Commitment and Differentiation Process", Cell Stem Cell, vol. 3, No. 1, Jul. 3, 2008, pp. 109-118., DOI 10.1016/j.stem.2008.05.018.
Rodriguez-Fraticelli et al., "Clonal analysis of lineage fate in native haematopoiesis", Nature, vol. 553, Jan. 11, 2018, pp. 212-216, doi: 10.1038/nature25168.
Saelens et al., "A comparison of single-cell trajectory inference methods: towards more accurate and robust tools", bioRxiv, Retrieved from: www.biorxiv.org/content/10.1101/276907v1, Mar. 5, 2018, 49 pgs.
Satija et al., "Spatial reconstruction of single-cell gene expression data", Nature Biotechnology, vol. 33, No. 5, May 2015, pp. 495-502, doi:10.1038/nbt.3192.
Schlitzer et al., "Identification of cDC1- and cDC2-committed DC progenitors reveals early lineage priming at the common DC progenitor stage in the bone marrow", Nature Immunology, vol. 16, Jun. 8, 2015, 11 pgs., doi:10.1038/ni.3200.
Seita et al., "Hematopoietic Stem Cell: Self-Renewal Versus Differentiation", Wiley Interdisciplinary Reviews: Systems Biology and Medicine, vol. 2, No. 6, Nov./Dec. 2010, pp. 640-653 doi:10.1002/wsbm.86.
Shehata et al., "Phenotypic and functional characterisation of the luminal cell hierarchy of the mammary gland", Breast Cancer Research, vol. 14, No. R134, Oct. 22, 2012, pp. 1-19, http://breast-cancer-research.com/content/14/5/R134.
Shin et al., "Single-Cell RNA-Seq with Waterfall Reveals Molecular Cascades underlying Adult Neurogenesis", Cell Stem Cell, vol. 17, No. 3, Sep. 3, 2015, pp. 360-372, http://dx.doi.org/10.1016/j.stem.2015.07.013.
Street et al., "Slingshot: cell lineage and pseudotime inference for single-cell transcriptomics", BMC Genomics, vol. 19, No. 477, Jun. 19, 2018, pp. 1-16, https://doi.org/10.1186/s12864-018-4772-0.
Subramanian et al., "Gene set enrichment analysis: A knowledge-based approach for interpreting genome-wide expression profiles", PNAS, vol. 102, No. 43, Oct. 25, 2005, pp. 15545-15550, www.pnas.org-cgi-doi-10.1073/pnas.0506580102.
Sulston et al., "The Embryonic Cell Lineage of the Nematode Caenorhabditis elegans", Developmental Biology, vol. 100, No. 1, Nov. 1983, pp. 64-119.
Teschendorff et al., "Single-cell entropy for accurate estimation of differentiation potency from a cell's transcriptome", Nature Communications, vol. 8, No. 15599, Jun. 1, 2017, pp. 1-15, DOI: 10.1038/ncomms15599.
Trapnell et al., "The dynamics and regulators of cell fate decisions are revealed by pseudotemporal ordering of single cells", Nature Biotechnology, vol. 32, No. 4, Apr. 2014, pp. 381-386, doi: 10.1038/nbt.2859.
Treutlein et al., "Reconstructing lineage hierarchies of the distal lung epithelium using single cell RNA-seq", Nature, vol. 509, No. 7500, May 15, 2014, pp. 371-375, doi: 10.1038/nature13173.
Visvader et al., "Tissue-specific Designs of Stem Cell Hierarchies", Nature Cell Biology, Apr. 2016, vol. 18, No. 4, pp. 349-355, published online Mar. 21, 2016.

(56) References Cited

OTHER PUBLICATIONS

Wang et al., "Single-cell gene expression analysis reveals regulators of distinct cell subpopulations among developing human neurons", Genome Research, vol. 27, Nov. 2017, pp. 1783-1794, http://www.genome.org/cgi/doi/10.1101/gr.223313.117.

Wolf et al., "SCANPY: large-scale single-cell gene expression data analysis", Genome Biology, vol. 19, No. 15, Feb. 6, 2018, pp. 1-5, https://doi.org/11.1186/s13059-017-1382-0.

Wu et al., "Reconstructing Lineage Hierarchies of Mouse Uterus Epithelial Development Using Single-Cell Analysis", Stem Cell Reports, vol. 9, Jul. 11, 2017, pp. 381-396, http://dx.doi.org/10.1016/j.stemcr.2017.05.022.

Yan et al., "Single-cell RNA-Seq profiling of human preimplantation embryos and embryonic stem cells", Nature Structural & Molecular Biology, vol. 20, Aug. 11, 2013, pp. 1131-1139, doi: 10.1038/nsmb.2660.

Yang et al., "A Single-Cell Transcriptomic Analysis Reveals Precise Pathways and Regulatory Mechanisms Underlying Hepatoblast Differentiation", Hepatology, vol. 66, No. 5, Nov. 2017, pp. 1387-1401, DOI: 10.1002/hep.29353.

Yu et al., "clusterProfiler: an R Package for Comparing Biological Themes Among Gene Clusters", OMICS: A Journal of Integrative Biology, vol. 16, No. 5, May 2012, pp. 284-287, DOI: 10.1089/omi.2011.0118.

Yuzwa et al., "Developmental Emergence of Adult Neural Stem Cells as Revealed by Single-Cell Transcriptional Profiling", Cell Reports, vol. 21, Dec. 26, 2017, pp. 3970-3986, https://doi.org/10.1016/j.celrep.2017.12.017.

Zheng et al., "Massively parallel digital transcriptional profiling of single cells", Nature Communications, vol. 8, No. 14049, Jan. 16, 2017, pp. 1-12, DOI: 10.1038/ncomms14049.

Zhou et al., "Tracing haematopoietic stem cell formation at single-cell resolution", Nature, vol. 533, May 18, 2016, 6 pgs., doi:10.1038/nature17997.

Ziegenhain et al., "Comparative Analysis of Single-Cell RNA Sequencing Methods", Molecular Cell, vol. 65, No. 4, Feb. 16, 2017, pp. 631-643.e4, http://dx.doi.org/10.1016/j.molcel.2017.01.023.

Aughey et al., "CATaDa reveals global remodelling of chromatin accessibility during stem cell differentiation in vivo", eLIFE, vol. 7, No. e32341, Feb. 26, 2018, pp. 1-22, DOI: 10.7554/eLife.32341.

Bach et al., "Differentiation dynamics of mammary epithelial cells revealed by single-cell RNA sequencing", Nature Communications, vol. 8, No. 2128, Dec. 11, 2017, pp. 1-11, DOI:10.1038/s41467-017-020015.

Briggs et al., "Mouse embryonic stem cells can differentiate via multiple paths to the same state", eLife, vol. 6, No. e26945, Oct. 9, 2017, pp. 1-23, DOI: https://doi.org/10.7554/elife.26945.001.

Campbell et al., "Laplacian eigenmaps and principal curves for high resolution pseudotemporal ordering of single-cell RNA-seq profiles", bioRxiv.org, Retrieved from: https://biorxiv.org/content/10.1101/027219v1, Sep. 18, 2015, 8 pgs.

Cannoodt et al., "SCORPIUS improves trajectory inference and identifies novel modules in dendritic cell development", bioRxiv.org, Retrieved from: https://biorxiv.org/content/10.1101/079509v1.abstract, Oct. 6, 2016, 15 pgs.

Cao et al., "Comprehensive single-cell transcriptional profiling of a multicellular organism", Science, vol. 357, No. 6352, Aug. 18, 2017, pp. 661-667.

Cao et al., "The single-cell transcriptional landscape of mammalian organogenesis", Nature, vol. 566, Feb. 20, 2019, pp. 496-502, doi:10.1038/s41586-019-0969-x.

Chan et al., "Identification and Specification of the Mouse Skeletal Stem Cell", Cell, vol. 160, No. 1-2, Jan. 15, 2015, pp. 285-298, http://dx.doi.org/10.1016/j.cell.2014.12.002.

Chan et al., "Identification of the Human Skeletal Stem Cell", Cell, vol. 175, No. 1, Sep. 20, 2018, pp. 43-56, https://doi.org/10.1016/j.cell.2018.07.02.

Chen et al., "STREAM: Single-cell Trajectories Reconstruction, Exploration and Mapping of omics data", bioRxiv.org, Retrieved from: https://biorxiv.org/content/10.1101/302554v2.full, Apr. 18, 2018, 42 pgs. (presented in two parts).

Chu et al., "Single-cell RNA-seq reveals novel regulators of human embryonic stem cell differentiation to definitive endoderm", Genome Biology, vol. 17, No. 173, Aug. 17, 2016, pp. 1-20, DOI: 10.1186/s13059-016-1033-x.

Deng et al., "Single-Cell RNA-Seq Reveals Dyanimc, Random Monoallelic Gene Expression in Mammalian Cells", Science, vol. 343, Jan. 10, 2014, pp. 193-196.

Du et al., "'LungGENS': a web-based tool for mapping single-cell gene expression in the developing lung", Thorax, vol. 70, Oct. 14, 2015, pp. 1092-1094, doi: 10.1136/thoraxjnl-2015-207035doi:10.1136/thoraxjnl-2015-207035.

Farrell et al., "Single-cell reconstruction of developmental trajectories during zebrafish embryogenesis", Science, vol. 360, No. 6392, eaar3131, Jun. 1, 2018, 8 pgs., DOI: 10.1126/science.aar3131.

Gorkin et al., "The 3D Genome in Transcriptional Regulation and Pluripotency", Cell Stem Cell, vol. 14, No. 6, Jun. 5, 2014, pp. 762-775, http://dx.doi.org/10.1016/j.stem.2014.05.017.

Grun et al., "De Novo Prediction of Stem Cell Identity using Single-Cell Transcriptome Data", Cell Stem Cell, vol. 19, No. 2, Aug. 4, 2016, pp. 266-277, http://dx.doi.org/10.1016/j.stem.2016-05-010.

Grun et al., "Validation of noise models for single-cell transcriptomics", Nature Methods, vol. 11, No. 6, Jun. 2014, pp. 637-640, DOI:10.1038/NMETH.2930.

Guo et al., "SLICE: determining cell differentiation and lineage based on single cell entropy", Nucleic Acids Research, vol. 45, No. 7, e54, Apr. 20, 2017, pp. 1-14, doi: 10.1093/narlgkw1278.

Haber et al., "A single-cell survey of the small intestinal epithelium", Nature, vol. 551, No. 7680, Nov. 8, 2017, pp. 333-339, doi: 10.1038/nature24489.

Hayashi et al., "Single-cell full-length total RNA sequencing uncovers dynamics of recursive splicing and enhancer RNAs", Nature Communications, vol. 9, No. 619, Feb. 12, 2018, pp. 1-16, DOI: 10.1038/s41467-018-02866-0.

Heinaniemi et al., "Gene-pair expression signatures reveal lineage control", Nature Methods, vol. 10, Apr. 21, 2013, pp. 577-583, doi: 10.1038/nmeth.2445.

Hie et al., "Efficient integration of heterogeneous single-cell transcriptomes using Scanorama", Nature Biotechnology, vol. 37, May 6, 2019, pp. 685-691, doi:10.1038/s41587-019-0113-3.

Hochgerner et al., "Conserved properties of dentate gyrus neurogenesis across postnatal development revealed by single-cell RNA sequencing", Nature Neuroscience, vol. 21, Jan. 15, 2018, pp. 290-299, https://doi.org/10.1038s41593-017-0056-2.

Huang et al., "Bifurcation dynamics in lineage-commitment in bipotent progenitor cells", Developmental Biology, vol. 305, No. 2, May 15, 2007, pp. 695-713, https://doi.org/10.1016/j.ydbio.2007.02.036.

Jacomy et al., "ForceAtlas2, a Continuous Graph Layout Algorithm for Handy Network Visualization Designed for the Gephi Software", PLOS One, vol. 9, No. 6, Jun. 10, 2014, Retrieved from: ForceAtlas2, a Continuous Graph Layout.

Algorithm for Handy Network Visualization Designed for the Gephi Software, 12 pgs., https://doi.org/10.1371/journal.pone.0098679.

Jaitin et al., "Massively Parallel Single-Cell RNA-Seq for Marker-Free Decomposition of Tissues into Cell Types", Science, vol. 343, No. 6172, Feb. 14, 2014, pp. 776-779, DOI: 10.1126/science.1247651.

Ji et al., "TSCAN: Pseudo-time reconstruction and evaluation in single-cell RNA-seq analysis", Nucleic Acids Research, vol. 44, No. 13, e117, May 13, 2016, pp. 1-17, doi: 10.1093/narlgkw430.

Johnson et al., "Adjusting batch effects in microarray expression data using empirical Bayes methods", Biostatistics, Jan. 2007, vol. 8, No. 1, pp. 118-127, Advance Access publication Apr. 21, 2006.

Joost et al., "Single-Cell Transcriptomics Reveals that Differentiation and Spatial Signatures Shape Epidermal and Hair Follicle Heterogeneity", Cell Systems, vol. 3, No. 3, e229, Sep. 28, 2016, pp. 221-237, http://dx.doi.org/10.1016/j.cels.2016.08.101.

(56) References Cited

OTHER PUBLICATIONS

Kangwan et al., "Chemoquiescence for Ideal Cancer Treatment and Prevention: Where Are We Now?", Journal of Cancer Prevention, vol. 19, No. 2, Jun. 2014, pp. 89-96, http://dx.doi.org/10.15430/JCP.2014.19.2.89.

Kernfeld et al., "A Single-Cell Transcriptomic Atlas of Thymus Organogenesis Resolves Cell Types and Developmental Maturation", Immunity, vol. 48, Jun. 19, 2018, pp. 1258-1270, https://doi.org/10.1016/j.immuni.2018.04.015.

Kester et al., "Single-Cell Transcriptomics Meets Lineage Tracing", Cell Stem Cell, vol. 23, No. 2, Aug. 2, 2018, pp. 166-179, https://doi.org. 10.1016/j.stem.2018.04.

Kowalczyk et al., "Single-cell RNA-seq reveals changes in cell cycle and differentiation programs upon aging of hematopoietic stem cells", Genome Research, vol. 25, 2015, pp. 1860-1872, http://www.genome.org/cgi/doi/10.1101/gr.192237.115.

Kretzschmar et al., "Lineage Tracing", Cell, vol. 148, No. 1-2, Jan. 20, 2012, pp. 33-45, DOI: 10.1016/j.cell.2012.01.002.

La Manno et al., "RNA velocity of single cells", Nature, vol. 560, No. 7719, Aug. 8, 2018, pp. 494-498, doi:10.1038/s41586-018-0414-6.

Li et al., "Single-Cell RNA-Seq Analysis Maps Development of Human Germline Cells and Gonadal Niche Interactions", Cell Stem Cell, vol. 20, Jun. 1, 2017, pp. 858-873, http://dx.doi.org/10.101/j.stem.2017.03.007.

Liberzon et al., "Molecular Signatures Database (MSigDB) 3.0", Bioinformatics, vol. 27, No. 12, Jun. 15, 2011, Advance Access publication: May 5, 2011, pp. 1739-1740, doi: 10.1093/bioinformatics/btr260.

Liberzon et al., "The Molecular Signatures Database (MSigDB) Hallmark Gene Set Collection", Cell Systems, vol. 1, No. 6., Dec. 23, 2015, pp. 417-425, http://dx.doi.org/10.1015/j.cels.2015.12.004.

\* cited by examiner

Fig. 12B
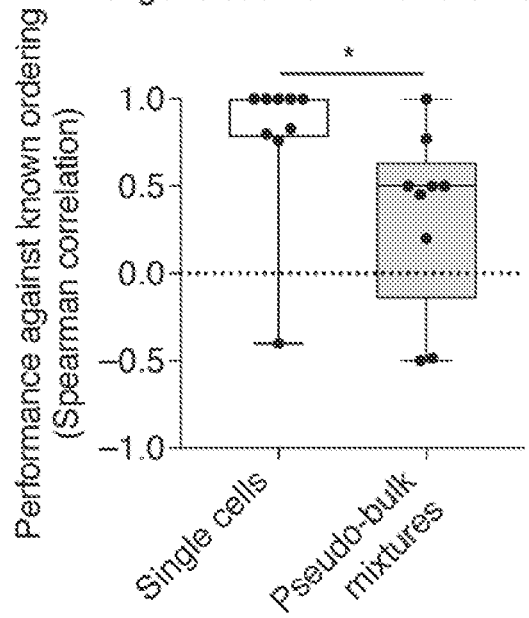
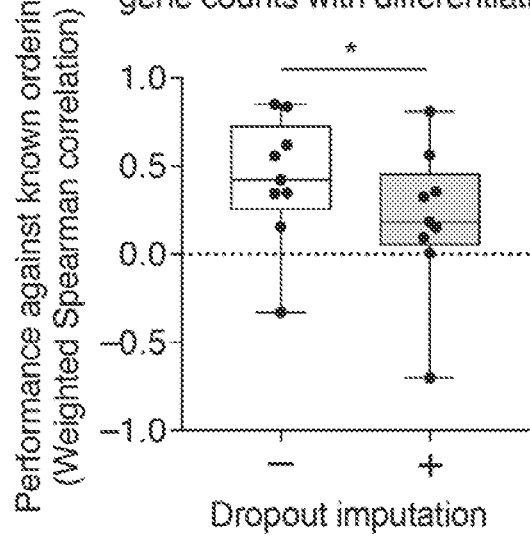

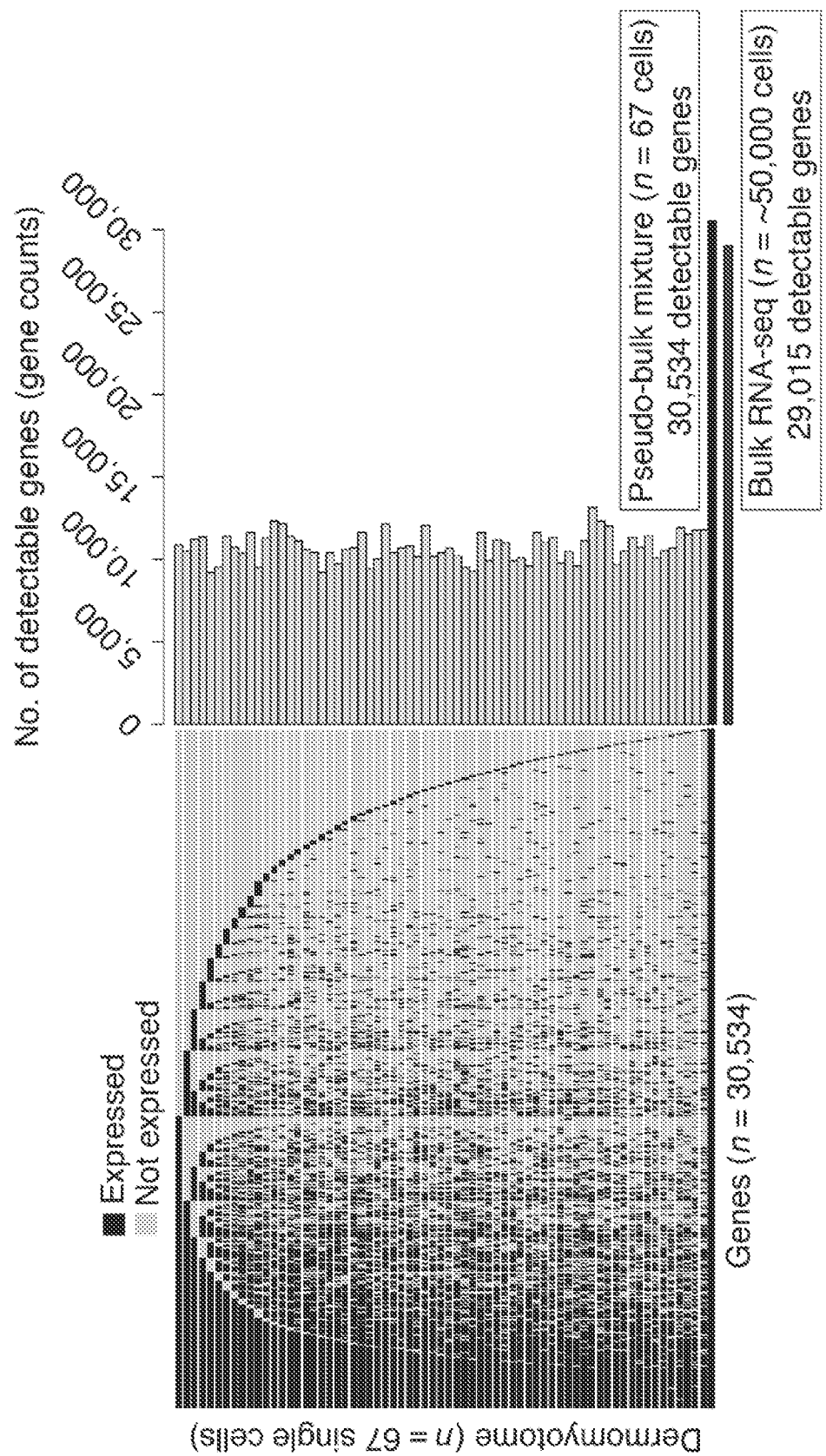

Fig. 13A
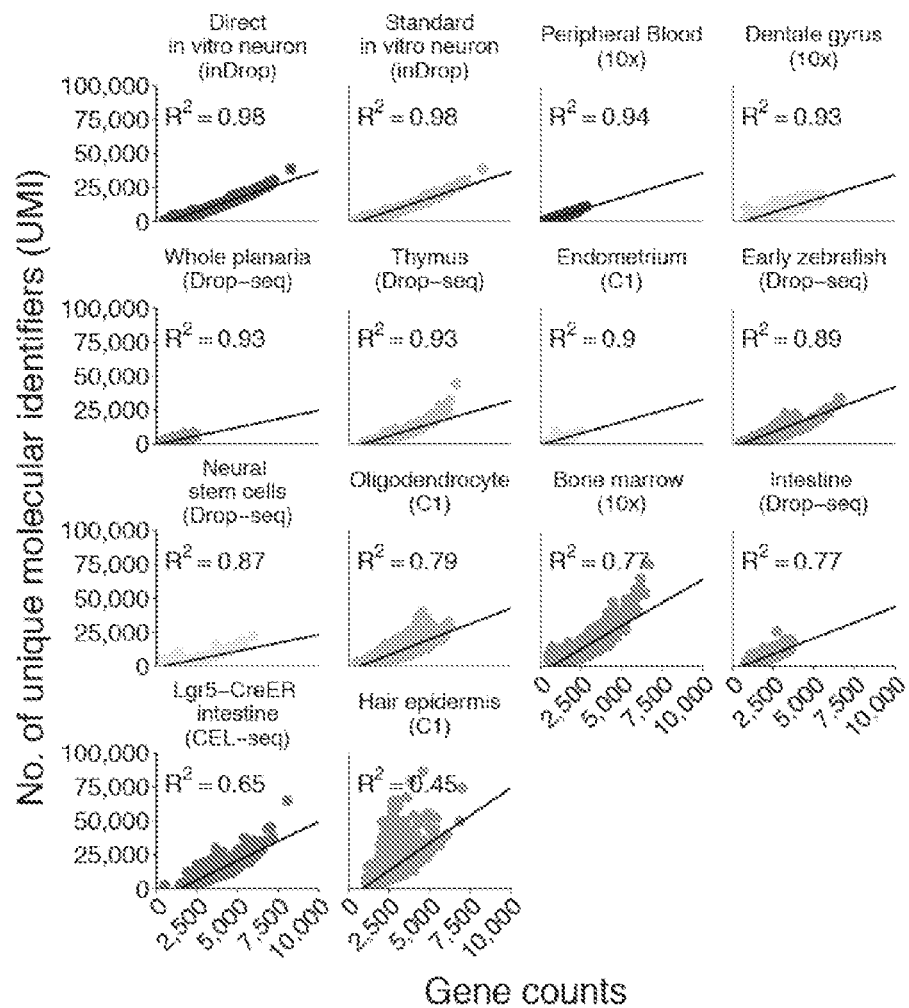
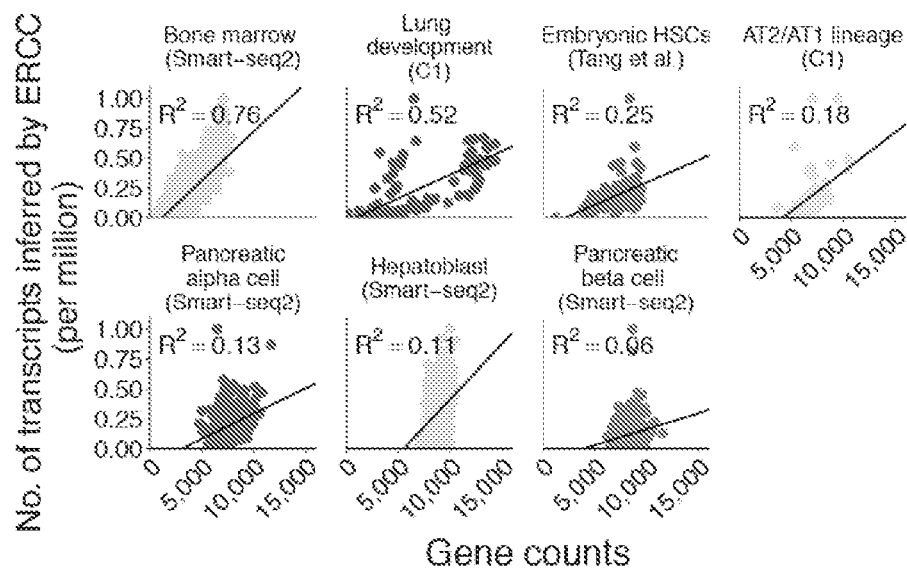

Fig. 14
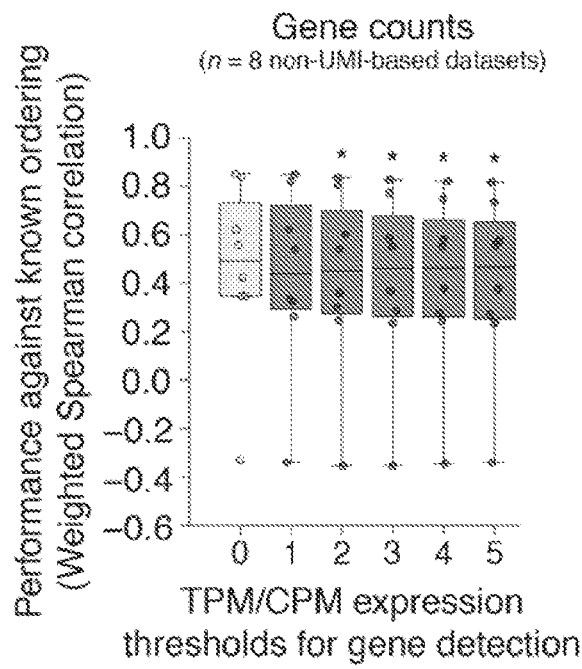
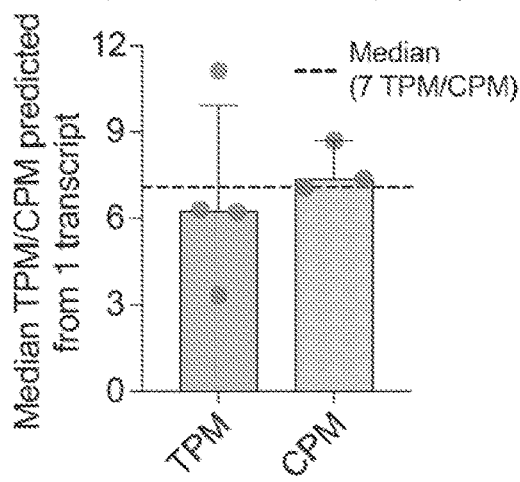
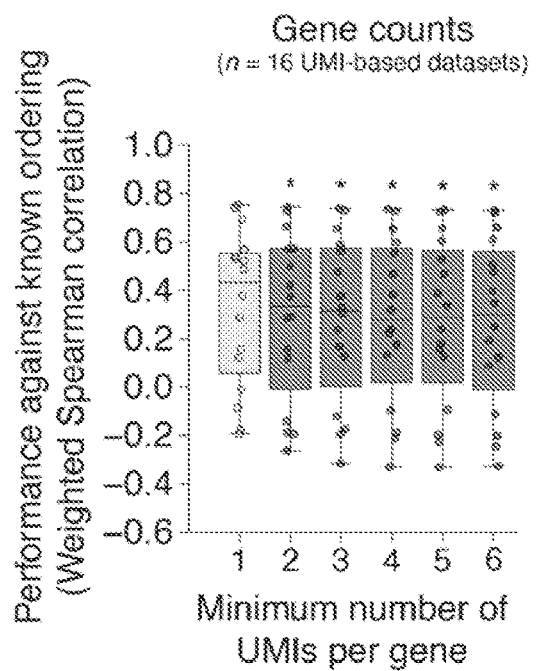
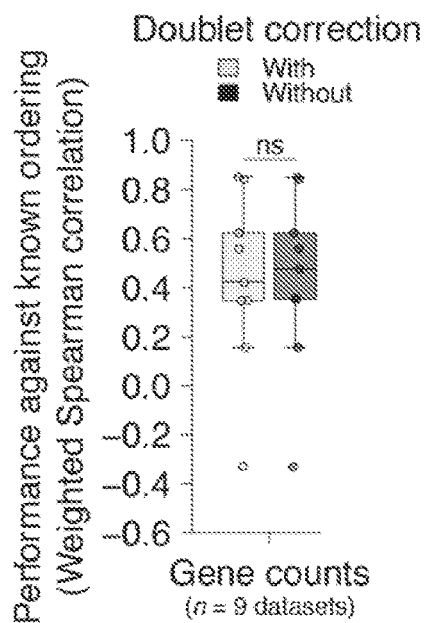

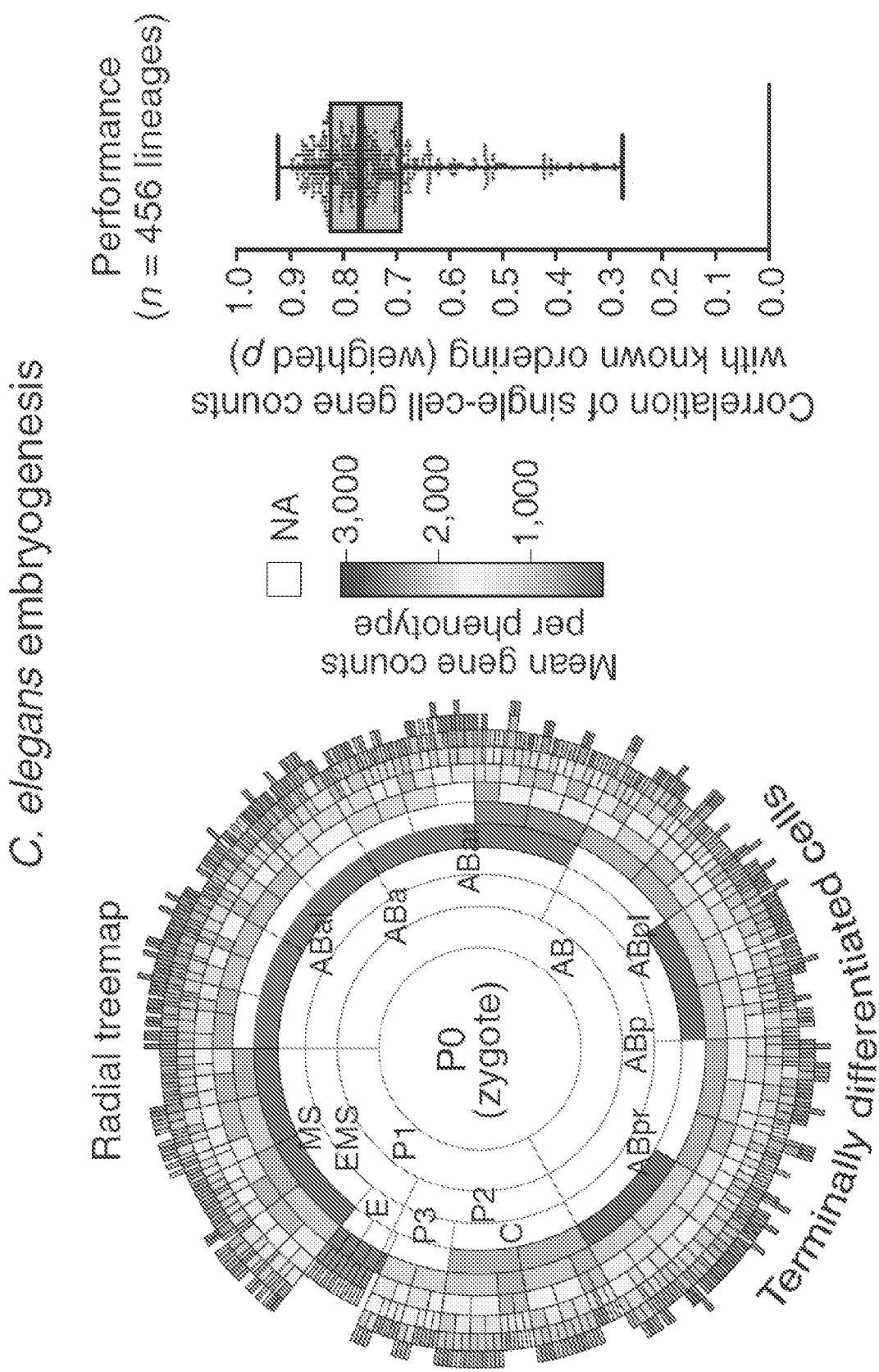

Fig. 18B
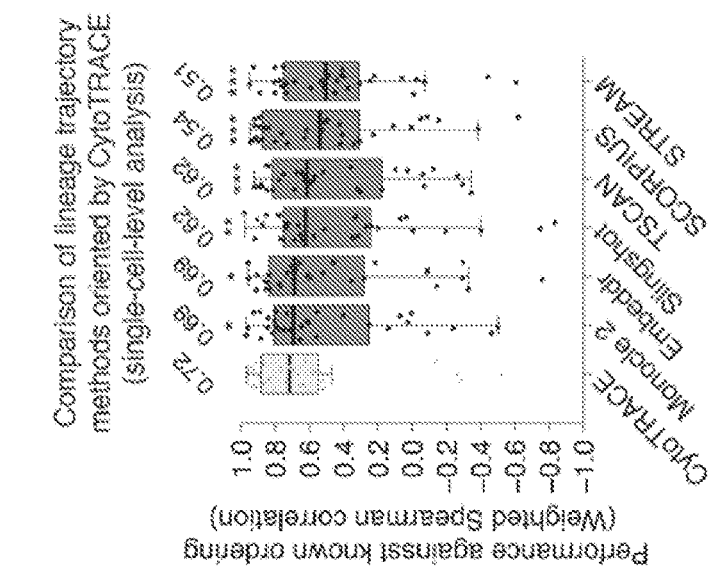
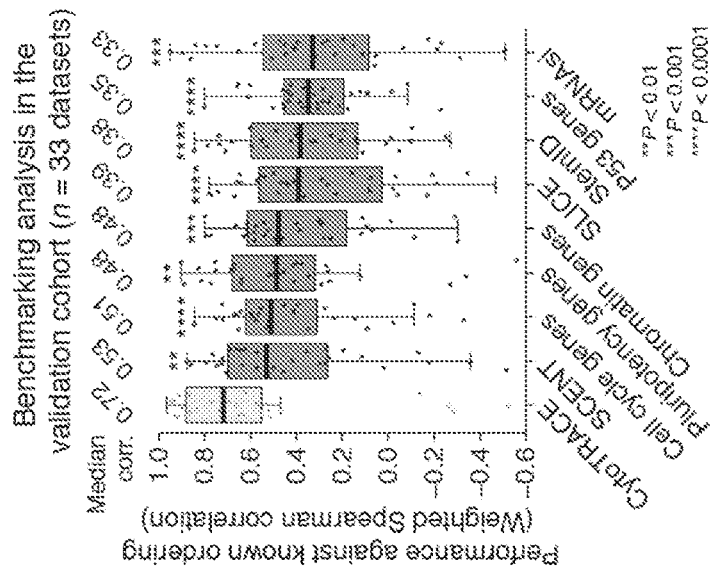
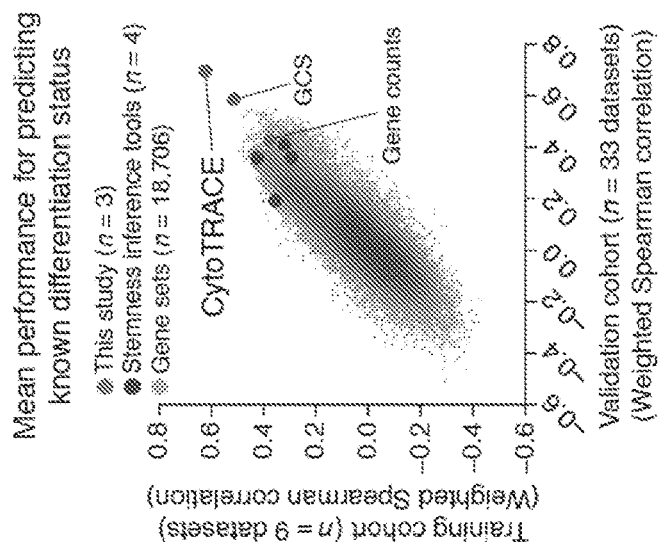

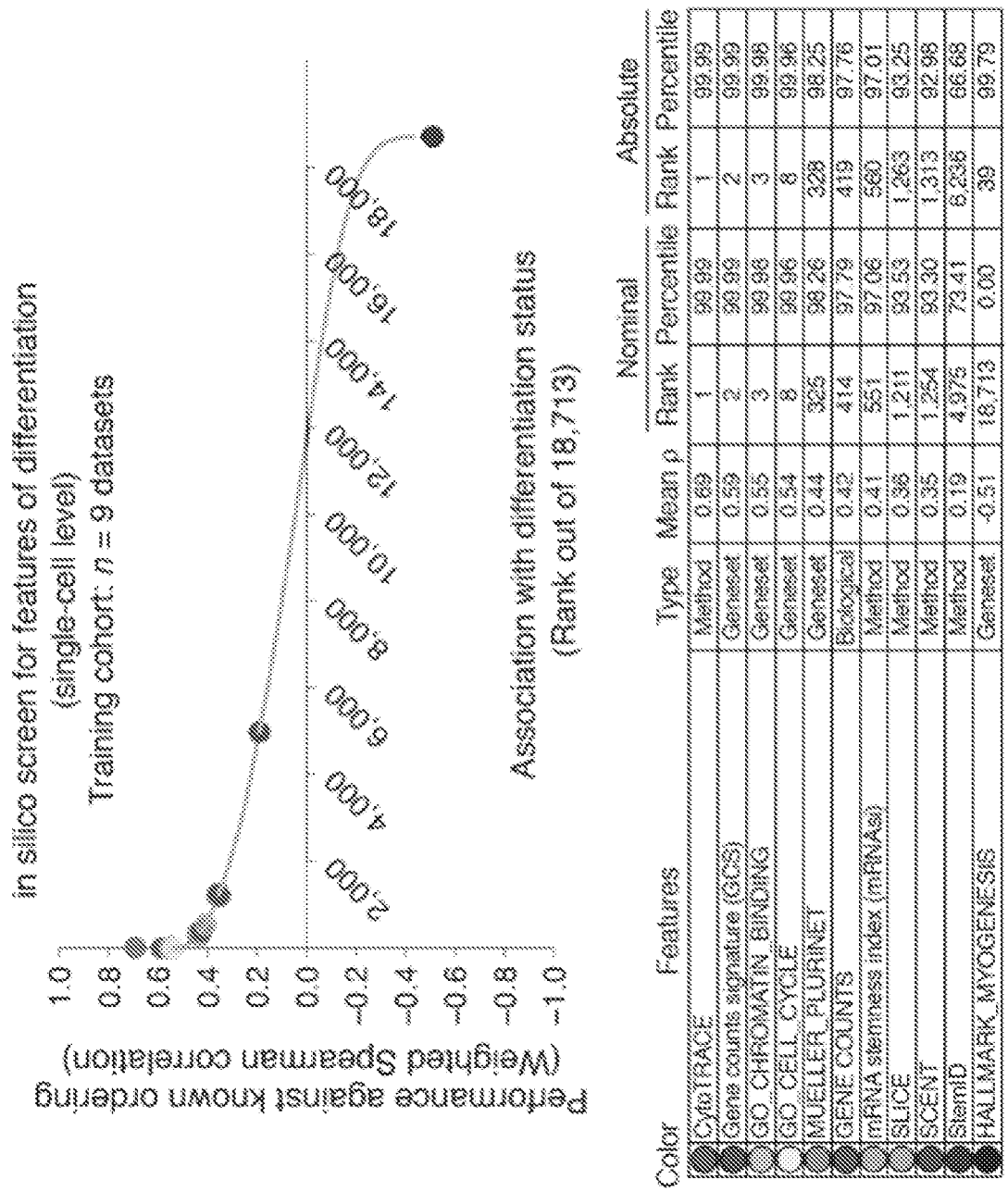

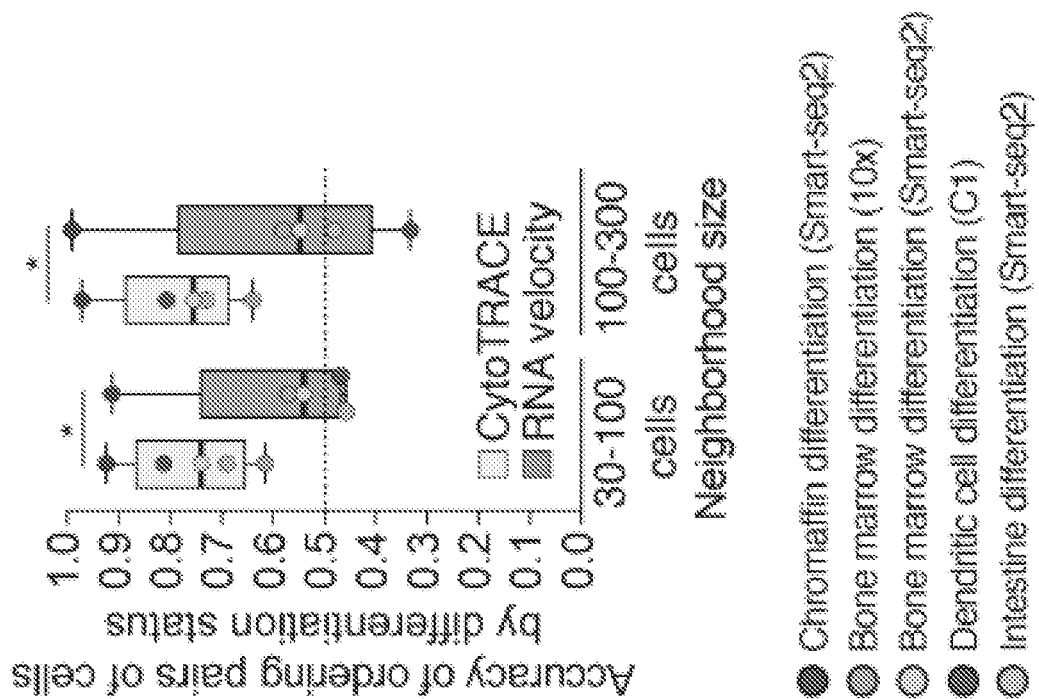
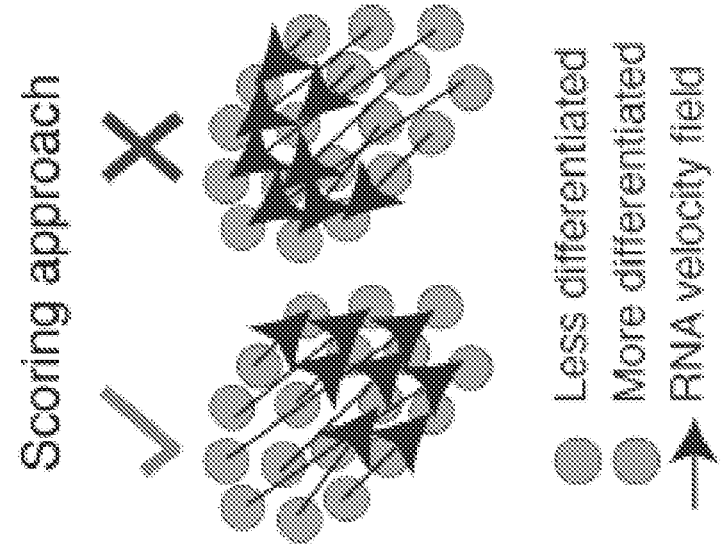

Fig. 25E
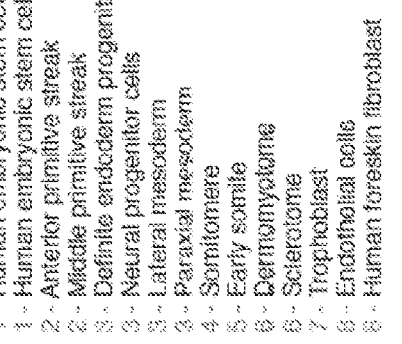
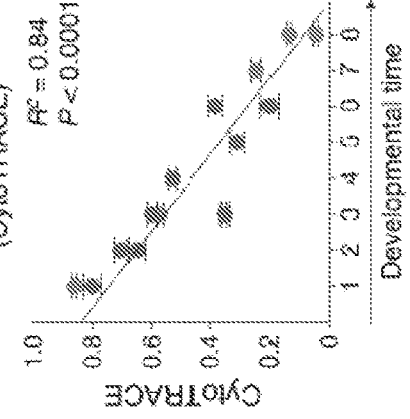
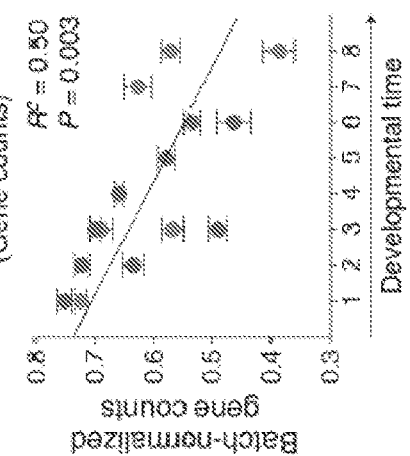
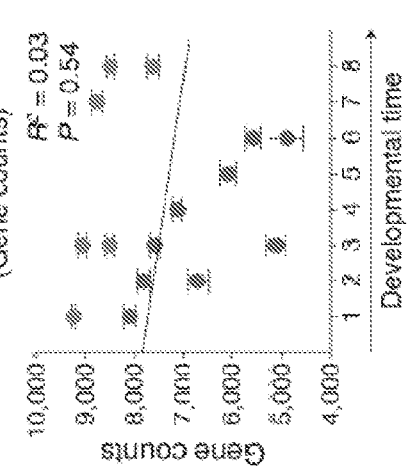

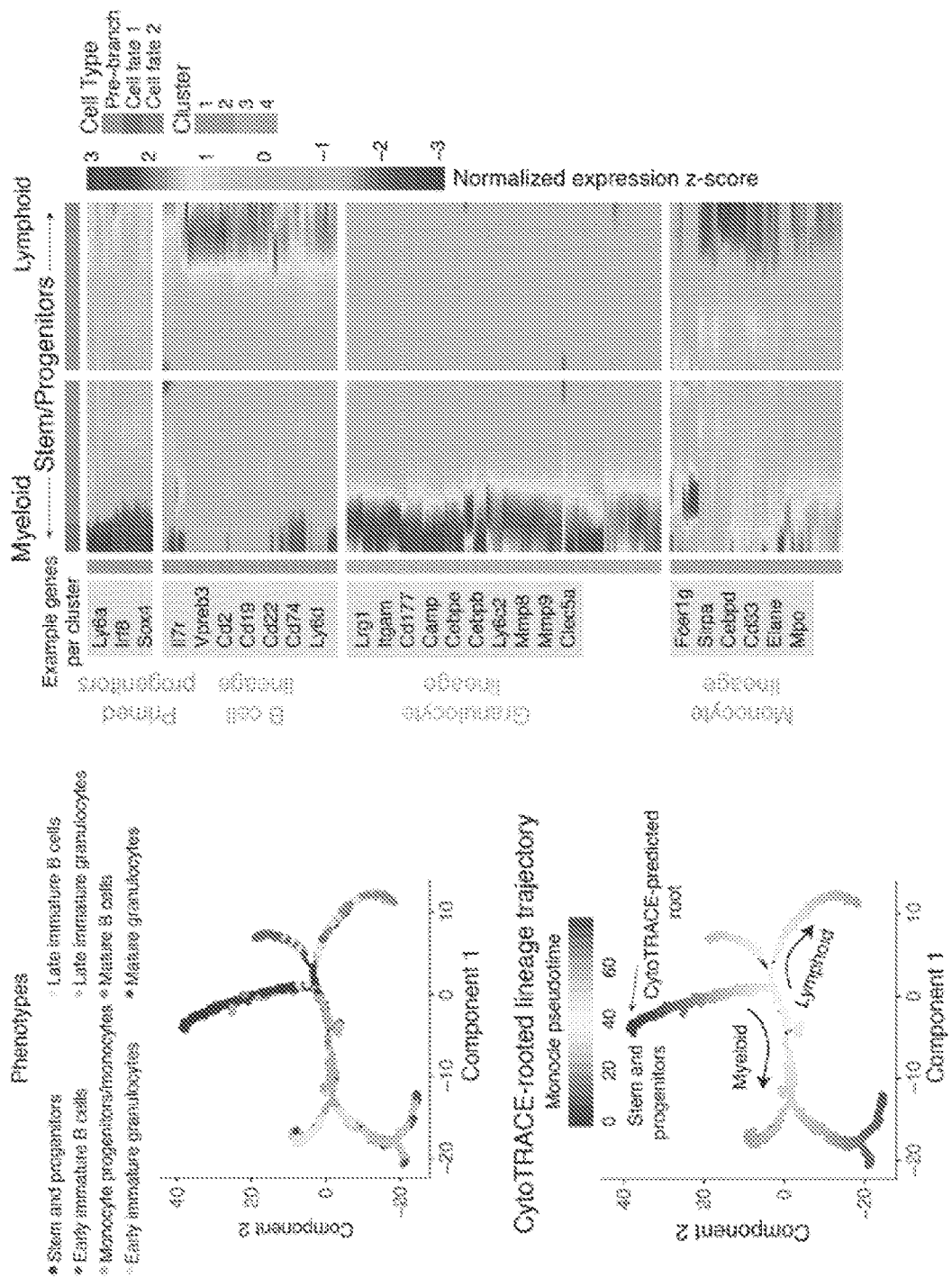
Fig. 31B Mouse bone marrow differentiation (Smart-seq2)

Fig. 33D
Normal human breast luminal progenitors
(n = 319 cells)
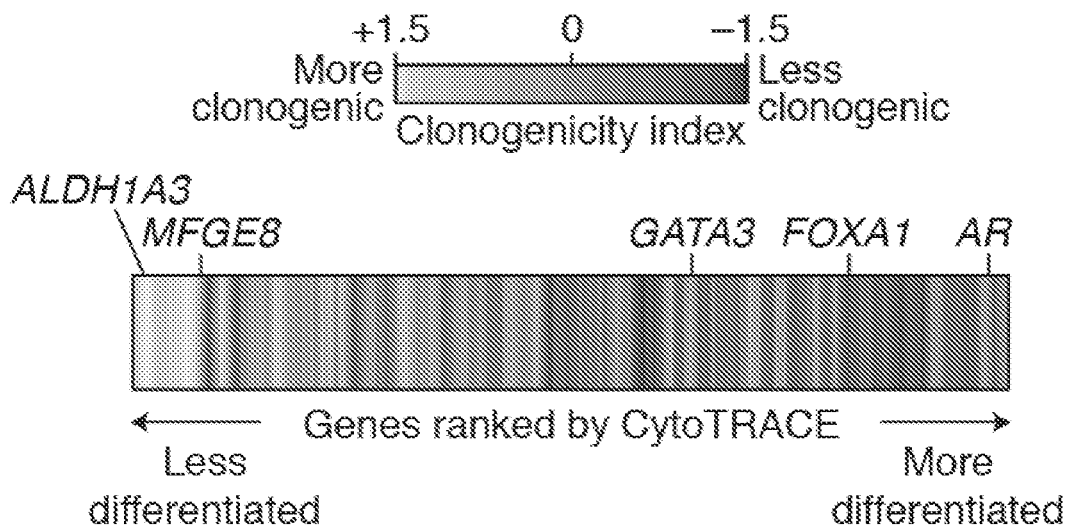
Malignant human breast luminal progenitors
(n = 213 cells)
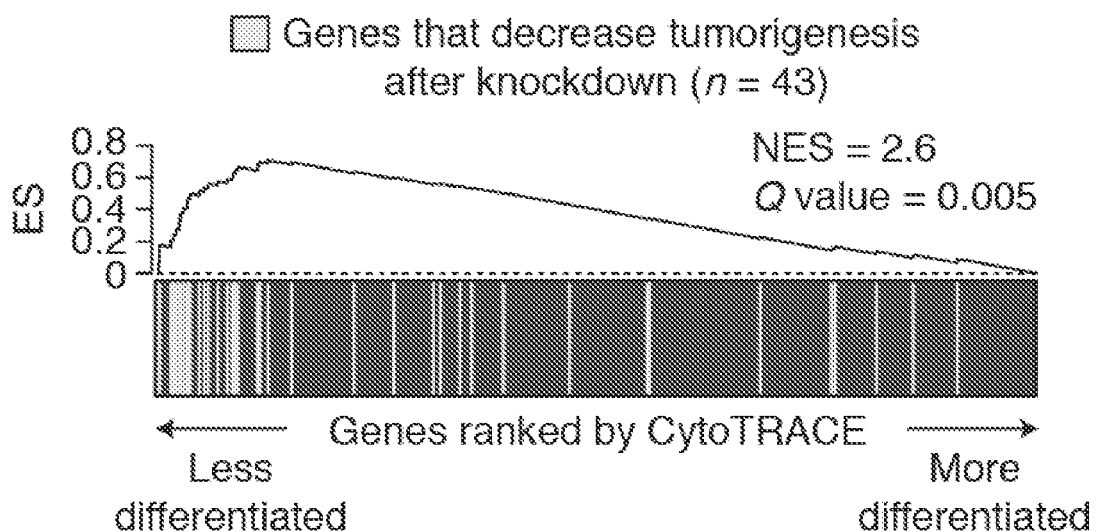

Fig. 33E

Malignant human breast luminal progenitors
n = 213 cells

Genes ordered by Pearson correlation
with CytoTRACE (n = 14,903 genes)

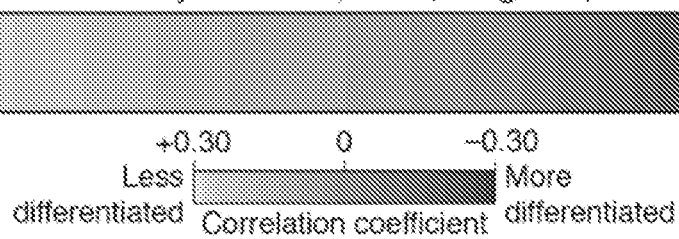

+0.30　　　0　　　−0.30
Less ┃━━━━━━━━━━┃ More
differentiated　Correlation coefficient　differentiated ☐ Genes that decrease tumorigenesis after knockdown (n =

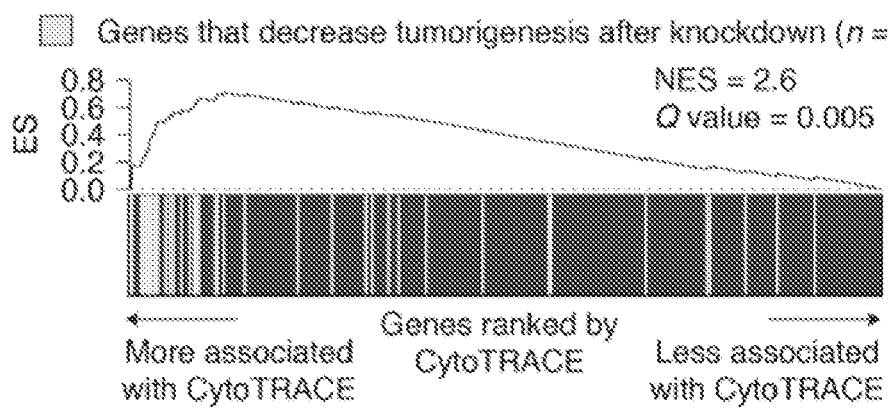

NES = 2.6
Q value = 0.005

← More associated　Genes ranked by　Less associated →
with CytoTRACE　　CytoTRACE　　with CytoTRACE ☐ Genes that do not decrease tumorigenesis after knockdown (

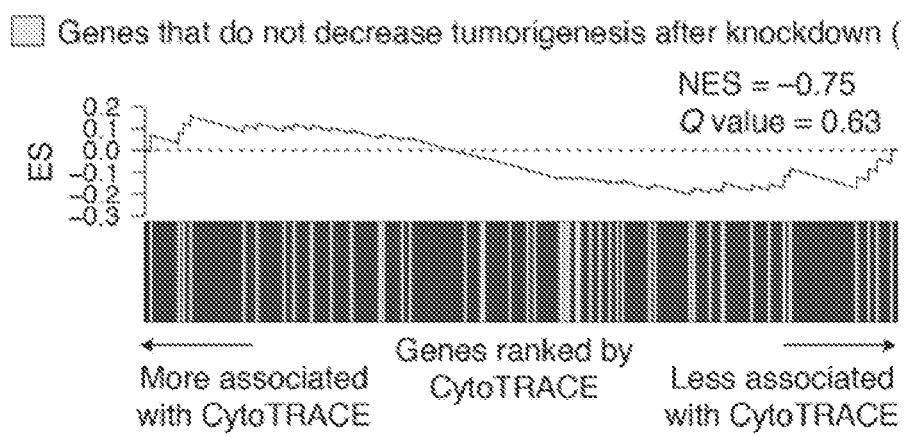

NES = −0.75
Q value = 0.63

← More associated　Genes ranked by　Less associated →
with CytoTRACE　　CytoTRACE　　with CytoTRACE

Fig. 39A
*C. elegans* hypodermis and seam (10x)
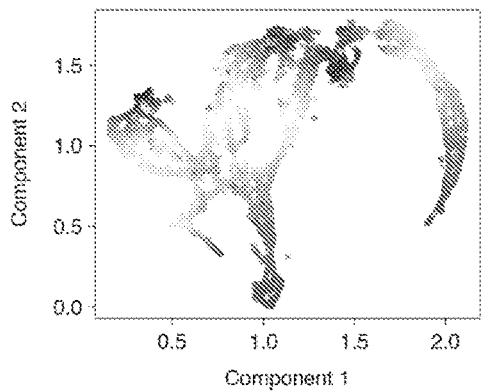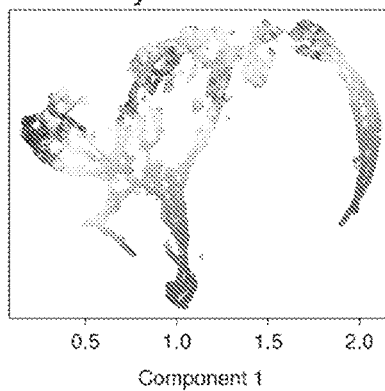
Fig. 39B
*C. elegans* muscle and mesoderm (10x)
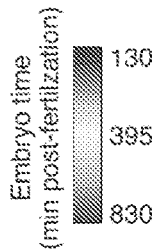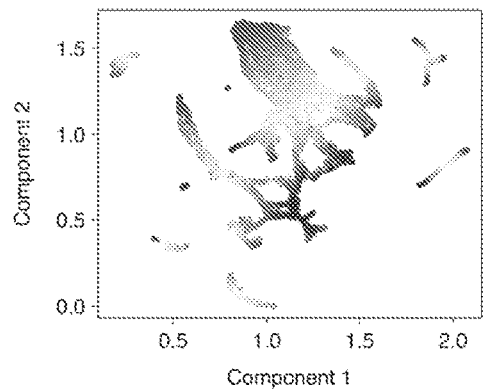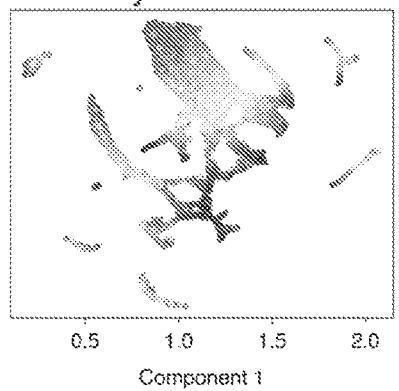
Fig. 39C
*C. elegans* ciliated neurons (10x)
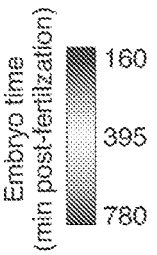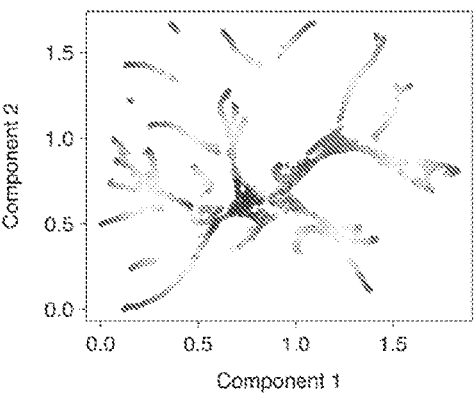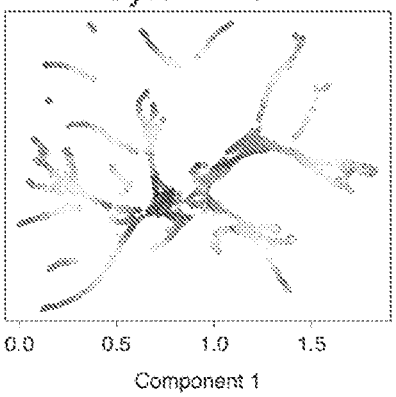

Fig. 39D
C. elegans duct and pore (10x)
Phenotypes | Ground truth | CytoTRACE
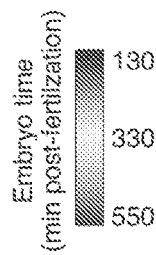
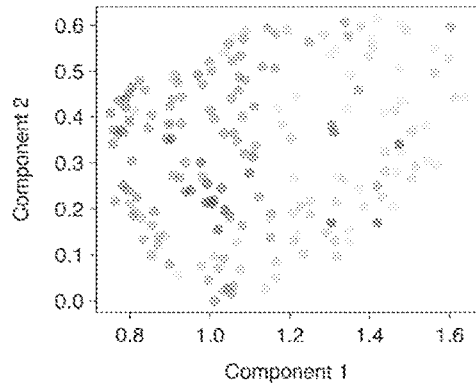
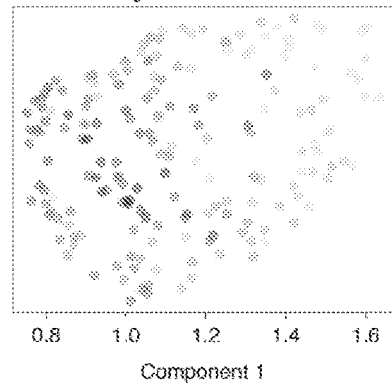
Fig. 39E
Early zebrafish (Drop-seq)
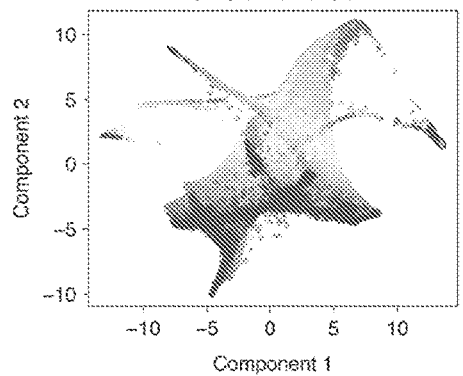
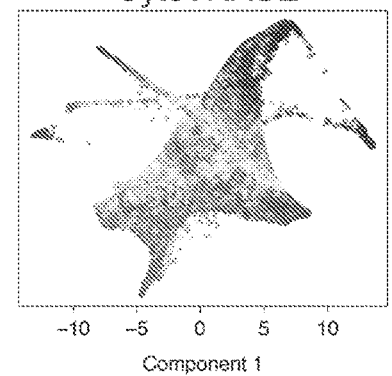
Fig. 39F
Human Bone marrow (10x) (10x)
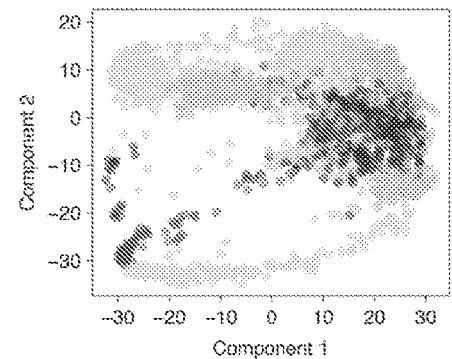
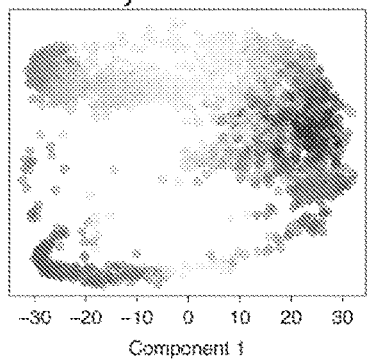

Human Bone marrow (Smart-seq2)

Human Whole intestine (Smart-seq2)

Human Dendritic cells (D1)

METHODS UTILIZING SINGLE CELL GENETIC DATA FOR CELL POPULATION ANALYSIS AND APPLICATIONS THEREOF

CROSS REFERENCE TO RELATED APPLICATIONS

This application claims priority to U.S. Provisional Application Ser. No. 62/852,231, entitled "Methods Utilizing Single Cell Genetic Data for Cell Population Analysis and Applications Thereof" to Aaron M. Newman et al., filed May 23, 2019, the disclosure of which is incorporated herein by reference in its entirety.

STATEMENT REGARDING FEDERALLY SPONSORED RESEARCH OR DEVELOPMENT

This invention was made with Government support under contracts W81XWH-12-1-0020, W81XWH-13-1-0281, and W81XWH-11-1-0287 awarded by the Department of Defense and under contracts CA100225 and CA187192 awarded by the National Institutes of Health. The Government has certain rights in the invention.

TECHNICAL FIELD

The disclosure provides description of utilizing nucleic acid sequence data from single cells for revealing cell population dynamics, including stemness, cell lineage, and differentiation status, and applications thereof, including diagnostic applications.

BACKGROUND

Cell differentiation is a biological process from which less specialized cells become more specialized in a maturation process. In mammals, the zygote (i.e., the initial cell post conception) is the least differentiated cell, which provides genetic material for all development of all cell types via cell differentiation. During development, a multitude of stem cells are formed which have the main function of dividing into more cells that will populate throughout the body and differentiate into mature cells to provide a particular function and thus forming a complex system of tissues and cell types.

Cell potency is the ability of a cell to divide and give rise to various differentiated cell types. Embryonic cells are pluripotent and thus have the potential differentiate into any cell within the body. As cells mature, their potency is further limited. For example, hematopoietic stem cells are limited to the potential to differentiate into immune and blood cells, and likewise, neural stem cells are limited to the potential to differentiate into cells of the nervous system. Accordingly, an embryonic stem cell can divide and mature into a neural stem cell or a hematopoietic stem cell. A neural stem cell can then divide and further mature into a neuron or astrocyte (cells that provide brain function). Likewise, a hematopoietic stem cell can divide and further mature into a B-lymphocyte or T-lymphocyte (immune cells that respond to pathogen infection).

Cell potency includes the cellular properties of stemness, cell lineage, and differentiation status. Stemness is a characteristic that marks the ability to self-renew and mature into a variety of cells. Accordingly, the stemness of an embryonic cell is greater than that of a neural stem cell or hematopoietic stem cell, and these cells have greater stemness than neurons, astrocytes, B-lymphocytes and T-lymphocytes. Cell lineage is the developmental pathway that a particular mature cell underwent from an originator cell. For instance, a B-lymphocyte's cell lineage starting at fertilization is as follows: zygote→embryonic stem cells→hematopoietic stem cells→B-lymphocytes. Differentiation state is the status of cell within its developmental pathway. For example, a B-lymphocyte has a more mature differentiation state than a hematopoietic stem cell, and vice versa.

Although stem cells are essential for developmental biology, it has been found that abnormalities within some stem cells can be a basis for various cancers and neoplasms. Abnormal stem cells may generate tumors through the processes of self-renewal and differentiation, forming a heterogeneous collection of cells with variable stemness, cell lineages, and differentiation states. In some instances, tumor relapse may be due to inability of various treatments to effectively kill and remove these stem-cell-like cancer cells.

SUMMARY OF THE INVENTION

Many embodiments are directed to methods of diagnosing cellular potency and differentiation status of individual cells based upon single-cell RNA sequencing (scRNA-seq). In many of these embodiments, gene counts or a gene count signature is utilized to order single cells based on their stemness, cell lineage, and differentiation state. Various embodiments are also directed towards utilization of smoothing techniques to achieve more precise ordering.

In an embodiment to infer differentiation status of a plurality of cells, single cell sequencing results of a plurality of cells are obtained. The sequencing was performed on each single cell individually and each cell's sequencing result includes the cell's gene expression. For each cell of the plurality of cells, the expression level of a set of genes from the single cell sequencing results is determined. The set of genes are genes having an expression pattern that have been determined to be correlated with gene counts. The differentiation status of each cell of the plurality of cells relative to each other is determined based on each cell's expression of the set of genes that are most correlated with gene counts. Cells having lower gene counts, as determined by the correlative gene expression, are more differentiated than cells having higher gene counts.

In another embodiment, a collection of cells is obtained. RNA from each cell of the collection of cells is extracted. Each cell's RNA is sequenced to yield a single cell sequencing result for each cell. Each cell sequencing result includes the cell's gene expression profile.

In yet another embodiment, the cells are derived from a tissue biopsy.

In a further embodiment, the tissue is a neoplasm.

In still yet another embodiment, the tissue is blood, brain, lymph node, thymus, bone marrow, spleen, skeletal muscle, heart, colon, stomach, small intestine, kidney, liver, skin, or lung.

In yet a further embodiment, each cell's gene expression is normalized for sequencing depth by rescaling a total number of reads per single cell.

In an even further embodiment, the total number of reads per single cell is transformed into a total transcript count that is a total number of detectable genes.

In yet an even further embodiment, cells having a total number of detectable genes below a certain threshold are removed from further analysis.

In still yet an even further embodiment, the number of genes in the set of genes is between 5 and 1000.

In still yet an even further embodiment, the genes in the set of genes are the top 200 genes that are most correlated with gene counts, as determined using the obtained single cell sequencing results.

In still yet an even further embodiment, expression of each gene of the set of genes is positively correlated with total gene count.

In still yet an even further embodiment, expression of at least one gene of the set of genes is negatively correlated with total gene count.

In still yet an even further embodiment, groups of cells sharing a similar characteristic are identified.

In still yet an even further embodiment, the gene expression of each gene across the set of genes analyzed is smoothed within the group cells identified to share a similar characteristic.

In still yet an even further embodiment, an adjacency matrix, similarity matrix, or a Markov process is utilized to identify the groups of cells sharing a similar characteristic.

In still yet an even further embodiment, smoothing incorporates non-negative least squares regression or diffusion.

In still yet an even further embodiment, the cells are ordered based on their differentiation status.

In still yet an even further embodiment, at least one cell of the plurality cells identified to be: a tumor initiating cell, a stem cell, a progenitor cell, or a differentiated cell based on the differentiation status.

In still yet an even further embodiment, a stemness of each cell of the plurality of cells is determined based on the cell's expression of the set of genes.

In still yet an even further embodiment, a cell lineage of each cell of the plurality of cells is determined based on the cell's expression of the set of genes.

In still yet an even further embodiment, a biomarker that is expressed in the cell is identified. The biomarker is a gene product that indicates differentiation status.

In still yet an even further embodiment, expression of the biomarker is detected in a set of cells via a biological assay.

In still yet an even further embodiment, the assay is one of: nucleic acid hybridization, polymerase chain reaction, next-generation sequencing, Sanger sequencing, western blot, immunostaining, flow cytometry, enzyme-linked immunosorbent assay (ELISA), or dot blot.

In still yet an even further embodiment, a gene involved in differentiation status is identified. Activity of the gene product is modulated in a set of cells using a short-hairpin RNA, CRISPR, an antigen binding protein, a small molecule antagonist, or a small molecule agonist.

In an embodiment to mitigate growth of a neoplasm, a molecule that disrupts activity of GULP1 gene products is administered to a neoplasm. The molecule is a short-hairpin RNA, CRISPR, an antigen binding protein, or a small molecule antagonist.

In another embodiment, the neoplasm is breast cancer.

In an embodiment to detect a presence of tumor initiating cells in a breast cancer, expression of GULP1 is detected in a cell within a breast cancer tumor. The expression of GULP1 indicates the cell is a tumor initiating cell.

In another embodiment, the expression of GULP1 is detected by nucleic acid hybridization, polymerase chain reaction, next-generation sequencing, Sanger sequencing, western blot, immunostaining, flow cytometry, enzyme-linked immunosorbent assay (ELISA), or dot blot.

In an embodiment to detect a presence of cells with potential to cause a relapse of breast cancer, an expression product of GULP1 is detected in a cell of a breast cancer tumor. The expression product of GULP1 indicates the cell has potential to cause a relapse of breast cancer.

In an embodiment to detect a presence of cells with potential to resist chemotherapeutic treatment, expression of GULP1 is detected in a cell of a tumor. The expression of GULP1 indicates the cell has potential to resist chemotherapeutic treatment.

In an embodiment to identify quiescent stem cells within a plurality of cells, single cell sequencing results of a plurality of cells is obtained. The sequencing was performed on each single cell individually and each cell's sequencing result includes the cell's gene expression. For each cell of the plurality of cells a total number of genes expressed within that cell is determined from the single cell sequencing results. The differentiation status of each cell of the plurality of cells is determined relative to each other based on the total number of genes expressed within each cell. Cells having lower gene counts are more differentiated than cells having higher gene counts.

In an embodiment to infer a differentiation status of a plurality of cells, single cell ATAC-sequencing results of a plurality of cells is obtained. The sequencing was performed on each single cell individually and each cell's sequencing result includes the cell's gene expression. For each cell of the plurality of cells, chromatin accessibility is determined from the single cell ATAC-sequencing results. The differentiation status of each cell of the plurality of cells is determined relative to each other based on the cell's chromatin accessibility. Cells with higher chromatin accessibility are less differentiated than cells with lower chromatin accessibility.

In an embodiment to deplete quiescent hematopoietic stem cells, a molecule that disrupts activity of GULP1 gene products is administered to a quiescent hematopoietic stem cell. The molecule is a short-hairpin RNA, CRISPR, an antigen binding protein, or a small molecule antagonist.

In an embodiment to increase blood cell count, a molecule that enhances activity of GULP1 gene products is administered to a hematopoietic stem cell. The molecule is a GULP1 expression cassette or a small molecule agonist.

In an embodiment to identify quiescent stem cells within a plurality of cells, single cell sequencing results of a plurality of cells is obtained. The sequencing was performed on each single cell individually and each cell's sequencing result includes the cell's gene expression. For each cell of the plurality of cells, the expression level of a set of genes is determined from the single cell sequencing results. The set of genes are genes that are most correlated with gene counts. For each cell of the plurality of cells, the total RNA content of each single cell is determined. Stem cells are identified by determining the differentiation of each cell of the plurality of cells relative to each other. Differentiation status is based on each cell's expression of the set of genes that are most correlated with gene counts. Cells having lower gene counts, as determined by the correlative gene expression, are more differentiated than cells having higher gene counts. Quiescent cells are identified within the identified stem cells by determining the quiescent status of the plurality of cells relative to each other. Cells having lower RNA content are more quiescent that cells having higher RNA content.

In another embodiment, a chemoquiescence agent is administered to an individual from whom the tissue biopsy was extracted. The chemoquiescence agent is metformin, chloroquine, proton pump inhibitors, Shh inhibitors, Akt inhibitors or angiogenesis inhibitors.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 7, 8, and 19A provides a scatterplot of the performance of 17,814 features in predicting the differentiation status of known phenotypes across 9 scRNA-seq datasets, utilized in accordance with embodiments of the invention.

FIGS. 12A, 12B, and 12C provide boxplots showing association of gene counts with known differentiation status when single cells are mean aggregated by rank versus when pseudo-bulk mixtures are created by pooling reads across known phenotypes in the training cohort, validation cohort, and extended cohort, utilized in accordance with embodiments of the invention.

FIG. 13A provides scatterplots showing: showing the association of gene counts (x-axis) with total number of unique molecular identifiers (UMIs) per single cell (y-axis) for droplet-based datasets (n=9)(top panel); and the association of gene counts (x-axis) with the geometric mean of all 92 ERCC spike-ins (y-axis) for various datasets (n=7) (bottom panel); utilized in accordance with embodiments of the invention.

FIG. 14 provides: boxplots (top left) showing the impact of different minimum expression thresholds on the association between gene counts and developmental potential; bar plots (top right) showing the median TPM/CPM per transcript in datasets with ERCC spike-in standards; boxplots (bottom left) showing the effect of thresholding the minimum number of UMIs for defining the number of genes per cell on the association between single-cell gene counts and developmental potential; and boxplots showing the effect of removing doublets on the association between gene counts and developmental potential, utilized in accordance with embodiments of the invention.

FIG. 16 provides a radial tree map showing gene counts for each cell type and a boxplot showing weight Spearman correlations between single-cell gene counts and developmental lineages of *C. elegans*, generated in accordance with embodiments of the invention.

FIG. 17D shows gene counts per phenotype for human hematopoietic subsets profiled by 10× Chromium scRNA-seq.

FIG. 17E provides a heat map showing counts per phenotype for human hematopoietic subsets profiled by 10× Chromium scRNA-seq.

FIGS. 18A and 18B provide scatterplots showing: the noisy association of single cell gene counts (x-axis) with expected ordering during in vitro human ESC differentiation (n=1018 cells;) from human embryonic stem cells, neural progenitor cells, definite endoderm progenitors, trophoblasts, human foreskin fibroblasts, to endothelial cells (y-axis); denoised association with expected ordering during in vitro human ESC differentiation after taking the geometric mean gene expression of the top 200 genes most associated with gene counts, or gene counts signature (GCS) (y-axis); and significantly denoised association with expected ordering during in vitro human ESC differentiation after GCS is smoothed across nearest neighbors, resulting in CytoTRACE (y-axis); generated in accordance with embodiments of the invention.

FIG. 19C provides bar plots showing the performance (weighted Spearman correlation) of the whole transcriptome and multi-lineage genes defined by TREL and BEAM for ordering mouse bone marrow cells ('Mouse bone marrow (Smart-Seq2)) during B cell, granulocyte, and monocyte lineages (n=4, 4, and 2 potency levels, respectively) and by known potency (n=4 potency levels). FIG. 19D provides boxplots comparing the performance of gene counts across the whole transcriptome versus gene counts across sets of lineage-specific genes involved in multi-lineage priming (MLP) and not involved in MLP, for ordering 55 lineages during *C. elegans* embryogenesis.

FIGS. 25A to 25C provide a comparison of CytoTRACE and RNA velocity. FIG. 21A provides a qualitative comparison of CytoTRACE and RNA velocity for resolving complex, multi-lineage differentiation processes from three datasets: 'Mouse bone marrow (Smart-seq2)' (top), 'Mouse bone marrow (10x)' (middle), and 'Mouse intestine (Smart-seq2)' (bottom). FIG. 21B provides schema describing the approach used to evaluate the accuracy of lineage inference by RNA velocity versus CytoTRACE. FIG. 21C provides boxplots showing performance of RNA velocity vs. CytoTRACE on 5 datasets using a small (n=30-100) or large (n=100-300 cells) neighborhood size for calculating RNA velocity. Each figure generated in accordance with embodiments of the invention.

FIG. 25E provides the developmental ordering of 15 human cell phenotypes from two independently generated datasets is shown in relation to uncorrected gene counts (left), batch-corrected gene counts (center), and batch-corrected CytoTRACE (right), utilized in accordance with embodiments of the invention.

FIGS. 31B and 31C provide the utility of combining CytoTRACE with Monocle 2 to identify rooted developmental hierarchies and lineage-specific genes without prior knowledge, generated in accordance with embodiments of the invention of the invention.

FIGS. 33D and 33E provide ordering of genes by their Pearson correlation with CytoTRACE and the corresponding log 2-fold difference of these genes in normal and malignant human luminal progenitor cells, generated in accordance with embodiments of the invention.

FIGS. 39A to 39I provide examples of CytoTRACE results: *C. elegans* hypodermis and seam (FIG. 39A), *C. elegans* muscle and mesoderm (FIG. 39B), *C. elegans* ciliated neurons (FIG. 39C), *C. elegans* duct and pore (FIG. 39D), early zebrafish (FIG. 39E), human bone marrow (FIG. 39F), human bone marrow (FIG. 39G), human whole intestine (FIG. 39H), and human dendritic cells (FIG. 39I), each generated in accordance with embodiments of the invention.

DETAILED DESCRIPTION

Figure 1:
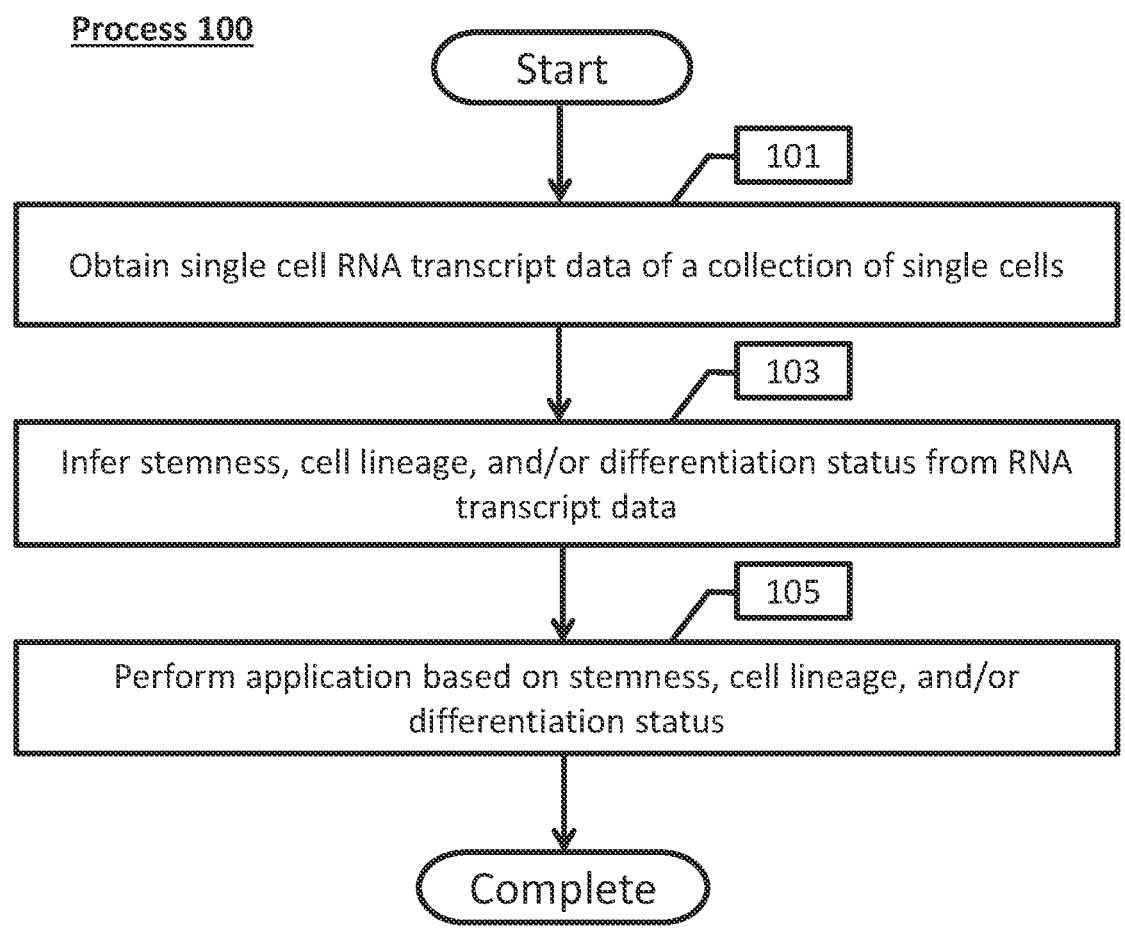
FIG. 1 provides an overview process for inferring stemness, cell lineage, and/or differentiation status from single cell transcript data in accordance with an embodiment of the invention.

Turning now to the drawings and data, processes to diagnose cell potency including inferences of stemness, cell lineage, and/or differentiation status of individual cells within a population of cells are provided. Many embodiments utilize single cell RNA sequencing (scRNA-seq) to infer the stemness, cell lineage, and/or differentiation status of the sequenced cell. In various embodiments, analyzed cells are ordered based on their differentiation status. To infer stemness, cell lineage, and/or differentiation status of the sequenced cells, various embodiments utilize a computational framework that utilizes the gene counts (i.e., the number of genes expressed in that cell) and/or a gene count signature (i.e., a gene expression signature of a set of genes that correlates with gene counts). Multiple embodiments are also directed to denoising the expression gene count signatures to yield ordered populations of cells based on their differentiation status. In numerous embodiments, inferred stemness, cell lineage, and/or differentiation status is utilized in a number of downstream applications.

Various embodiments described herein provide an ability to accurately and reproducibly determine a stemness and differentiation state of cells within certain cell lineages. In the human body, tissues are organized by the hierarchical differentiation of cells, starting from undifferentiated cells of indeterminate potential to increasingly specialized and developmentally restricted differentiated progeny. Historically, lineage tracing and functional transplantation experiments have led to the delineation of differentiation processes in mice and other model organisms, however, characterization of cellular hierarchies in human tissues has been challenging.

As large-scale efforts to catalog single cell transcriptomes in whole organisms, such as the Tabula Muris and Human Cell Atlas, emerge, methods to accurately and unbiasedly diagnose cell-to-cell relationships and differentiation hierarchies has become increasingly important, especially in humans. To this end, several prior methods have been developed to order cells by their differentiation status. Graph-based cell trajectory methods, such as Embeddr, Monocle DDRTree, Scorpius, Slingshot, STREAM, and TSCAN, draw curves through a low dimensional graph of the data and infer cellular trajectories based on the position of cells along these paths. These tools, however, require prior information about the cells in the dataset and expect users to indicate the root, or the least differentiated cell, as a starting point. Gene sets of known cell cycle and pluripotency genes might correlate with differentiation status without indication of a root, but they are noisy, biased to the curated genes, and may not generalize across species and tissues. Several alternative tools are dedicated to inferring stemness, cell lineage, and differentiation status from single cell RNA-sequence (scRNA-seq) data, such as StemID, SCENT, and SLICE. These measure entropy, or the distribution of gene expression, across single cell transcriptomes, protein-protein networks, and functional gene set networks, respectively. Although they do not require users to indicate a root, these tools were found to be noisy with suboptimal performance for inferring stemness, cell lineage, and differentiation status from scRNA-Seq dataset.

Despite these obstacles, the goal of identifying stemness, cell lineage, and differentiation status within cell populations in human tissues is still highly sought after, as understanding these underlying properties can uncover novel diagnoses and mechanisms. For example, it is of great benefit to understand lineage progression in embryonic development, adult tissue regenerative capacity, and cancer pathology. In the instance of cancer, increasing evidence suggests that various human cancers and neoplasms are initiated and driven by less differentiated tumor-initiating cells (TICs) that are often associated with chemotherapy and radiation resistance, but systematic methods to prioritize these cells have been lacking. Single-cell RNA-sequencing has emerged as an unbiased approach to capture thousands of expression features from single cells, enabling the high-resolution study of cell states and transitions.

Several diagnostic computational methods and biological features have been applied to scRNA-seq data to infer stemness, cell lineage, or differentiation status of single cells, however, these common methods require prior knowledge of the least differentiated cell in the dataset. These methods have failed to systematically evaluate measures of transcriptome diversity, features of scRNA-seq data, and biological pathways and gene expression programs. Therefore, a number of embodiments that are directed to unbiased and unsupervised diagnostic computational methods to perform cell population analysis and to infer stemness, cell lineage, and/or differentiation status. In some embodiments, stemness, cell lineage, or differentiation status are determined on a single-cell level within a population (i.e., percentage of cells of particular lineages and/or differentiation status within a population can be determined).

Provided within this disclosure are various embodiments of methods to infer differentiation status from scRNA-seq data, which was benchmarked against existing approaches. In some embodiments, improved methods for inferring differentiation trajectories from scRNA-seq data was developed. In some exemplary embodiments, the CytoTRACE method described within the Exemplary Embodiments was compared to existing technology. CytoTRACE outperformed all previous methods for reconstructing rooted differentiation trajectories, revealed hierarchical structure in complex tissues and whole organisms, and identified key genes associated with stemness and differentiation.

Overview of Methods to Diagnose Cell Potency

A number of embodiments are directed to inferring stemness, cell lineage, and/or differentiation status from single-cell RNA sequencing (scRNA-seq). In various embodiments, single cells are ordered within a lineage based on their differentiation status and stemness. Stemness, in accordance of many embodiments, is a property that characterizes the ability of a cell to behave like a stem cell (i.e., self-renew and differentiate into various cell types). Stemness can be molecularly defined by the transcript and/or peptide expression of stem cells. Differentiation status, in accordance with several embodiments, is the particular maturation state a cell resides within. Differentiation status include (but are not limited to) totipotent, pluripotent, multipotent stem, multipotent progenitor, oligopotent progenitor, unipotent progenitor, and differentiated. Cell lineage, in accordance with numerous embodiments, is the developmental history of a more differentiated cell from a less differentiated originator cell. For example, cells can differentiate from along a potency stages of: totipotent to pluripotent to multipotent stem to multipotent progenitor to oligopotent progenitor to unipotent progenitor and to differentiated mature cell. It should be understood however, that various cell lineages may not include all the potency stages and/or may have other potency stages than those listed. Likewise, cell lineages can also be defined by the cell type. For instance, a neuron lineage includes the cell types (in order of potency): neural stem cell to neural progenitor cell to immature neuron to mature synaptic neuron.

Several embodiments are also directed towards identifying quiescent stem cells, and especially adult quiescent stem cells, from mitotic stem cells within a population of cells. Quiescent stem cells (also referred to long-term stem cells) are traditionally difficult to infer due to their hibernation-like state. In many embodiments, quiescent stem cells are non-mitotic stem cells that are capable of reentering into a mitotic phase and further differentiating into a more differentiated state. Accordingly, quiescent stem cells have a similar differentiation and stemness status as mitotic stem cells but will have substantial differences in character and gene expression profiles.

Provided in FIG. 1 is an embodiment of an overview process to infer stemness, cell lineage and/or differentiation status of a collection of single cells based on scRNA-seq. Downstream applications based on stemness, cell lineage and/or differentiation status can be performed.

As depicted, process 100 can begin by obtaining (101) single cell RNA transcript data from a biological source or sequence database. Single cell RNA sequencing (scRNA-seq), in accordance with many embodiments, is a method of sequencing RNA transcripts on the individual cell level (and not a bulk collection of cells). Accordingly, a collection of cells are sorted into individual cells and have each cell's RNA transcripts individually isolated and processed for sequencing, resulting in a collection of RNA transcript data of single cells.

Process 100 also infers stemness, cell lineage, and differentiation status (103) for each cell analyzed as determined from the cell's RNA transcript data. In many embodiments, each analyzed cell is ordered based on differentiation status. In some embodiments, state of quiescence (e.g., mitotic or non-mitotic) is also inferred.

It is now appreciated that total gene count (i.e., the total number of different genes expressed) correlates with differentiation status. That is, the less differentiated a cell, the greater number of genes expressed. It is further appreciated that a gene count signature (i.e., a set of genes that have an expression pattern that correlates with gene count) can provide a robust indication of stemness, cell lineage, and/or differentiation status. Accordingly, a number of embodiments measure total gene count or determine the expression pattern of a gene count signature within single cells to infer that cell's stemness, cell lineage, and/or differentiation status. In various embodiments, gene counts and expression patterns are determined in single cells that are aggregated by cell phenotypes, which produces robust differentiation status.

In a similar manner, it also now appreciated that total RNA amount within a cell corresponds to a state of quiescence. Mitotic cells, which generally have many active cellular activities, have greater amounts of RNA within the cell as compared to quiescent cells, which generally have a low amount of cellular activity. Accordingly, a number of embodiments measure total RNA amount within single cells to infer that cell's quiescent state. Further, cells with high gene count or express a gene count signature but have low RNA amount are classified as quiescent stem cells, in accordance with a number of embodiments.

Process 100 also performs (105) an application based on an inferred stemness, cell lineage, and/or differentiation status. In some embodiments, novel stem, progenitor, and/or differentiated cells along a particular lineage are identified. Novel identified cells can be further examined in downstream applications. And in some embodiments, quiescent tumor initiating cells (TIC) are identified for various cancers and neoplasms. In various embodiments, differentiation trajectories in normal and diseased tissues are delineated. Likewise, various embodiments are directed to delineating the differentiation trajectories of healthy tissue compared to neoplastic tissue.

A number of embodiments are also directed to identification of biomarkers and/or key genes involved in a particular stemness, cell lineage, and/or differentiation status. In various embodiments, biomarker can be further examined in downstream applications, including experimental and diagnostic assays. For instance, in some embodiments, an identified biomarker is to be used to develop an assay to detect a particular stemness, cell lineage, and/or differentiation status.

A number of embodiments are also directed to inference of chromatin accessibility of single cells. As detailed within this disclosure, less differentiated cells correlate with greater chromatin accessibility, whereas more differentiated cells correlate with less chromatin accessibility. It should be understood that various embodiments utilize methods to detect chromatin accessibility, including single cell ATAC-seq and single cell bisulfite sequencing, to infer stemness, cell lineage, and/or differentiation status.

Inferring Stemness, Cell Lineage, and/or Differentiation Status from scRNA-Seq

Several embodiments are directed to inferring stemness, cell lineage, and/or differentiation status from sequencing of RNA from single cells. In many embodiments, RNA is derived from a collection of single cells, sequenced to provide gene expression results that can be used to infer stemness, cell lineage, and/or differentiation status. In some embodiments, the analyzed cells within the collection are ordered based on their differentiation status (i.e., from less differentiated to more differentiated, or vice versa) within a lineage.

Figure 2:
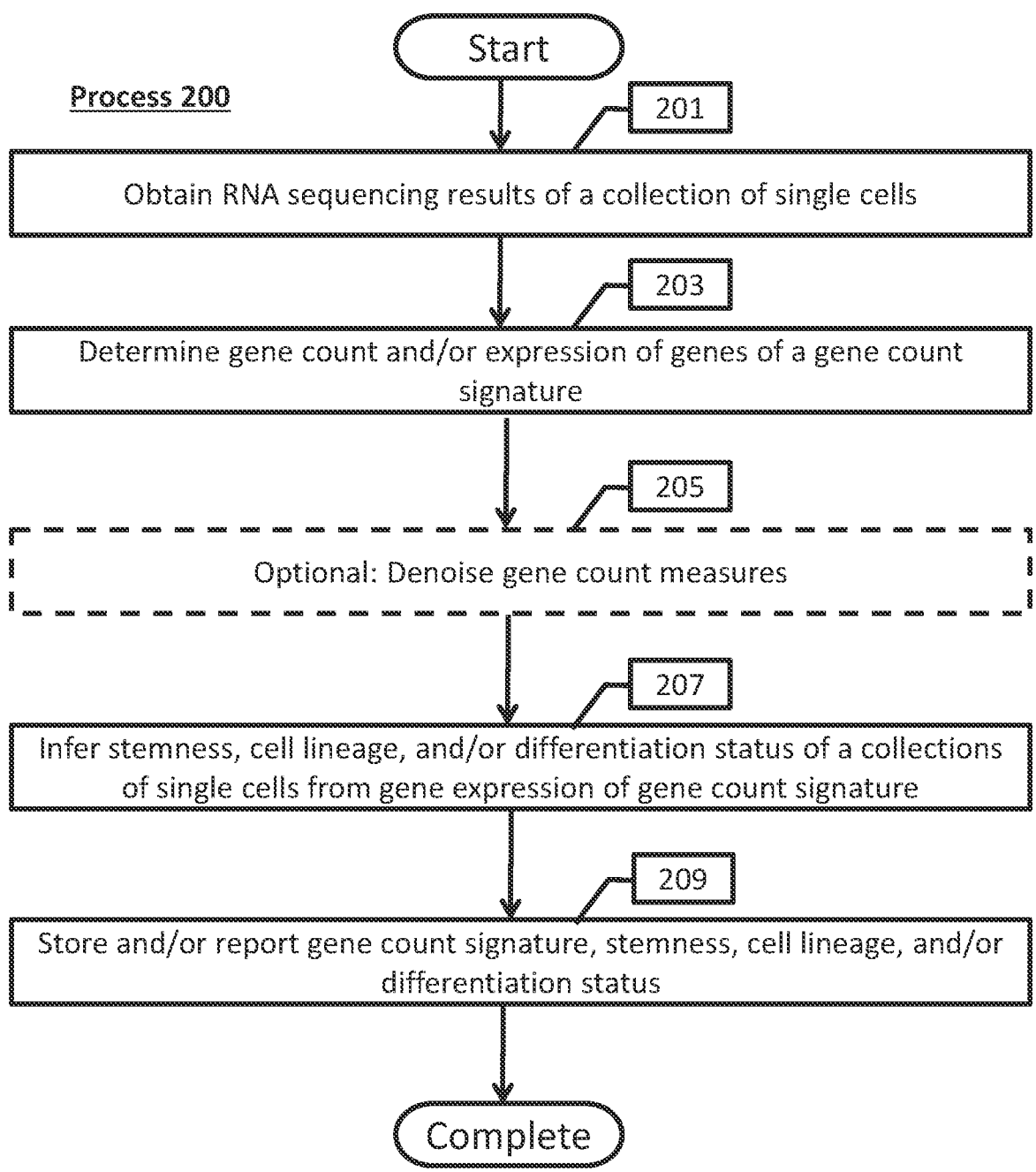
FIG. 2 provides a detailed process for inferring stemness, cell lineage, and/or differentiation status from single cell transcript data in accordance with an embodiment of the invention.

Provided in FIG. 2 is a process to infer stemness, cell lineage, and/or differentiation status of a collection of single cells utilizing scRNA-seq. Process 200 obtains (201) sequencing results from a collection of single cells. scRNA-seq is a method of sequencing RNA transcripts on the individual cell level (and not a bulk collection of cells). Accordingly, a collection of cells are sorted into individual cells and have each cell's RNA transcripts individually isolated and processed for sequencing, resulting in a collection of RNA transcript data of single cells.

In numerous embodiments, RNA transcripts can be derived from a cellular source, such as a tissue (e.g., biopsy), an in vitro cell line, or isolated single cells (e.g., circulating tumor cells isolated from blood). Tissue sources may include a biopsy of an organ (e.g., blood, brain, lymph node, thymus, bone marrow, spleen, skeletal muscle, heart, colon, stomach, small intestine, kidney, liver, lung). In some embodiments, the biological sample may be a tumor biopsy. A cancer biopsy refers to any tissue sample containing cancer cells that is obtained (e.g., by excision, needle aspiration, etc.) from a subject. The appropriate cellular source will often depend on the process, the features to be examined, and resultant measurements to be revealed.

For any cellular source, cells can be sorted into single cells, RNA transcripts can be isolated, purified, or concentrated by a number of methods known in the field. Cellular sources can be sorted into single cells by various methods, as understood in the field, including (but not limited to) flow cytometry, laser microdissection, manual cell picking, and microfluidics. RNA transcript molecules can be amplified and prepared into a library and sequenced by a number of known methods.

Several embodiments derive single cell RNA transcript data from publicly or privately available databases. These databases store a number of experimental sequencing results from numerous biological sources. Databases that have a large amount of chromatin derived nucleic acid sequence data include (but are not limited to) National Center for Biotechnology Information (NCBI) and scRNAseqDB.

Sequence can be processed to filter and trim data and remove low quality reads. Many methodologies are known to process sequence data, and any appropriate method can be used. For example, the sequence data can be trimmed from the publicly available TrimGalore or cutAdapt methods, which remove adapter sequences and trim poor-quality bases. Mapping can be performed with any appropriate annotated genome, such as, for example, UCSC's hg19 and alignment tool, such as, for example, Bowtie2. Processing of the data will be dependent on the user's goal, and thus is adaptable to the results desired.

To prepare for downstream analyses, several pre-processing steps can be performed. In some embodiments, expression is normalized for sequencing depth by rescaling the total number of reads per single cell to a particular number (e.g., 1,000,000). In various embodiments, read counts are transformed into transcript counts, which have been shown to improve detection of differentially expressed genes when used a standard. In some embodiments, the standardized read counts per single are rescaled to the total number of detectable genes. In some embodiments, each single-cell transcriptome was rescaled to $G_j$, the total number of detectable genes cell j, as follows:

$$X_{ij}^* = G_j \cdot \frac{X_{ij}}{\sum_{q=1}^{n} X_{qj}}, \forall i \in \{1, \ldots, n\}, \forall j \in \{1, \ldots, k\}$$

where X is an n×k matrix with n genes and k single-cell transcriptomes in non-log linear space, and $X_{ij}$ is the quantity of transcripts or reads assigned to gene i in cell j for TPM and CPM matrices, respectively.

In various embodiments, cells having low number of detectable genes below a certain threshold are removed. If multiple batches of sequencing results are to be analyzed, some embodiments correct for batch variation, which can be performed by an appropriate batch correction method. In some embodiments, ComBat is used for batch correction (for more on ComBat, see W. E. Johnson, C. Li & A. Rabinovic, *Biostatistics* 8, 118-127 (2007), the disclosure of which is herein incorporated by reference).

In a number of embodiments, total RNA content is also determined from scRNA-seq. Several methodologies can be utilized to determine RNA content that fall within various embodiments. For instance, in some embodiments, external RNA control transcripts having particular concentrations can be spiked into the single-cell RNA sample prior to sequencing for calibration purposes, and thus based on reads of the spiked external RNA controls compared to the scRNA reads, total scRNA content can be determined. In some embodiments, External RNA Controls Consortium (ERCC) are utilized. Furthermore, in some embodiments, molecular barcodes are utilized to label scRNA transcripts during the preparation process and prior to amplification of the transcripts (which is performed prior to the sequencing of scRNA). Because each transcript gets a unique molecular barcode, when analyzing scRNA sequencing data after the sequencing reaction, the molecular barcodes can be tallied to determine a relative total RNA content (i.e., samples with greater number of unique barcodes have greater total RNA content).

Process 200 determines (203) gene count and/or expression of a gene count signature. It has been found that total gene expression count (i.e., the total number of different genes expressed) correlates with stemness and differentiation status. Less differentiated cells express more genes than more differentiated cells. In other words, as a cell differentiates into a more mature state, that cell will typically express less genes over as it matures. Accordingly, a number of embodiments measure total gene count within in single cells to infer that cell's stemness, cell lineage, and/or differentiation status. In various embodiments, gene counts are performed in single cells that are aggregated by cell phenotypes, which produces robust differentiation status.

It has been discovered that total gene count within single cells can have a fair amount of noise due to various reasons, possibly including mRNA capture inefficiency upon lysis, PCR amplification biases, or other technical confounders during scRNA-seq. To overcome these complications, in various embodiments, scRNA expression of genes within a gene count signature is used to infer stemness, cell lineage and differentiation status. In some embodiments, a gene count signature is a collection of genes that have an expression pattern that correlates with gene counts. In some embodiments, a gene count signature is determined specifically for the sequencing set to be analyzed, as it has been determined that that the specific genes having expression that correlate with gene count depends (at least in part) on the cell population being analyzed. In other words, a gene count signature for a first scRNA data set of a first particular population of cells is likely to be different than a gene count signature for a second scRNA data set of a second particular population of cells. In some embodiments, a generalized gene count signature (i.e., generalized to multiple data sets of different cell populations) is utilized. In a number of embodiments, a geometric mean is calculated across the set of genes within the gene count signature. Accordingly, various embodiments use a gene count signature is used in lieu of or in addition to gene counts, which can effectively reduce the noise of scRNA-seq when determining differentiation status order.

The number of genes in a gene count signature can vary. It has been found, however, that selecting fewer than 5 genes may lead to an under powered inference of differentiation status order. It has also been found that selecting over 1000 genes is over inclusive and adds noisy genes that are not strong signals of gene counts. Accordingly, in some embodiments a gene count signature includes any number of genes between 5 and 1000, and in some specific embodiments a gene count signature includes 5, 10, 20, 30, 40, 50, 60, 70, 80, 90, 100, 200, 300, 400, 500, 600, 700, 800, 900, or 1000 genes. In some embodiments, a gene count signature is the 200 genes listed in Table 1, which are the top 200 genes that were discovered to be a robust correlative of stemness, cell lineage, and differentiation state.

In a number of embodiments, genes are selected to be included in the gene count signature are selected based on their positive correlation with gene counts. In some embodiments, the Pearson correlation of each gene is used to select the genes most positively correlated with gene counts. In various embodiments, the top 5, 10, 20, 30, 40, 50, 60, 70, 80, 90, 100, 200, 300, 400, 500, 600, 700, 800, 900, or 1000 genes most positively correlated genes with gene counts are selected. It is noted that various embodiments also include the use of genes having negative correlation with gene counts too. The use of genes having negative correlation, however, may not be ideal in some situations in which low gene counts signifying differentiated cells are confounded by mixtures of differentiated cell phenotypes, which can be found in (for example) tissue having diverse population of mature cell types.

In various embodiments, total RNA content is utilized to determine whether a stem cell is quiescent. It is now appreciated that active stem cells will have greater total RNA content compared to quiescent stem cells. Accordingly, in some embodiments, state of quiescence is determined by relative total RNA content such that stem cells having greater RNA content are mitotic whereas stem cells having less RNA content are quiescent.

In various embodiments, stemness, cell lineage, and/or differentiation status is inferred from expression of genes from a gene count signature, followed by denoising (i.e., smoothing) (205) across transcriptionally similar cells.

To prepare for denoising, in several embodiments, an adjacency matrix of the scRNA-seq gene expression data is generated to identify transcriptionally similar cells. To generate an adjacency matrix (e.g., Markov matrix), in some embodiments, an original expression matrix is filtered to a set of gene expressed in at least a particular percent of cells (e.g., 5%). Then a dispersion index is calculated for each gene by taking the ration of its variance to its mean across all cells. A number of most dispersed genes (e.g., top 1000 most dispersed genes) are used to compute a similarity matrix that is converted into an adjacency matrix by setting all diagonal elements to 0 and II correlations less than the null similarity coefficient to 0, then normalizing the sum of each row to 1. The null similarity coefficient can be estimated by bootstrapping 10,000 random Pearson product-moment correlation coefficients between pairs of cells. The elements of the resulting adjacency matrix indicate the neighborhoods of cells across which denoising will be applied, where 0 indicates no adjacency between a pair of cells and values between 0 and 1 indicate different degrees of adjacency.

Once an adjacency matrix is prepared, a number of methods of denoising can be used, including non-negative least squares (NNLS) regression, diffusion, or any combination thereof. Denoising gene count signatures may reduce intra-phenotypic variance, resulting in more precise inference of differentiation status order.

In various embodiments utilizing NNLS regressions, a regression package is applied to regress the gene counts signature vector ($\overline{GCS}$) onto the adjacency matrix (A) and estimate $\overrightarrow{GCS_R}$ the sparse solution to the nnls optimization problem:

$$\vec{x}^* = \arg\min \vec{x}_{\geq 0} \| A \vec{x} - \overline{GCS} \|_2$$

where $\overrightarrow{GCS_R} = A\vec{x}^*$. Because A is often collinear due to the presence of transcriptionally similar cells, the solution to NNLS, denoted by vector $\vec{x}^*$, is generally sparse without requiring regularization or parameterization (unlike Lasso, for example). As a result, the use of NNLS allows $\overline{GCS}$ to be explained as a function of distinct transcriptional neighborhoods in A (denoted by $\overrightarrow{GCS_R}$), resulting in a smoother representation and improved performance over $\overline{GCS}$.

In various embodiments, diffusion is performed upon the NNLS regression estimate to smooth the $\overrightarrow{GCS_R}$ estimate by local similarity using a diffusion process over the adjacency matrix, A. In some embodiments, the following process is applied at for a number of iterations (e.g., 10,000 iterations; (t=1, . . . , 10,000)) or until convergence mean($|\vec{d}_{t+1} - \vec{d}_t|) \leq 1 \times 10^{-6}$:

$$\vec{d}_{t+1} = \alpha \cdot A \vec{d}_t + (1-\alpha) \cdot \vec{d}_0$$

where $\vec{d}_0 = \overrightarrow{GCS_R}$ and $\alpha = 0.9$. Unlike NNLS, which identifies nonnegative coefficients that best explain $\overline{GCS}$ as a function of A, the diffusion process iteratively adjusts $\overrightarrow{GCS_R}$ based on the probability structure of the adjacency matrix defined in A.

It is noted that the α parameter and number of iterations can be adjusted and optimized to the needs of the applications.

In several embodiments, stemness, cell lineage, and/or differentiation status for a collection of cells is inferred (207). To do so, values from the gene count signature values (with or without denoising) of cells are ranked, yielding a predicted order of single cells in terms of their differentiation status and stemness. In various embodiments, cell lineage is also inferred based on the order alignments. In some embodiments, the output of diffusion (i.e., vector $\vec{d}_{t+1}$) is converted to rank-space, yielding a vector of length k containing the predicted developmental ordering of every cell. In some embodiments, state of quiescence is inferred based on total RNA amount, where cells with lower RNA content are more quiescent that cells with higher RNA content.

Process 200 also stores and/or reports (209) gene count signature, stemness, cell lineage, and/or differentiation status. As is discussed herein, stemness, cell lineage, and/or differentiation status can be used for experimental analyses and conclusions, diagnostics, and/or other further downstream applications.

While specific examples of processes for inferring stemness, cell lineage, and/or differentiation status are described above, one of ordinary skill in the art can appreciate that various steps of the process can be performed in different orders and that certain steps may be optional according to some embodiments of the invention. As such, it should be clear that the various steps of the process could be used as appropriate to the requirements of specific applications. Furthermore, any of a variety of processes for inferring stemness, cell lineage, and/or differentiation status appropriate to the requirements of a given application can be utilized in accordance with various embodiments of the invention.

Applications of Inferred Differentiation Status

Various embodiments are also directed towards utilizing an inferred stemness, cell lineage, and/or differentiation status. In some embodiments, novel stem, progenitor, and/or differentiated cells along a particular lineage are identified. Novel identified cells are cells having molecular characteristics yet to be described. Thus, it is advantageous to further examine novel identified cells in downstream applications. In a number of embodiments, cancers or neoplasms are examined to identify and characterize novel tumor initiating cells (TIC), which cells having stem-cell-like properties and abnormally proliferate in the pathogenesis of the cancer. In some instances, TICs can form a tumor or other neoplastic tissue. It would be advantageous to better characterize TICs to yield insight into cancer pathology and progression. A number of embodiments are also directed to identifying TICs within a cancer or neoplasia. By identifying TICs within a cancer or neoplasia, various tactics can be utilized to inhibit or mitigate neoplastic growth.

In a number of embodiments, differentiation trajectories in normal and diseased tissues are delineated. Likewise, various embodiments are directed to delineating the differentiation trajectories of healthy tissue compared to neoplastic tissue. By delineating the differences between normal and neoplastic tissue, pathologies related to cancer or neoplasia can be discovered and exploited. In some instances, key genes related specifically to neoplastic growth can be identified, yielding insight into methodologies to inhibit and/or mitigate neoplasms without affecting normal tissue.

Figure 3:
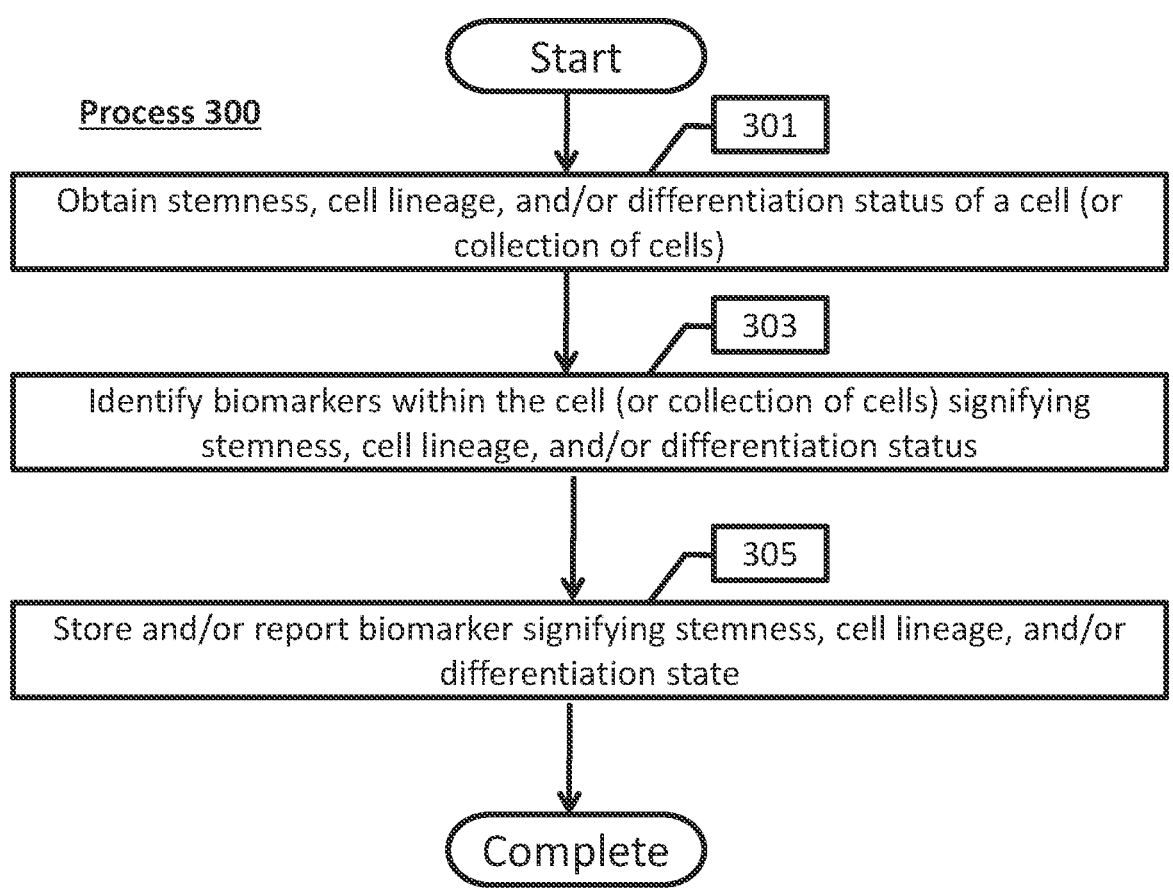
FIG. 3 provides a process for biomarkers signifying stemness, cell lineage, and/or differentiation status in accordance with an embodiment of the invention.

A number of embodiments are also directed to identification of biomarkers and/or key genes involved in a particular stemness, cell lineage, and/or differentiation status. Provided in FIG. 3 is an embodiment of a process to identify biomarkers, in which Process 300 begins by obtaining (301) stemness, cell lineage, and/or differentiation status of a cell (or a collection of cells). An appropriate method to determine stemness, cell lineage, and/or differentiation status can be utilized, including methods described within this disclosure.

Biomarkers within a cell (or collection of cells) having a particular stemness, cell lineage, and/or differentiation status can be identified (303). In some instances, unique biomarkers can be used to signify a particular stemness, cell lineage, and/or differentiation. In some instances, biomarkers may also have an important biological role that can be exploited. For example, various biomarkers may be important for maintaining stemness and/or promoting differentiation and thus manipulation of expression of these biomarkers can alter a cell's ability to maintain its differentiation status. Likewise, biomarkers may also be important for differentiation into a particular cell lineage and thus manipulation of expression of these biomarkers can alter a cell's maturation and ultimately which type of mature cell is developed. And in some instances, biomarkers can be identified that are specific to particular differentiation trajectories of diseased tissues, which can be exploited to further study, diagnose, and/or treat a particular disease. For example, identifying biomarkers specific to TICs can be exploited to further study and understand the cells and how to better diagnose and treat various neoplasms.

Biomarkers signifying stemness, cell lineage, and/or differentiation state that are identified can be stored and provided in a report (305).

In some embodiments, a diagnostic assay to detect an identified biomarker is developed. Detection assays, in accordance with various embodiments, include detection of RNA and/or protein expression the biomarker in a sample. In some embodiments, biomarker RNA expression is detected by hybridization, polymerase chain reaction, or sequencing techniques. In some embodiments, biomarker protein expression is detected by immunodetection techniques utilizing antibodies that recognize the biomarker, such as western blot, immunostaining, flow cytometry, enzyme-linked immunosorbent assay (ELISA), or dot blot assays.

In some embodiments, expression of genes indicative of a particular stemness, cell lineage, and/or differentiation status are further examined by modulating the genes expression. Accordingly, various embodiments are directed to knocking down, knocking out, and/or inhibiting expression of various genes to determine their function in stemness, cell lineage, and/or differentiation status. In some particular embodiments, short-hairpin RNAs (shRNAs) are developed to knock down expression of a particular gene.

Various embodiments are also directed towards evaluating a disease in an individual, and/or predicting a clinical outcome of a disease therapy, based on an inferred stemness, cell lineage, and/or differentiation status of a collection of cells. Accordingly, particular outcomes can yield insight into disease pathology of an individual.

Thus, a number of embodiments are directed toward methods that include obtaining a biological sample from an individual having a disease, and inferring a stemness, cell lineage, and/or differentiation status of a collection of cells present in the sample. The inferred stemness, cell lineage, and/or differentiation status of a collection of cells may be used to determine its value for prognosing and/or diagnosing the disease and/or predicting a response to therapy based on its correlation with a clinical outcome of the disease. Thus, the present methods provide new biomarkers for prognosis or diagnosis of a disease, and/or for predicting the outcome of a therapy for a disease. A clinical outcome of a therapy for a disease may then be predicted based on the new biomarkers.

In some cases, the disease is a cancer, which may be any suitable cancer, such as, but not limited to, human sarcomas and carcinomas, e.g., fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, melanoma, neuroblastoma, retinoblastoma; leukemias, e.g., acute lymphocytic leukemia and acute myelocytic leukemia (myeloblastic, promyelocytic, myelomonocytic, monocytic and erythroleukemia); chronic leukemia (chronic myelocytic (granulocytic) leukemia and chronic lymphocytic leukemia); and polycythemia vera, lymphoma (Hodgkin's disease and non-Hodgkin's disease), multiple myeloma, Waldenstrom macroglobulinemia, follicular lymphoma and heavy chain disease.

In some embodiments, quiescent cancer stem cells are identified and an appropriate treatment is administered. Quiescent cancer stem cells are often difficult to treat due to the fact that many cancer therapeutics target highly mitotic cells. Accordingly, in various embodiments, when quiescent cancer stem cells are identified, the patient is persistently monitored during and after treatment to determine if residual cancerous cells (especially quiescent stem cells) are still present and/or if cancer relapses. In some embodiments, quiescent cancer stem cells are identified by expression of the gene GULP1. It is now understood that expression of the gene GULP1 expression correlates with quiescent stem cells and with poor outcomes and relapse in a number of cancers, including (but not limited to) neuroblastoma, glioma, colon cancer, lung cancer, breast cancer, and ovarian cancer. Accordingly, in various embodiments, a patient's biopsy can be examined to determine GULP1 expression, and based on results, the patient can be monitored and/or given more aggressive chemotherapy.

In some embodiments, a chemoquiescence agents are administered such as (for example) metformin, chloroquine, proton pump inhibitors, sonic hedgehog (Shh) pathway inhibitors, AKT inhibitors and angiogenesis inhibitors (See N. Kangwan, et al., *J Cancer Prev.* 19, 89-96 (2014), the disclosure of which is herein incorporated by reference). Proton pump inhibitors include (but are not limited to) omeprazole and pantoprazole. Shh inhibitors include (but are not limited to) cyclopamine and cerulenin. AKT inhibitors include (but are not limited to) afuresertib. Angiogenesis inhibitors include (but are not limited to) bevacizumab and thrombospondins.

Systems of Inferring Stemness, Cell Lineage, and/or Differentiation Status

Figure 4:
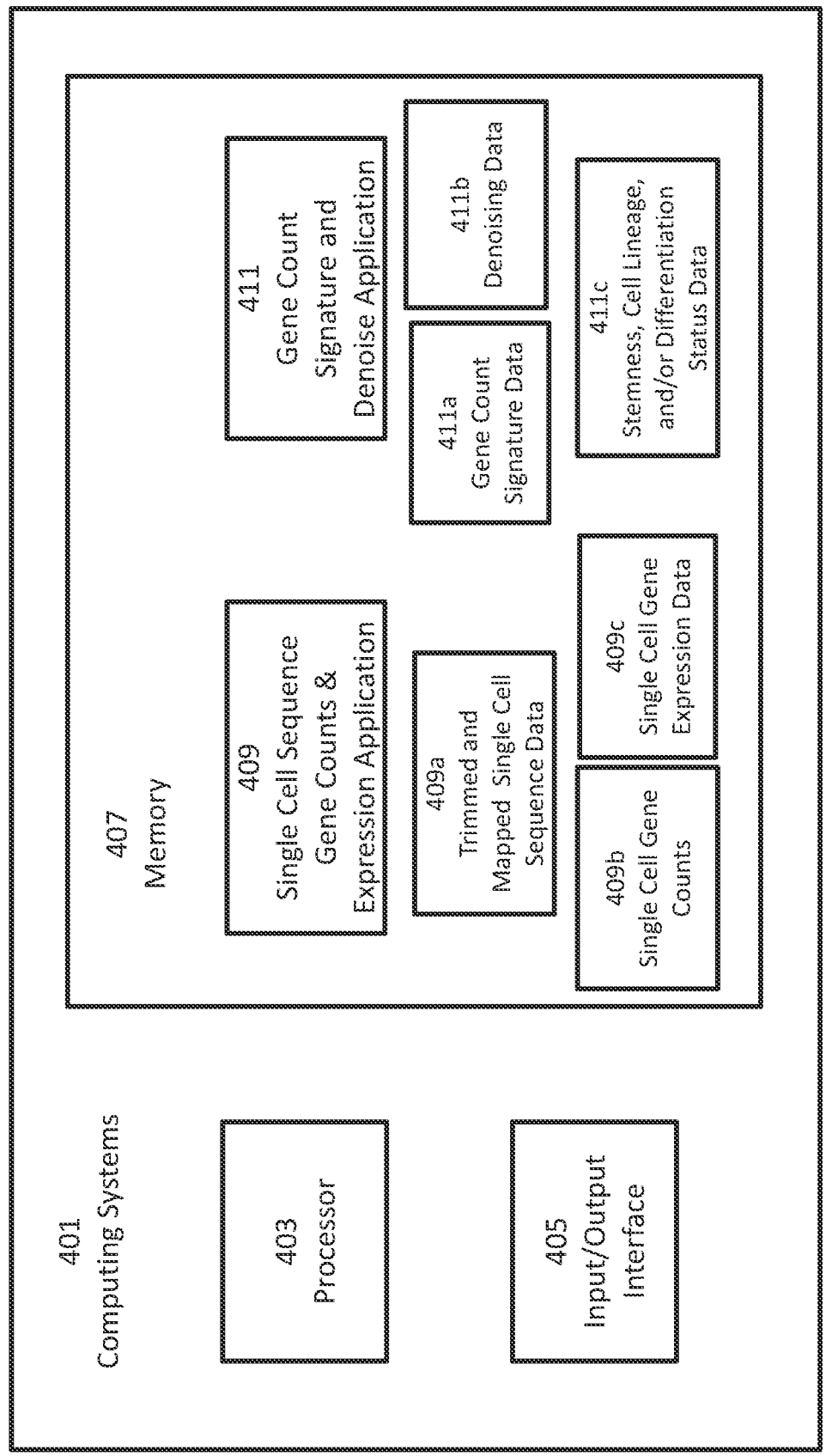
FIG. 4 provides computing systems for inferring stemness, cell lineage, and/or differentiation status in accordance with an embodiment of the invention.

Turning now to FIG. 4, computing systems (401) may be implemented on a single or a plurality of computing device(s) in accordance with some embodiments of the invention. Computing systems (401) may be a personal computer, a laptop computer, any other computing device with sufficient processing power, or any plurality and/or combination of computing devices for the processes described herein. Computing systems (401) include a processor (403), which may refer to one or more devices within the computing systems (401) that can be configured to perform computations via machine readable instructions stored within a memory (407) of the computer system (401). The processor may include one or more microprocessors (CPUs), one or more graphics processing units (GPUs), and/or one or more digital signal processors (DSPs).

In a number of embodiments of the invention, the memory (407) may contain a single cell sequence gene counts and expression application (409) and a gene count signature and denoise application (411) that performs all or a portion of various methods according to different embodiments of the invention described throughout the present application. As an example, processor (403) may perform a process to develop frequency signal maps similar to any of the processes described above with reference to FIG. 4 and a process to infer stemness, cell lineage, and/or differentiation status similar to any of the processes described above with reference to FIG. 2, during which memory (407) may be used to store various intermediate processing data such as trimmed and mapped single cell sequence data (409a), single cell gene counts (409b), single cell gene expression data (409c), gene count signature data (411a), denoising data (411b), and stemness, cell lineage, and/or differentiation status data (411c).

In some embodiments of the invention, the computer system (401) may include an input/output interface (405) that can be utilized to communicate with a variety of devices, including but not limited to other computing systems, a projector, and/or other display devices. As can be readily appreciated, a variety of software architectures can be utilized to implement a computer system as appropriate to the requirements of specific applications in accordance with various embodiments of the invention.

Although computer systems and processes for inferring stemness, cell lineage, and/or differentiation status and performing actions based thereon are described above with respect to FIG. 4, any of a variety of devices and processes for data associated with inferring stemness, cell lineage, and/or differentiation status as appropriate to the requirements of a specific application can be utilized in accordance with many embodiments of the invention.

Exemplary Embodiments

The embodiments of the invention will be better understood with the several examples provided within. Many exemplary results of methods to infer stemness, cell lineage, and differentiation status from scRNA-seq are described. In one particular method, CytoTRACE outperformed several other methods currently in practice.

Single-cell RNA-sequencing is a powerful approach for reconstructing cellular differentiation trajectories at high resolution. Inferring both the state and direction of differentiation without prior knowledge, however, has remained challenging. CytoTRACE is a method that leverages a simple measure of global chromatin accessibility—the number of detectably expressed genes per cell—to infer ordered differentiation status from scRNA-seq data in an unsupervised manner. When evaluated on ~240 k single-cell transcriptomes spanning 390 cell phenotypes, 55 lineages, 14 tissue types, 9 sequencing platforms, and 5 species, CytoTRACE significantly outperformed 10 computational methods and ~18,000 gene sets for predicting the known differentiation status or developmental ordering of each cell. By applying this framework to scRNA-seq profiles of epithelial subpopulations from primary breast tumors, new candidate genes associated with less differentiated luminal progenitors were identified and a novel candidate was validated for its predicted role in tumorigenesis.

It was surprisingly found that gene counts was a top-performing measure for predicting differentiation status when mean aggregated by cell phenotypes but was noisy in predicting the alignment of single cells. To isolate the biological signal in gene counts, we developed CytoTRACE, a computational framework that denoises gene counts by leveraging covariant gene expression and applying a smoothing procedure across transcriptionally similar cells. CytoTRACE outperformed all previous methods for reconstructing rooted differentiation trajectories, revealed hierarchical structure in complex tissues and whole organisms, and identified key genes associated with stemness and differentiation.

Unlike existing methods for differentiation trajectory analysis, CytoTRACE does not require any prior knowledge to both orient the direction and order the single cells by differentiation status. CytoTRACE only requires a scRNA-seq gene expression table, can take very large datasets (e.g. up to 40,000 single cells in this study), and is relatively fast (<150 seconds for datasets with 5000 cells). CytoTRACE is also indiscriminate to the type of tissue, species, or scRNA-seq platform with a few notable exceptions.

CytoTRACE is anchored to gene counts, a simple feature of scRNA-seq data that we found to be an accurate predictor of differentiation status. Gene counts strongly associated with various measures of total RNA content in scRNA-seq data and correlated with the number of accessible chromatin peaks in ATAC-seq data. It was robust to changes in the total number of reads above saturation, although still subject to sources of technical variation during tissue and sequence processing. Perhaps, most surprisingly, absolute gene counts predicted the ontological process from totipotent stem cells to differentiated cells across platforms, offering biological context in the entire spectrum of differentiation.

It is anticipated that the most important application of CytoTRACE will be in complex tissues, such as cancer, where differentiation trajectories are poorly understood. To conclude, we developed CytoTRACE, a computational framework for the accurate and unbiased ordering of cells by their differentiation status in scRNA-seq data. We anticipate that CytoTRACE will enable the identification of complex differentiation trajectories and less differentiated genes and cells in tumors and other tissues.

Example 1: RNA-Based Correlates of Cellular Differentiation

Figure 5:
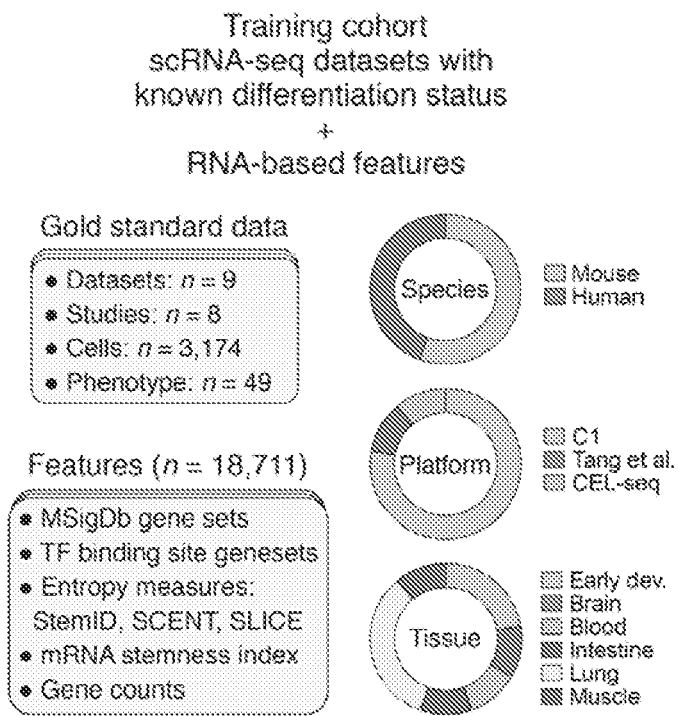
FIG. 5 provides pie charts showing the composition of the training cohort of scRNA-seq datasets (n=9) used to screen for features of differentiation with respect to species, scRNA-seq platforms, and tissues analyzed, utilized in accordance with embodiments of the invention.
Figure 6:
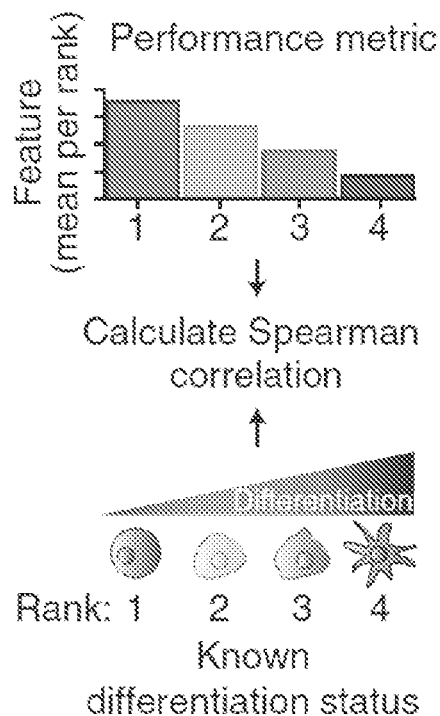
FIG. 6 provides a schema of in silico screen for measures of differentiation, utilized.
Figure 7:
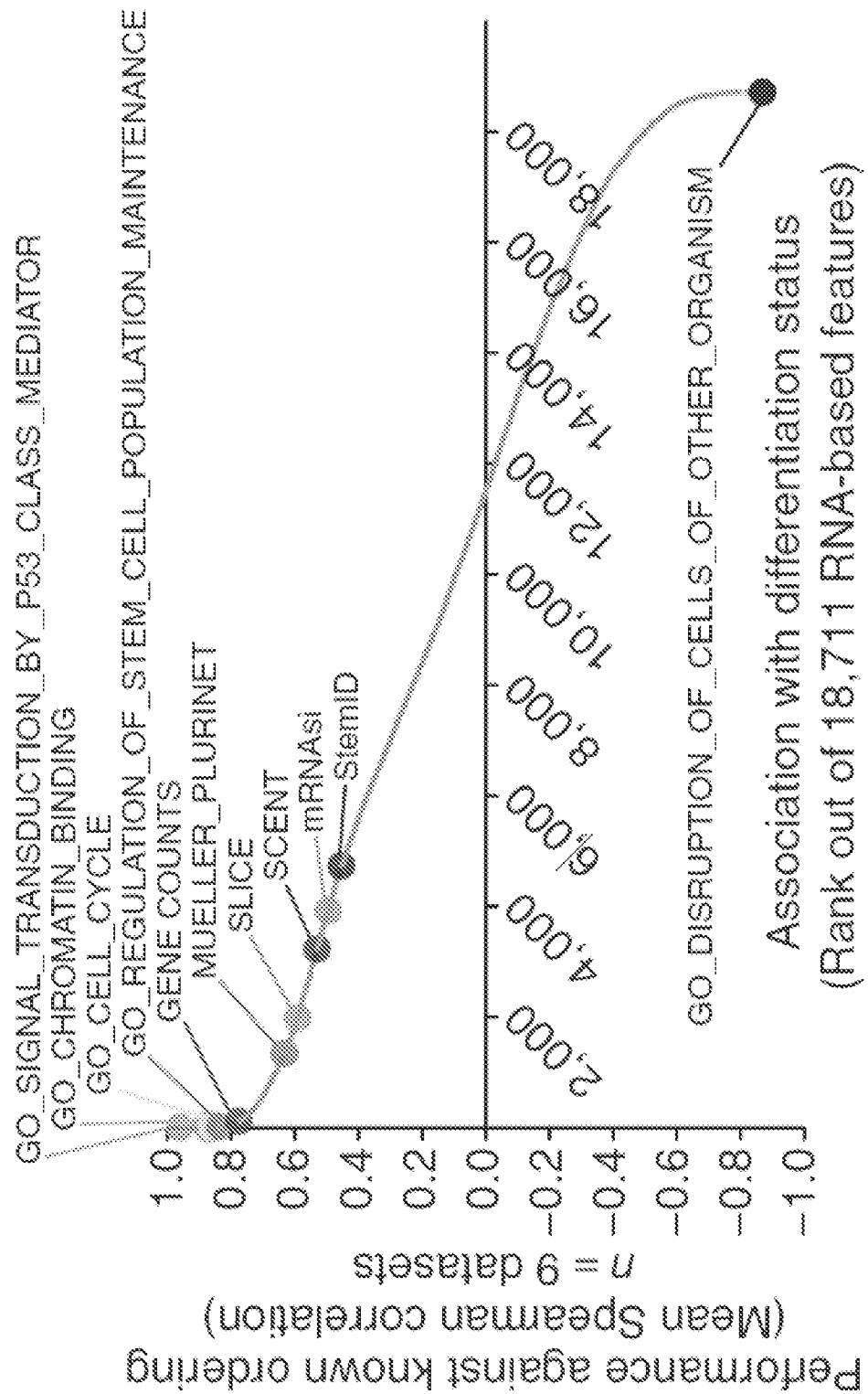
Figure 8:
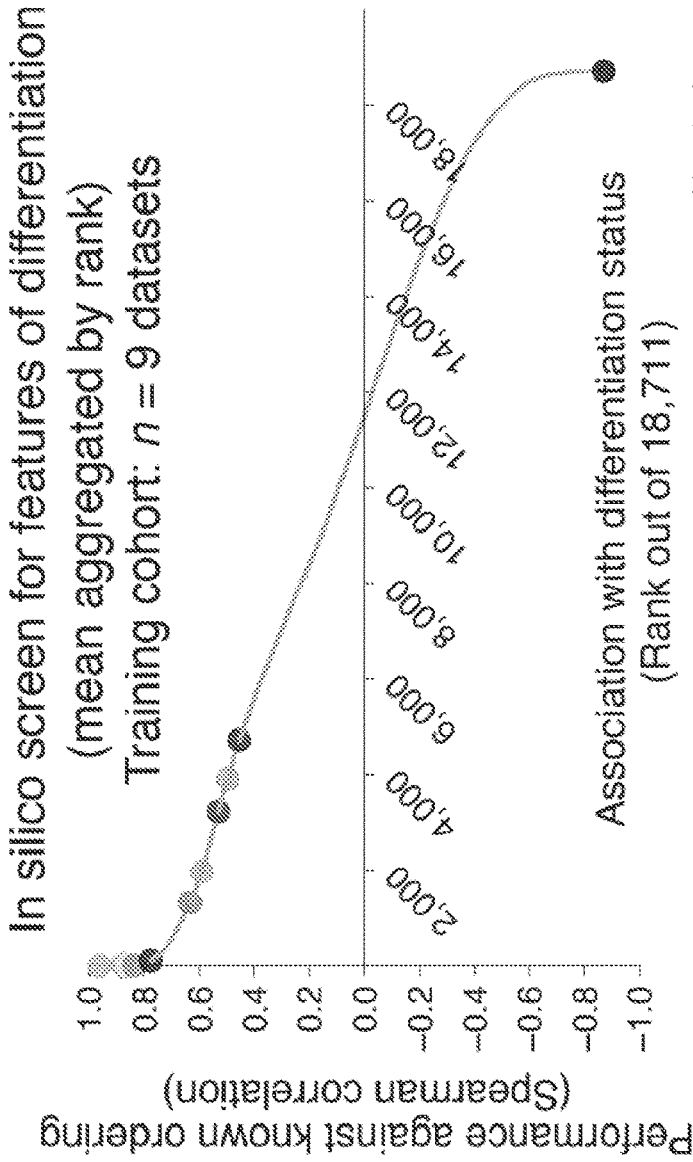
Figure 9:
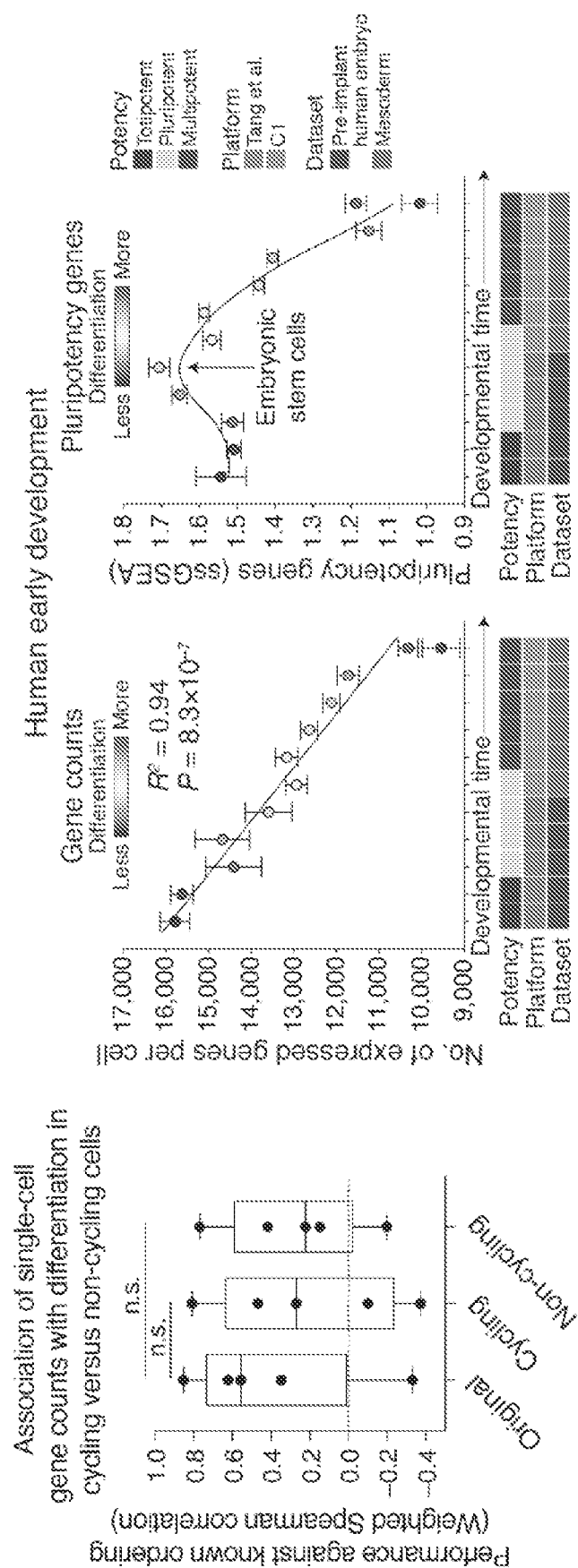
FIG. 9 provides a boxplot showing the association of aggregated gene counts (y-axis) with human pre-implantation embryo development (n=88 cell) from zygote, 2-cell, 4-cell, 8-cell, morulae, to blastocyst stage (x-axis), utilized in accordance with embodiments of the invention.

A gold standard compendium of scRNA-seq datasets with labels of known differentiation status and 17,814 features was assembled to screen for their ability to predict differentiation status. Datasets that have been commonly used by published methods were curated and two other datasets describing hematopoietic and neuronal differentiation. In total, 3,121 single cells and 49 phenotypes across 6 tissues, 4 platforms, and 2 species from 8 studies and 9 datasets were compiled (FIG. 5). The screen included (1) 17,810 gene sets encompassing diverse biological pathways and expression signatures from the MSigDB collection (A. Liberzon, et al., *Cell Syst.* 1, 417-425, (2015); A. Liberzon, et al., *Bioinformatics* 27, 1739-1740, (2011); and A. Subramanian, et al., *Proc. Natl. Acad. Sci. U.S.A.* 102, 15545-15550, (2005); the disclosure of which are each herein incorporated by reference), (2) entropy measurements from 3 stemness prediction tools, StemID (D. Grun, et al., *Cell Stem Cell* 19, 266-277, (2016), the disclosure of which is herein incorporated by reference), Single Cell Entropy (SCENT) (A. E. Teschendorff & T. Enver, *Nat. Commun.* 8, 15599, (2017), the disclosure of which is herein incorporated by reference), and Single Cell Lineage Inference Using Cell Expression Similarity and Entropy (SLICE) (G. Guo, et al., *Nucleic Acids Res.* 45, e54, (2017), the disclosure of which is herein incorporated by reference), that quantify entropy, or the uncertainty of expression, across whole transcriptomes, protein-protein networks, and functional gene set networks, respectively; and, (3) 1 feature of scRNA-seq data, gene counts, or the number of detectable genes, which has been anecdotally reported to associate with differentiation (J. Wang, et al., *Genome Res.* 27, 1783-1794, (2017); B. Treutlein, et al., *Nature* 509, 371-375, (2014); and I. C. Macaulay, et al., *Cell Rep.* 14, 966-977, (2016); the disclosures of which are each herein incorporated by reference). As in previous methods, the measures of differentiation were mean-aggregated by cell phenotype and Spearman-correlated against the known differentiation status of the cell phenotypes (FIG. 6). After scoring each feature by its mean correlation across all datasets in a training cohort, it was found that the highest-ranking measures were genes involved in cell cycle, chromatin structure, stem cell maintenance, and pluripotency, many of which outcompeted existing stemness prediction tools in predicting known differentiation status (FIGS. 7 and 8). Surprisingly, gene counts consistently ordered cell phenotypes across datasets and appeared among the top 0.1% of all 17,814 features in the screen. For example, during human pre-implantation embryo development, the number of detectable genes sequentially decrease from the zygote to the 2-cell, 4-cell, 8-cell, morulae, and blastocyst stages (FIG. 9).

Example 2: Biological Basis of Gene Counts

Figure 10:
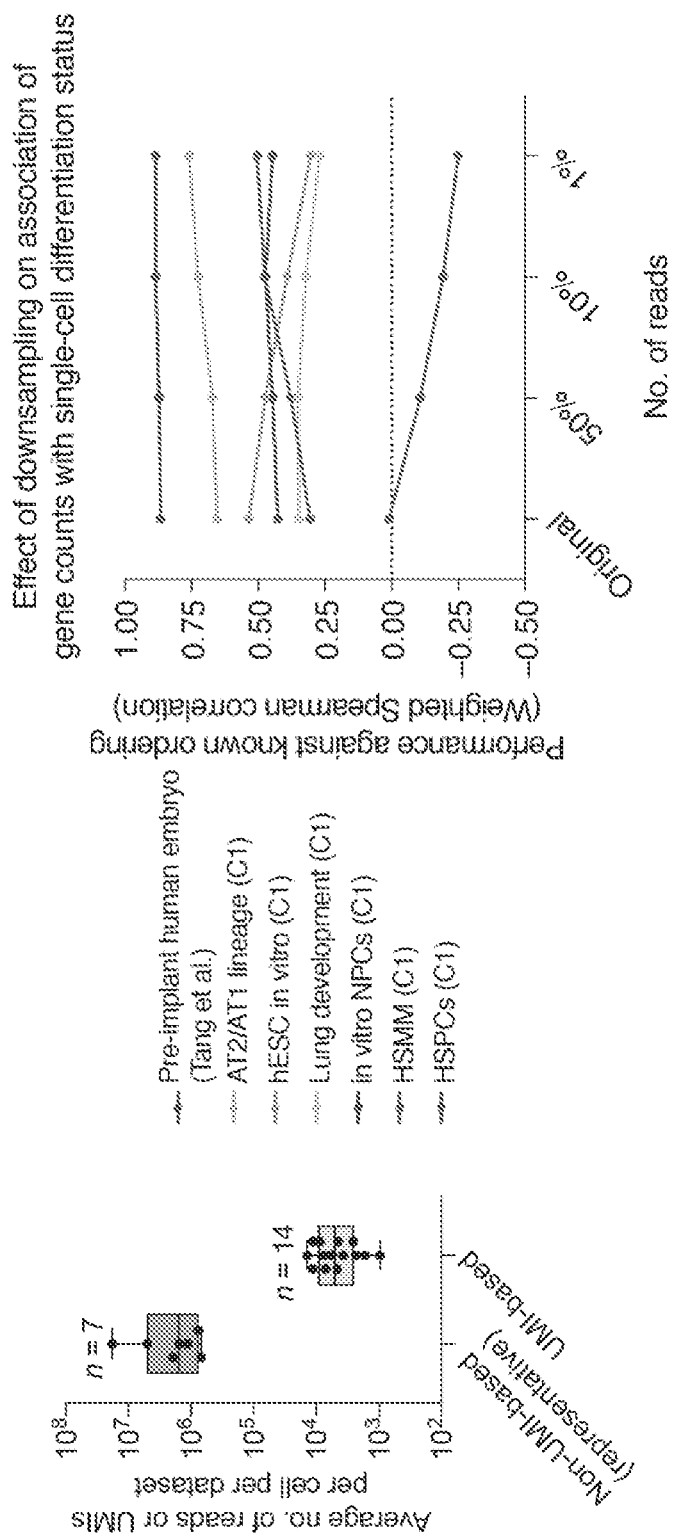
FIGS. 10 and 11 provides line plots showing effect of reads downsampling on the association between gene counts and phenotype differentiation status, utilized in accordance with embodiments of the invention.
Figure 11:
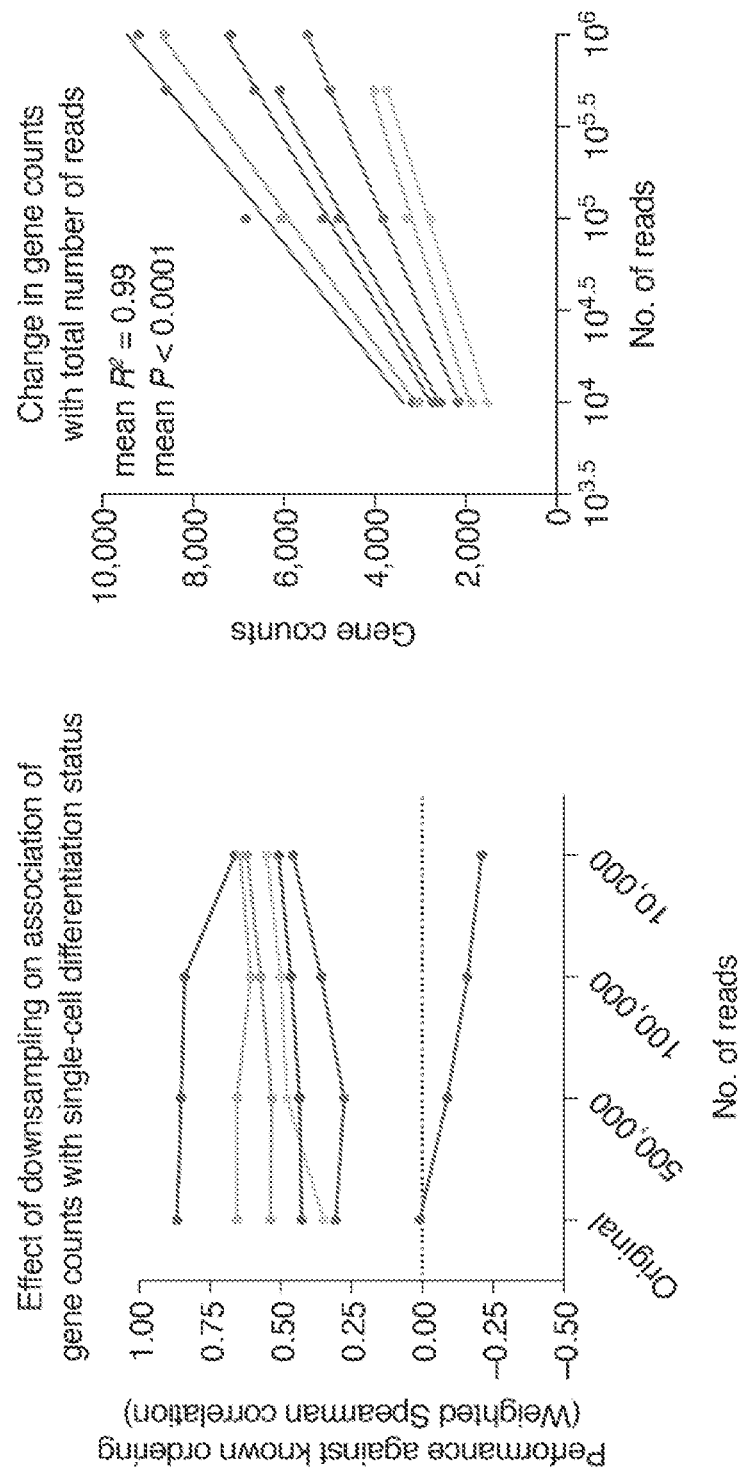
Figure 12A:
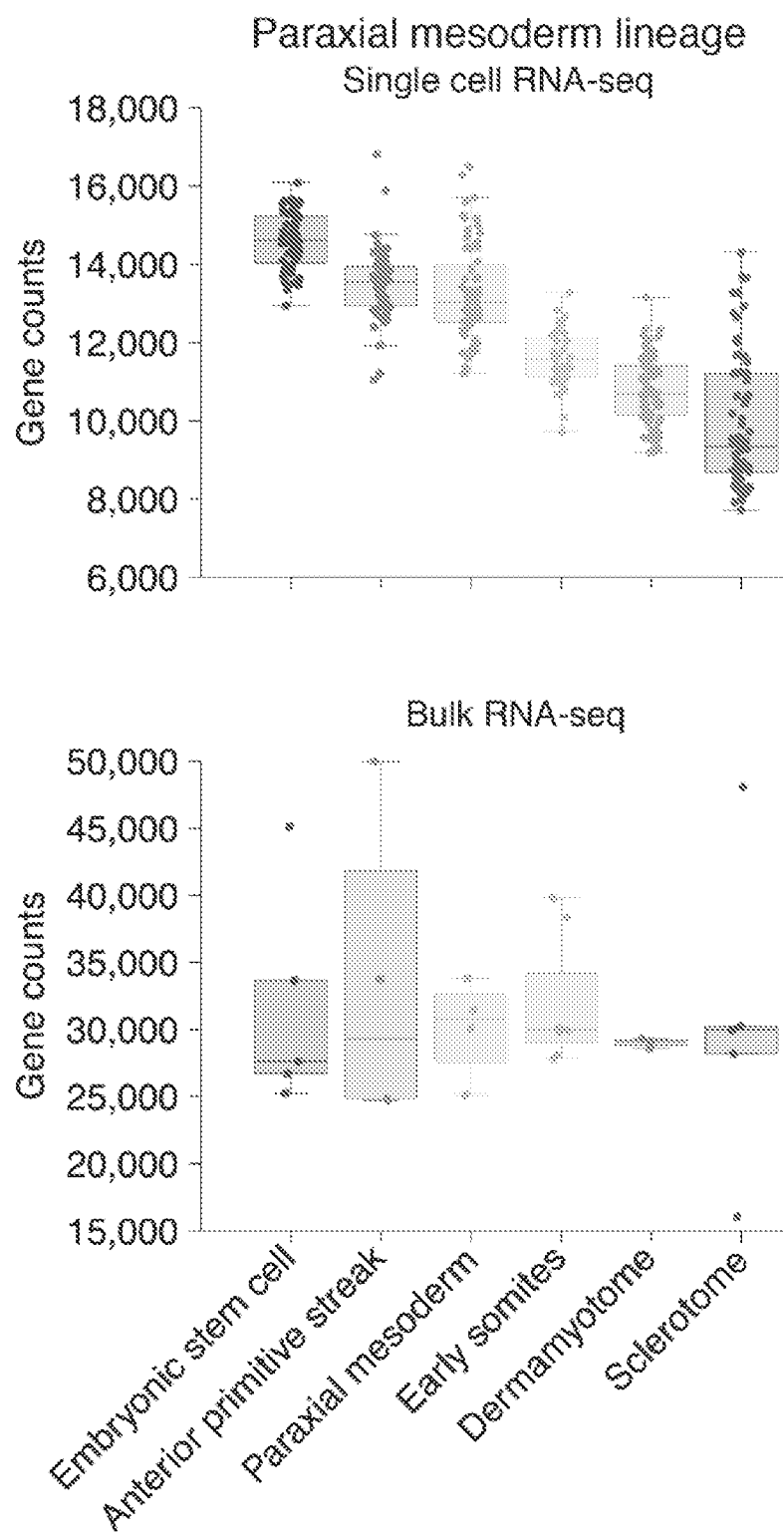
Figure 13B:
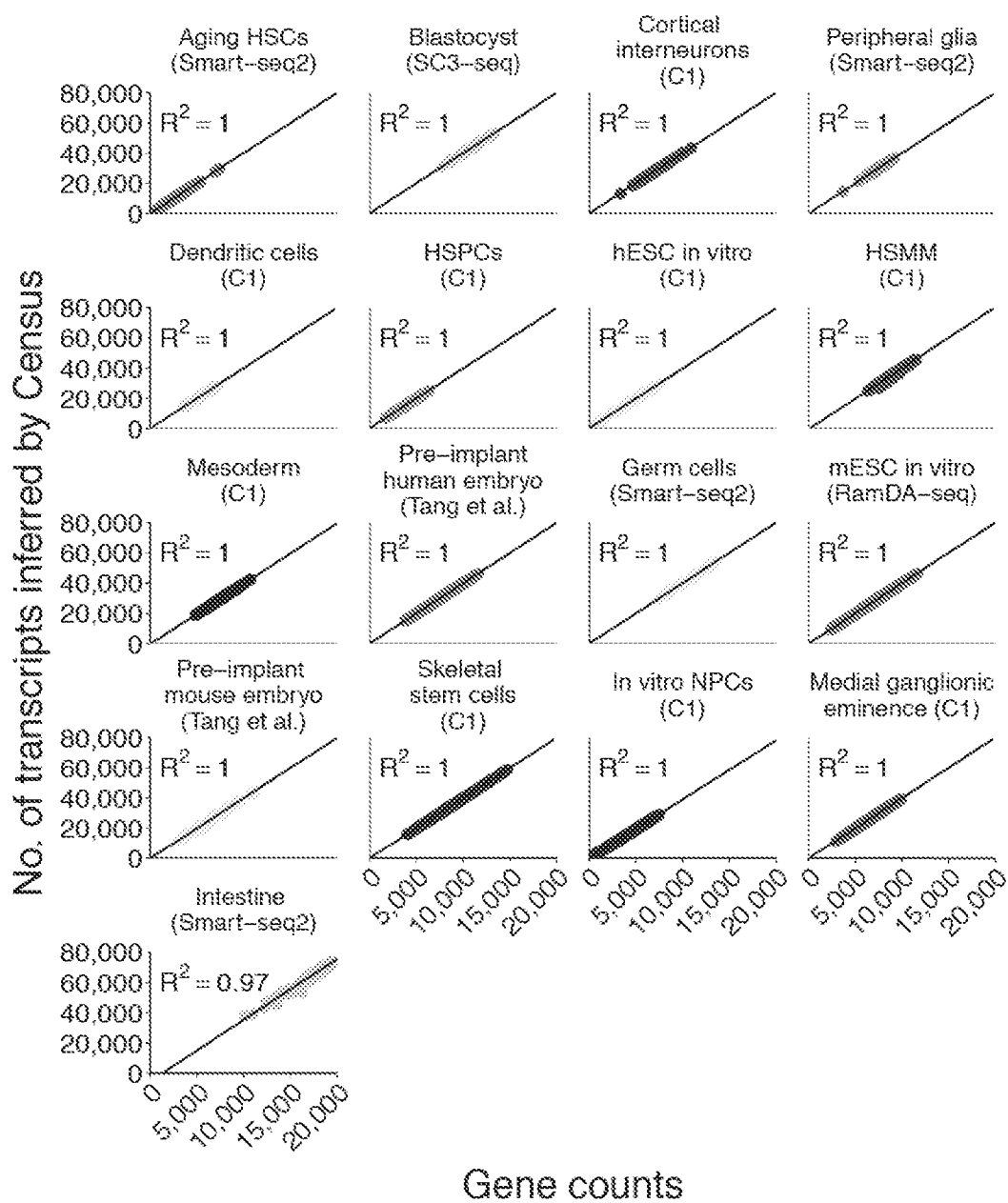
FIG. 13B provides scatterplots showing the association of gene counts (x-axis) with inferred relative transcript abundance by Census (y-axis), utilized in accordance with embodiments of the invention.
Figure 13C:
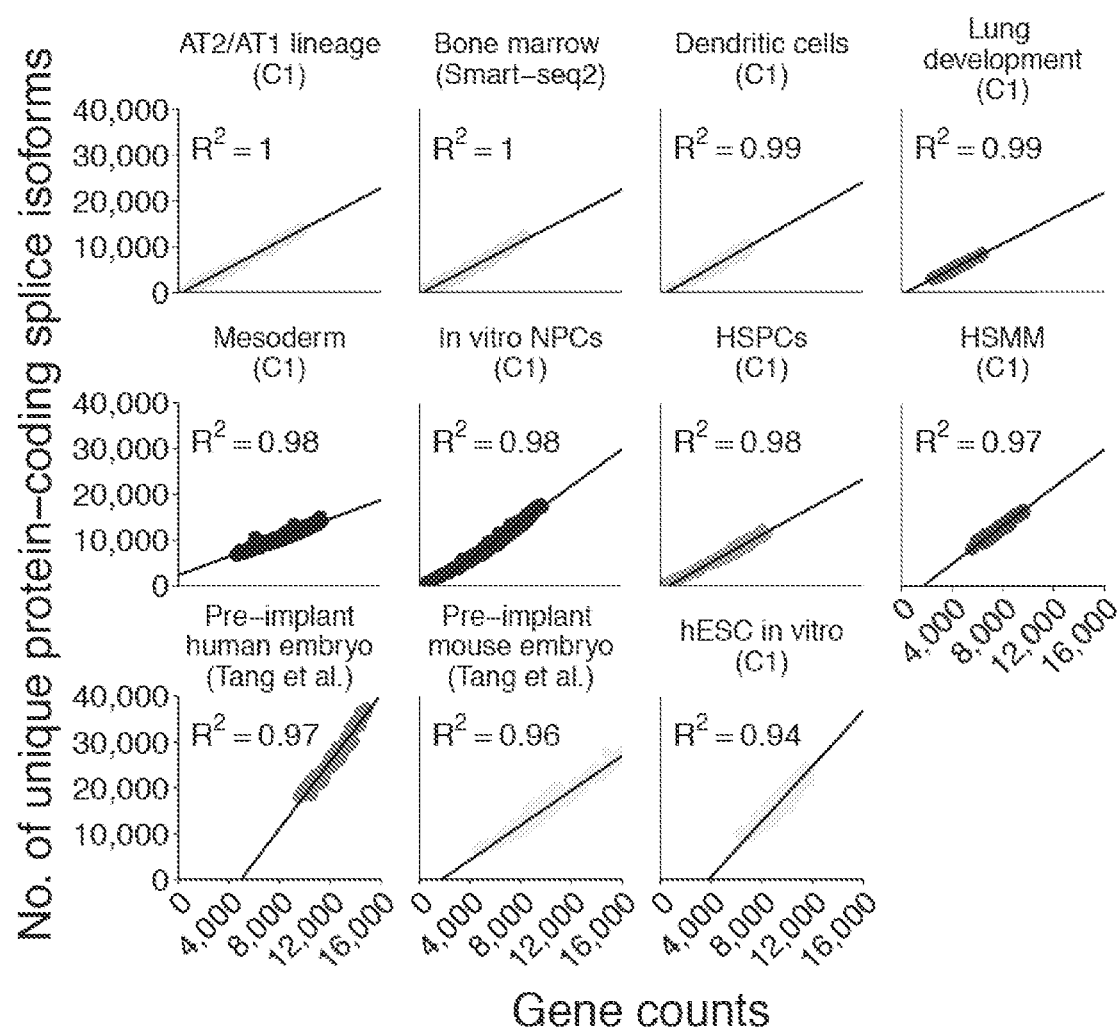
FIG. 13C provides scatterplots showing the association of gene counts (x-axis) with number of unique protein-coding splice isoforms (y-axis), utilized in accordance with embodiments of the invention.

The relationship between gene counts and differentiation was independent of the number of reads per cell. Down sampling the total reads per single cell to as low as 100,000 reads per single cell had minimal effect on the average number of genes captured and the Spearman correlation of gene counts with differentiation status (FIGS. 10 and 11). Moreover, gene counts of pseudo-bulk mixtures created by pooling reads between single cells of the same phenotype was a poorer predictor of differentiation status compared to single cell gene counts mean aggregated by phenotype (FIGS. 12A, 12B, and 12C). This suggested that this relationship was specific to scRNA-seq data and explained why it was not observable before with bulk gene expression. It was also found that gene counts correlated with various measures of RNA content, including the number of unique molecular identifiers (UMIs), the inverse amount of spike-in RNA (e.g. ERCC), and relative transcript counts as quantified by Census, an algorithm that exploits the rate of mRNA capture in full-length scRNA-seq to infer total RNA content from relative RNA-seq expression levels (FIGS. 13A, 13B, and 13C) (for more on Census, see X. Qiu, et al., *Nat. Methods* 14, 309-315, (2017), the disclosure of which is herein incorporated by reference). Predictive performance was also minimally impacted when varying the expression threshold for calculating the number of genes per cell and was unaffected by removal of potential doublets (FIG. 14).

Figure 15:
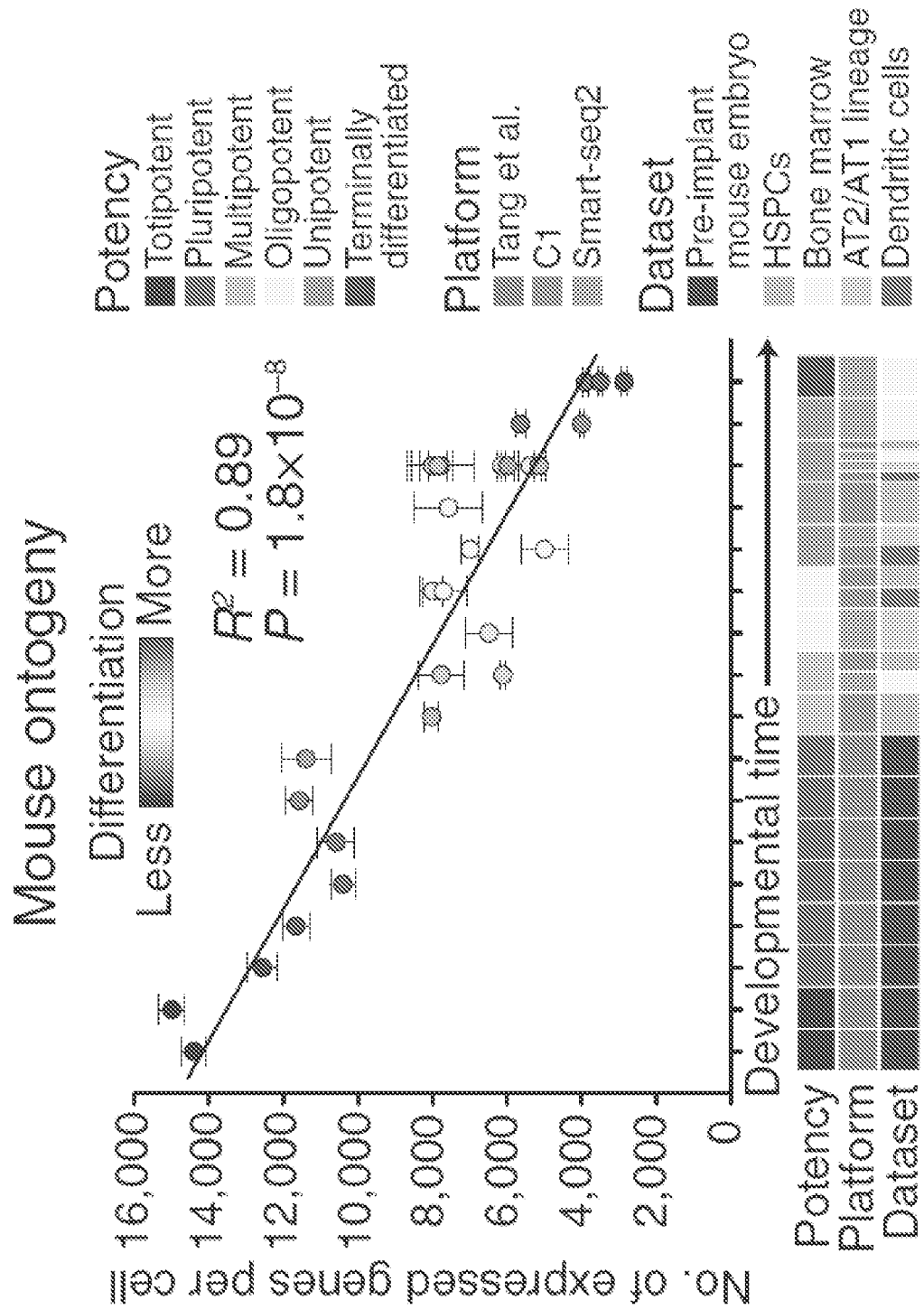
FIG. 15 provides boxplots showing the ontological ordering of cells from totipotent stem cells to differentiated cells by gene counts (Toti: totipotent stem cell, Pluri: pluripotent stem cell, Multi: multipotent stem cell, MultiP: multipotent progenitor, OligoP: oligopotent progenitors, UniP: unipotent progenitors, D: differentiated cells), generated in accordance with embodiments of the invention.

The biological signal underlying gene counts was further explored. The robustness of gene counts to down sampled reads led to ask whether saturated gene counts could serve as an absolute measure of differentiation status in the ontological spectrum from a totipotent stem cell to a terminally differentiated cell. 73 phenotypes were classified into 7 potency categories (totipotent, pluripotent, multipotent stem, multipotent progenitor, oligopotent progenitor, unipotent progenitor, and differentiated) and then further subdivided hierarchically based on ground truth ordering. Interestingly, gene counts predicted ontogenesis from totipotent stem cells to terminally differentiated cells across all plate-seq datasets ($R^2=0.89$; $P<0.0001$) (FIG. 15). Importantly, this relationship was also observed in other organisms, including *C. elegans* (FIG. 16B) and zebrafish, suggesting it is a general feature of cellular ontogeny.

Figure 17A:
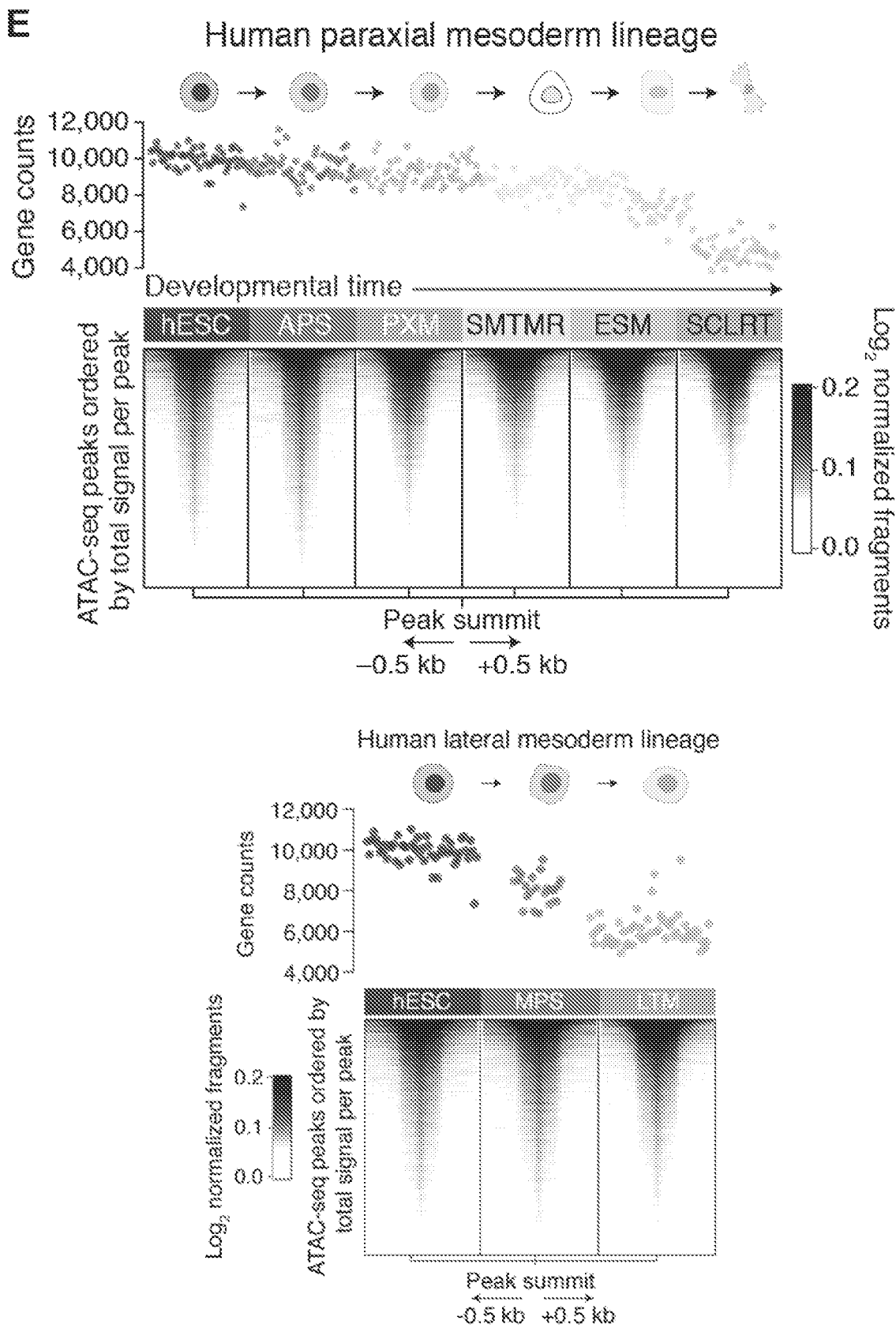
FIG. 17A provides: a schema showing the differentiation process during mesoderm differentiation across two lineages, anterior and middle primitive streak differentiation (top row left), and bone marrow development across two lineages, myeloid and lymphoid differentiation (top row right); heat maps for mesoderm differentiation (middle row left) and bone marrow development (middle row right) showing the mean aggregated gene counts per phenotype (y-axis) as a function of differentiation (x-axis); and heat maps for mesoderm differentiation (bottom row left) and bone marrow development (bottom row right) showing the number of detectable peaks (y-axis) as a function of differentiation (x-axis); utilized in accordance with embodiments of the invention.
Figure 17B:
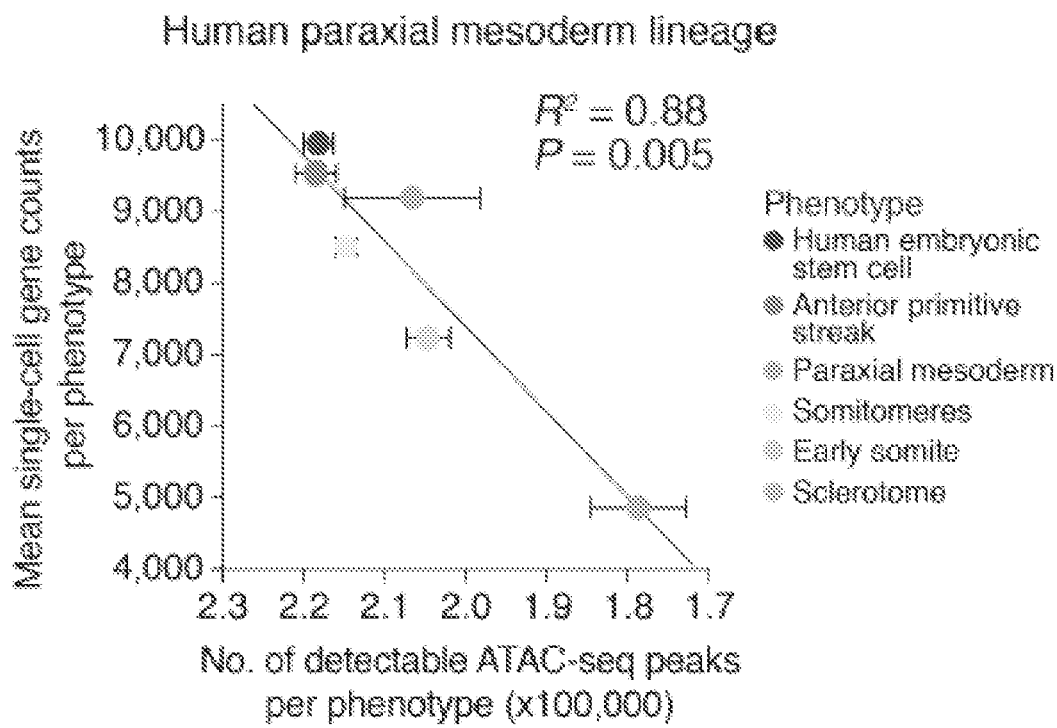
FIG. 17B provides a scatterplot showing the concordance between the average number of single-cell gene counts per phenotype and the number of ATAC-seq peaks per phenotype, generated in accordance with embodiments of the invention.
Figure 17C:
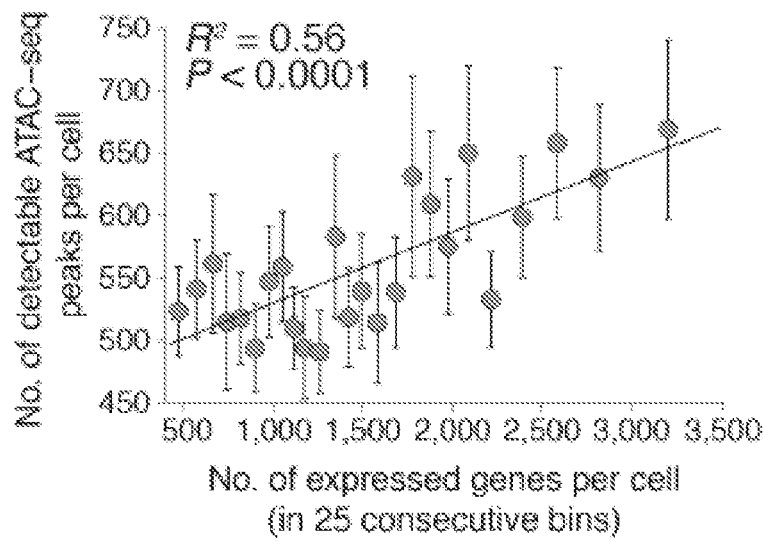
FIG. 17C provides an association between transcriptional diversity and chromatin accessibility in jointly profiled single A549 adenocarcinoma cells, generated in accordance with embodiments of the invention, generated in accordance with embodiments of the invention.
Figure 17D:
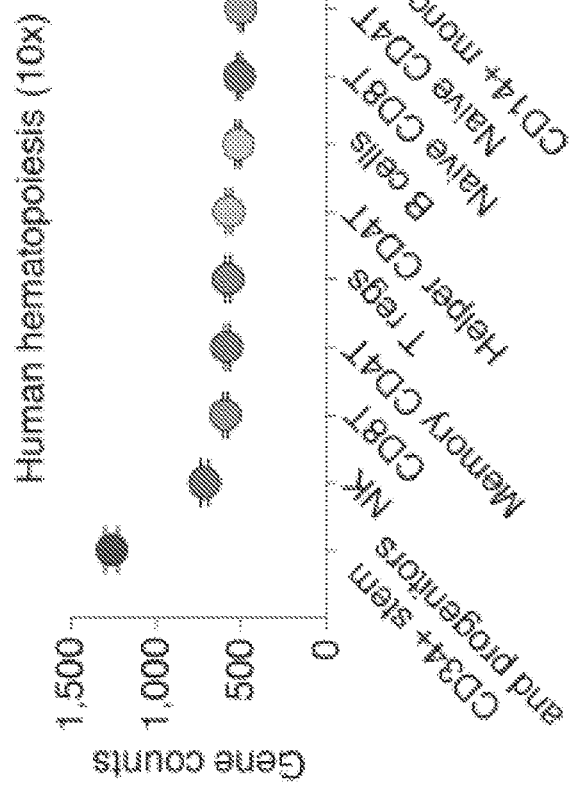
FIGS. 17D and 17E provide a decrease in gene counts and chromatin accessibility with human hematopoietic differentiation.
Figure 17E:
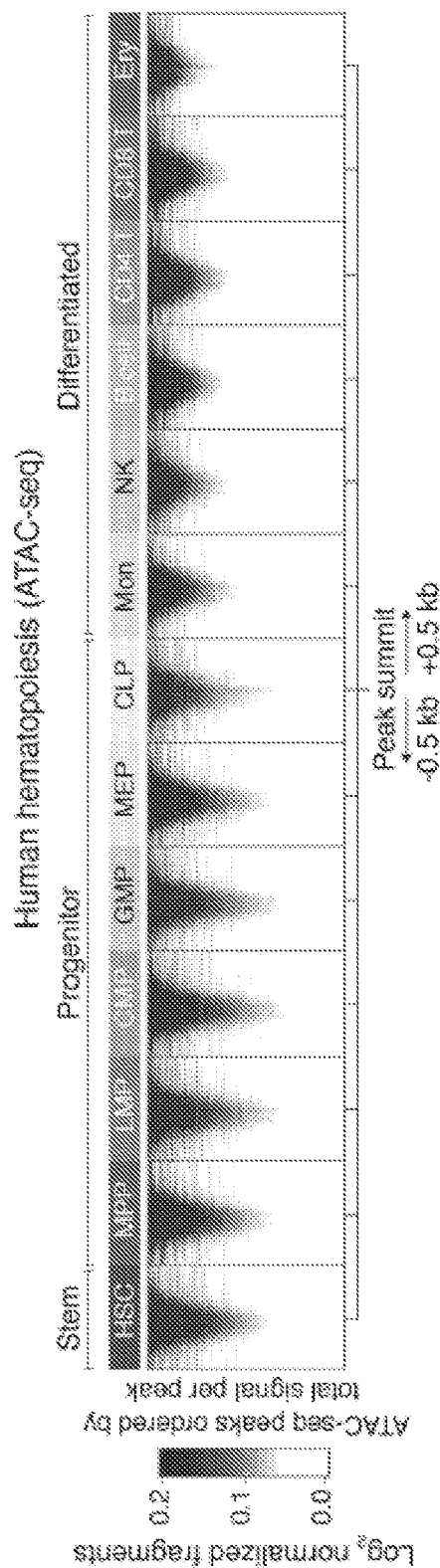

Furthermore, given the strong association of gene counts with total RNA content, it was hypothesized that gene counts may approximate the ratio of euchromatin to heterochromatin in a single cell. It has been previously reported that chromatin accessibility decreases with differentiation, resulting in reduced transcriptome availability and restricted gene expression. However, this has not been quantitatively explored in the context of cellular differentiation. Gene counts were compared with chromatin accessibility as quantified by the total number of accessible peaks, in a study of in vitro mesodermal differentiation with paired scRNA-seq and ATAC-seq data (FIG. 17 (top row)) (see K. M. Loh, et al., *Cell* 166, 451-467, (2016), the disclosure of which is herein incorporated by reference). Gene counts strongly correlated with mesodermal differentiation of human embryonic stem cells (hESCs) to dermomyotomes and sclerotomes (anterior primitive streak lineage) and lateral mesoderm (middle primitive streak lineage) (FIG. 17A (middle row)). The number of accessible peaks also decreased with differentiation (FIG. 17A (bottom row)). A similarly paired decrease was observed in gene counts and the number of accessible peaks during human hematopoietic stem cell differentiation (FIG. 17A). This suggested that gene counts may be a proxy for single cell chromatin accessibility. A strong concordance was observed between the number of accessible peaks and the mean number of detectably expressed genes per phenotype (FIG. 17B). Similar patterns were observed for lung adenocarcinoma cells jointly profiled by ATAC-seq and RNA-seq (sci-CAR) and for human hematopoiesis, supporting the generality of this result (FIGS. 17C to 17E).

Example 3: Development of CytoTRACE

Figure 18A:
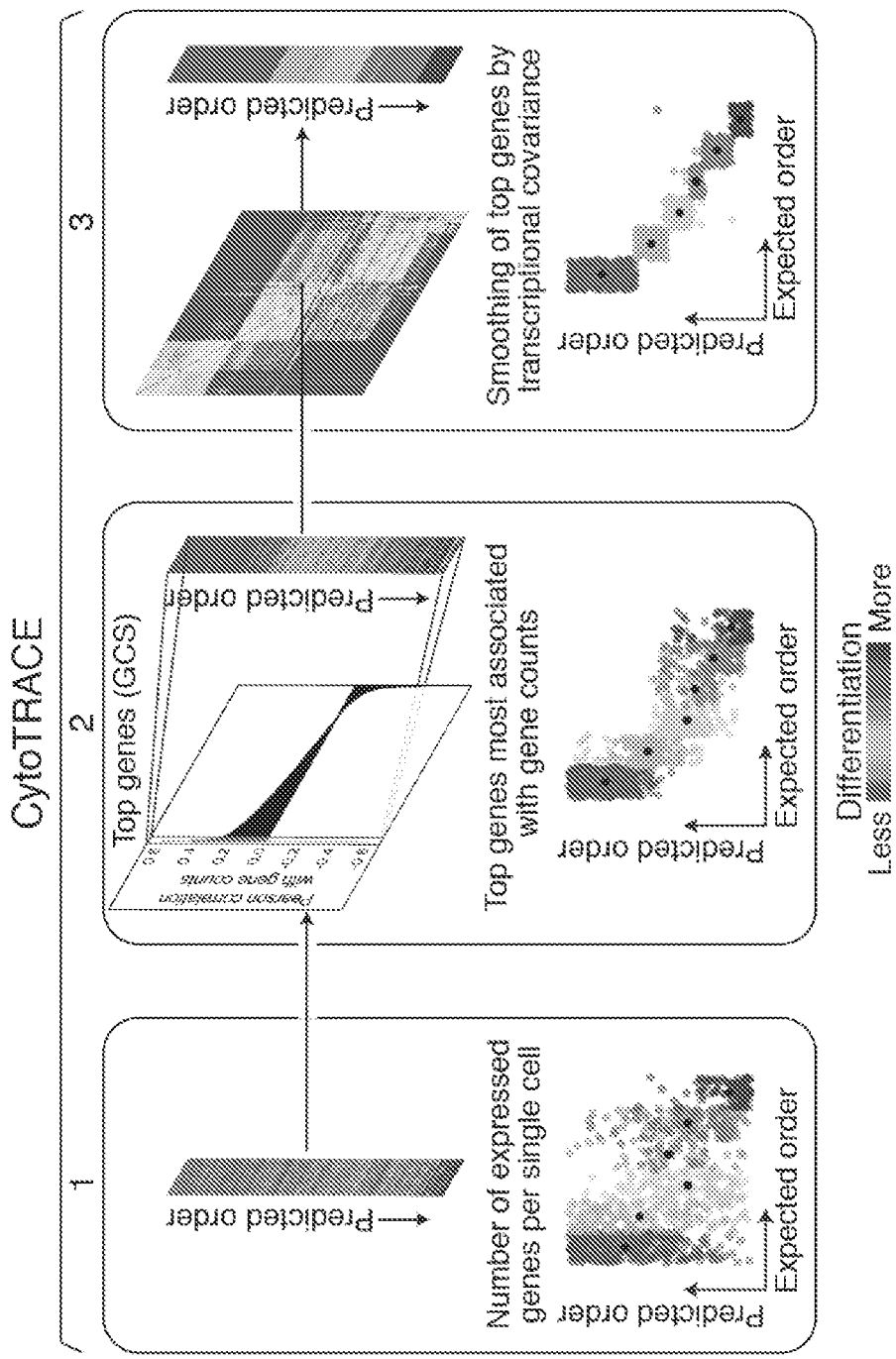
Figure 19B:
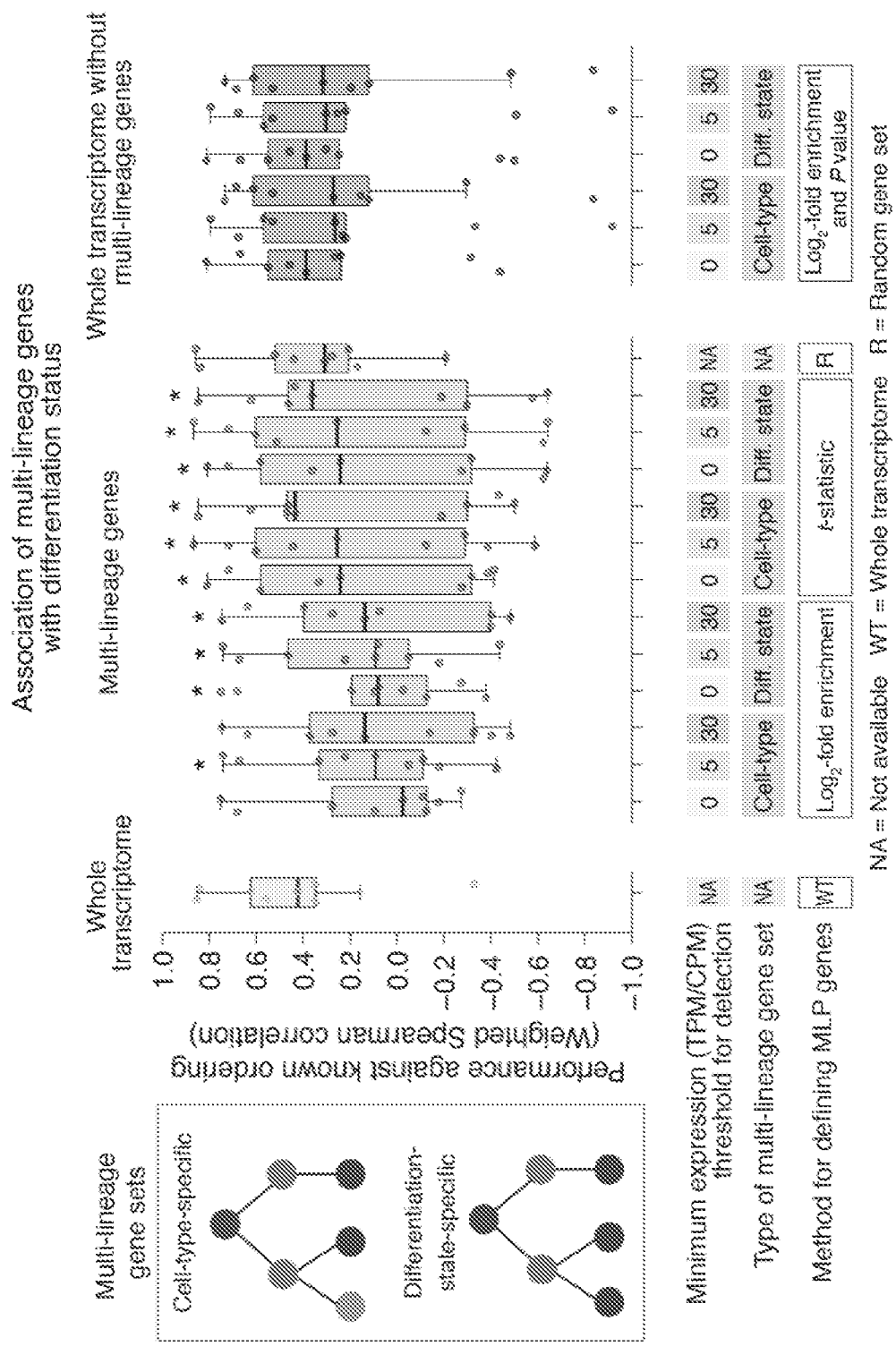
FIGS. 19B to 19D provide analysis of multi-lineage genes, non-multi-lineage-genes, randomly selected genes, and all genes in the transcriptome versus developmental potential. The left panel of FIG. 19B illustrates a schematic for defining cell type-specific genes and differentiation-specific genes. The right panel of FIG. 19B provides boxplots comparing the performance of the following measures for predicting developmental potential: (i) the number of detectably expressed genes per cell, where the whole transcriptome was evaluated (yellow), (ii) the number of detectably expressed genes per cell, where only multi-lineage gene sets (cell type-specific or differentiation state-specific) filtered at different expression thresholds were evaluated (red), and (iii) the number of detectably expressed genes per cell, where the whole transcriptome was assessed after the removal of multi-lineage genes filtered at different expression thresholds (blue).

Although gene counts reliably predicted the ordering of cells when they were aggregated by known phenotypes, in some datasets, such as the in vitro differentiation of human ESCs into the gastrulation layers, single cell gene counts was noisy with high intra-phenotype variance (FIG. 18A (left panel)). When benchmarked against the 17,814 measures, 495 measures outperformed gene counts in predicting the order of single cells by their known differentiation status (FIGS. 18B and 19A). The noisiness in gene counts may be due to mRNA capture inefficiency upon lysis, PCR amplification biases, or other technical confounders during scRNA-seq. Therefore, it was reasoned, as scRNA-seq was designed to capture gene expression not gene counts per single cell, genes whose expression correlate with gene counts may better capture the ordering of single cells by differentiation status. Surprisingly, by taking the geometric mean of the top 100 genes most correlated with gene counts, the gene counts signature (GCS) markedly denoised the original gene counts measure (FIG. 18A (center panel)). By adaptively selecting the key genes associated with differentiation in each dataset, GCS outperformed all 17,814 measures and became the best measure for predicting the order of single cells by differentiation status in the training cohort (FIG. 19A).

Figure 19D:
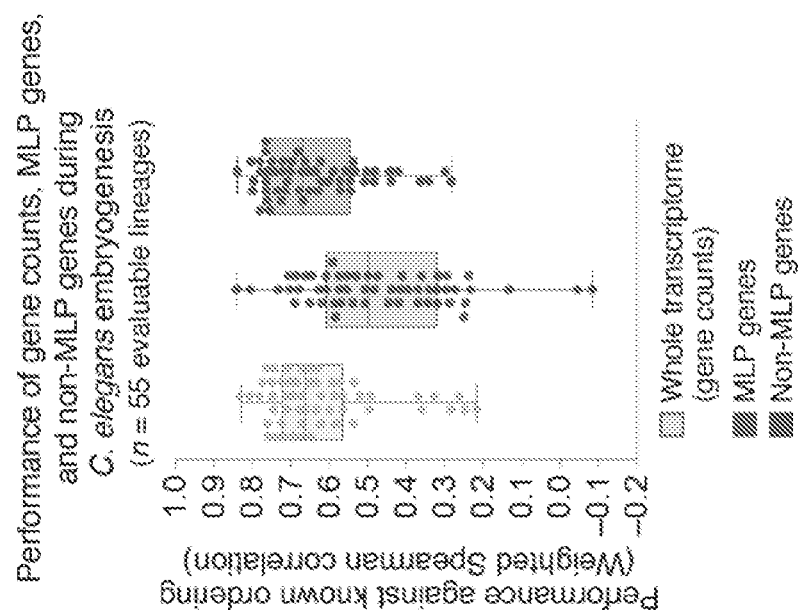
Figure 19C:
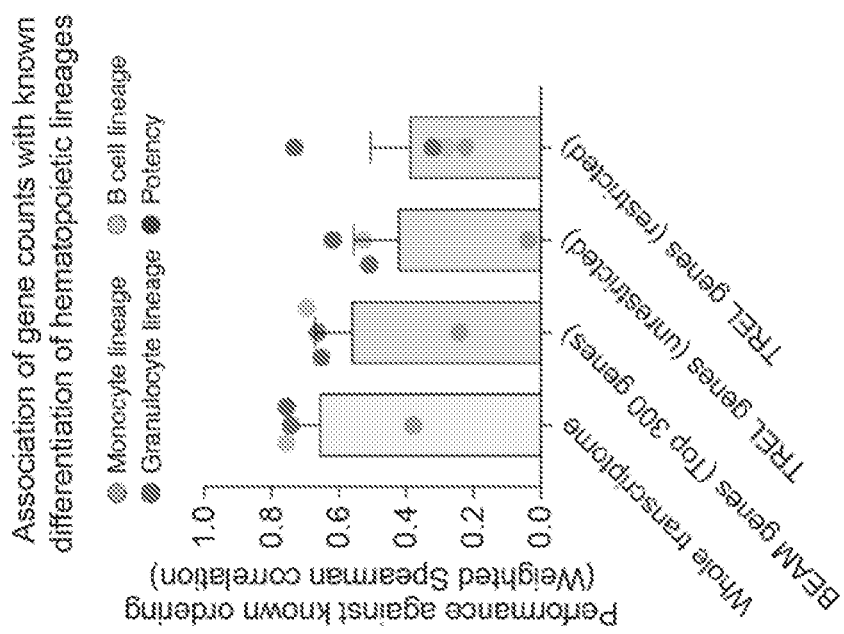
Figure 20A:
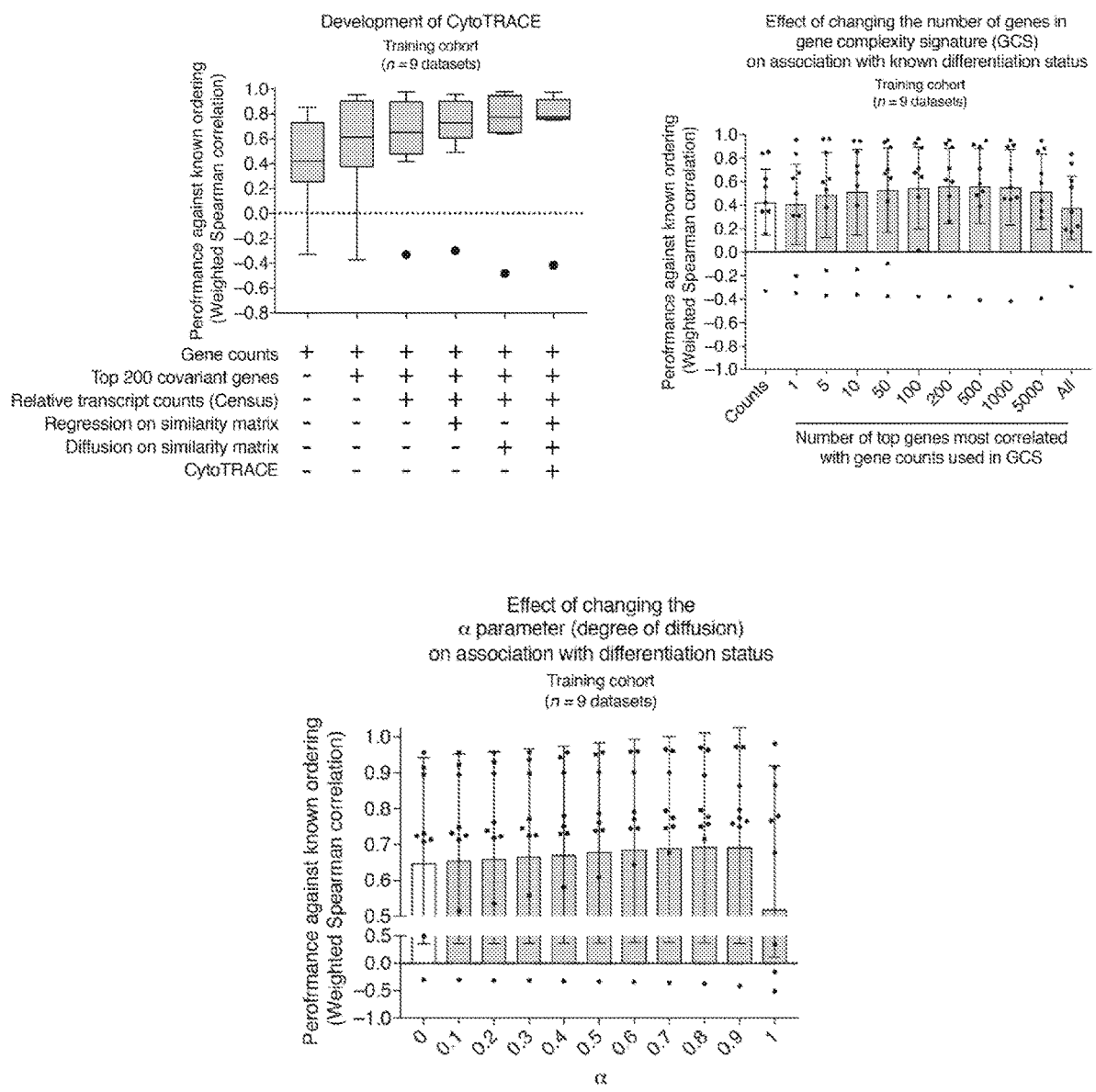
FIGS. 20A and 20B provide bar plots showing: the effect of the number of top genes most correlated with gene counts used to calculate the gene counts signature (GCS) on association with known differentiation status (top left panel); the effect of changing the α parameter, which affects the degree of diffusion applied to the input, on association with known differentiation status (bottom left panel); and the change in association with known differentiation status with sequential development of CytoTRACE from gene counts (top right panel); utilized in accordance with embodiments of the invention.
Figure 20B:
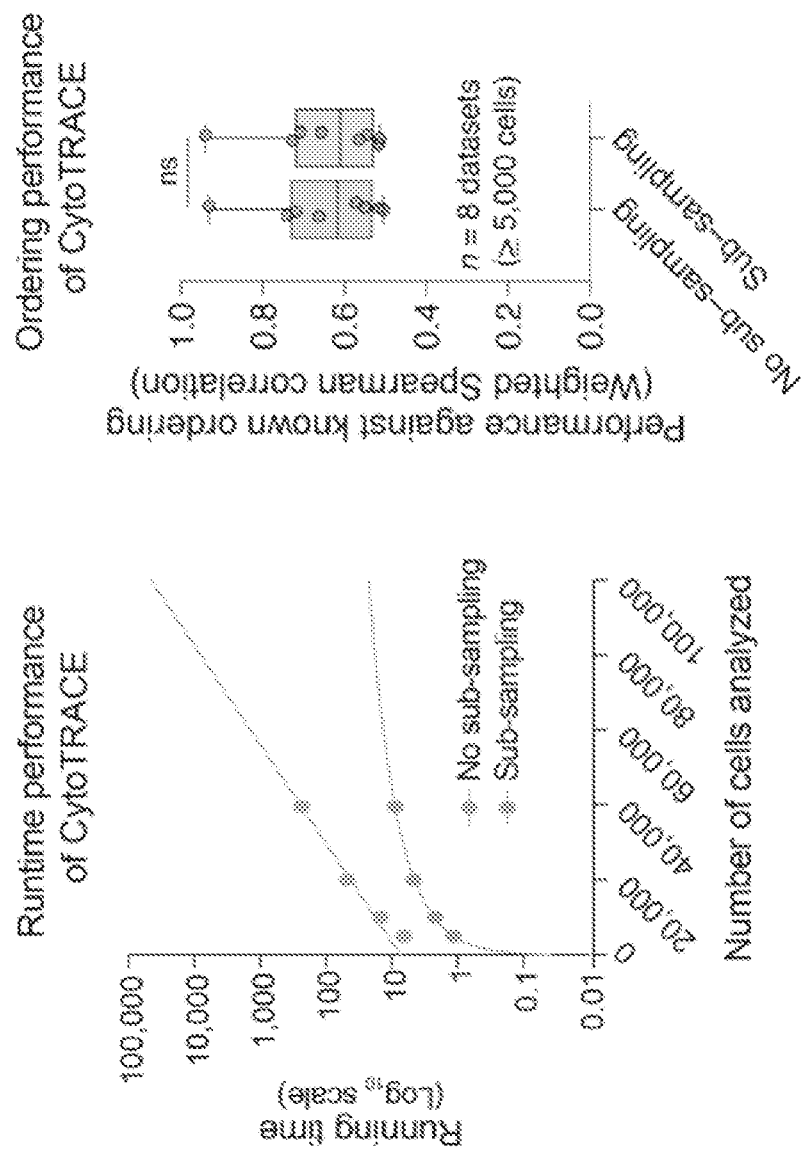
Figure 20C:
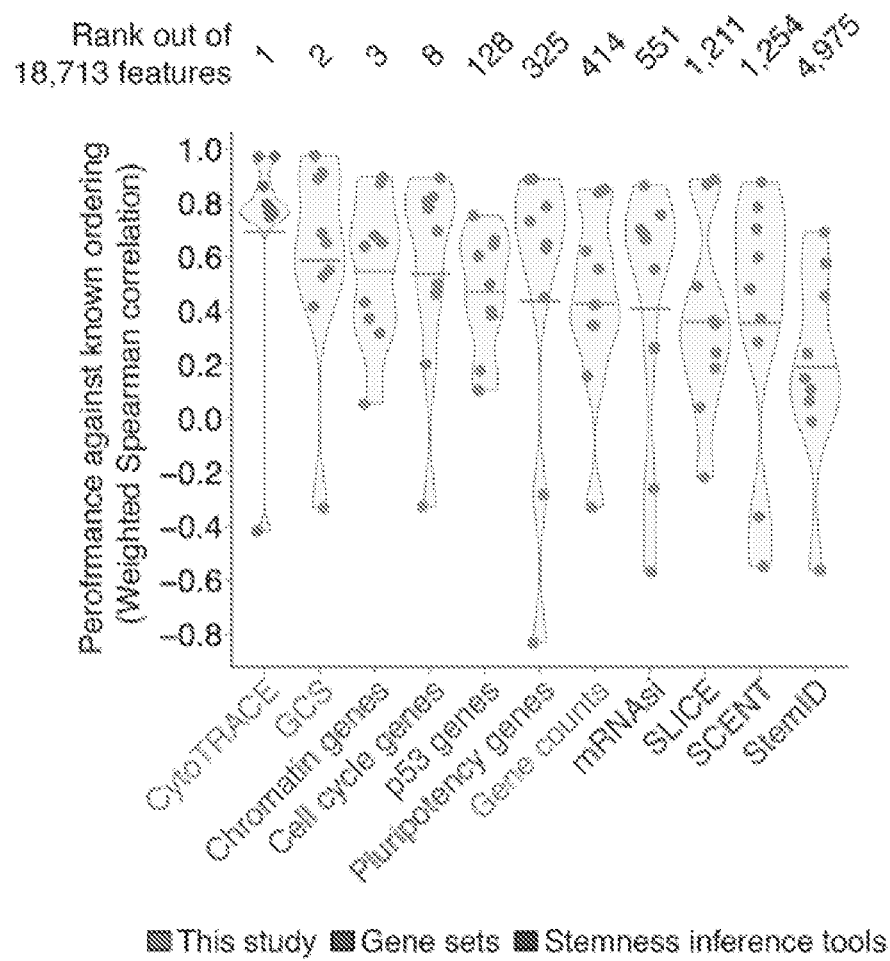
FIG. 20C provides confidence interval bars with individual points showing the performance of CytoTRACE against GCS, gene counts, SLICE, SCENT, StemID, and top differentiation-associated gene sets in the training cohort (n=9 datasets), generated in accordance with embodiments of the invention.

GCS, like gene counts, is inherently insensitive to dropout events, agnostic to prior knowledge of developmentally regulated genes, and not solely attributable to multi-lineage priming (FIGS. 19B to 19D) or a known molecular signature. Despite this huge improvement in the prediction of differentiation status, GCS was still observably noisy and, although underpowered by the few datasets, its increase in performance was not statistically significant in the training cohort. Given the sparsity of information in scRNA-seq data, there can be considerable noise in gene expression among otherwise transcriptionally similar cells. Therefore, to further denoise GCS and reduce intra-phenotypic variance, GCS across transcriptionally similar neighbors was smoothed by applying a two-step procedure using non-negative least squares (NNLS) regression followed by diffusion (FIGS. 18A (right panel) and 20A). This refined measure, which we call CytoTRACE (Cell (Cyto) TRAjectory Analysis by gene Counts and Expression), significantly outperformed GCS and all 17,814 measures in predicting the order of single cells by differentiation status (FIGS. 18B and 20B).

Example 4: Performance Evaluation Across Tissues, Species, and Platforms

Figure 21:
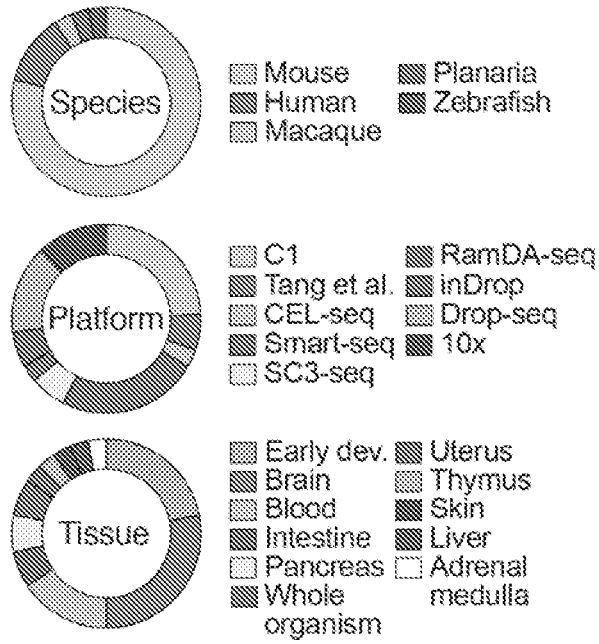
FIG. 21 provides a Box diagram and pie charts showing the composition of the validation cohort of scRNA-seq datasets (n=33) used to benchmark CytoTRACE against existing approaches for predicting differentiation status with respect to species, scRNA-seq platforms, and tissues analyzed, utilized in accordance with embodiments of the invention.
Figure 22:
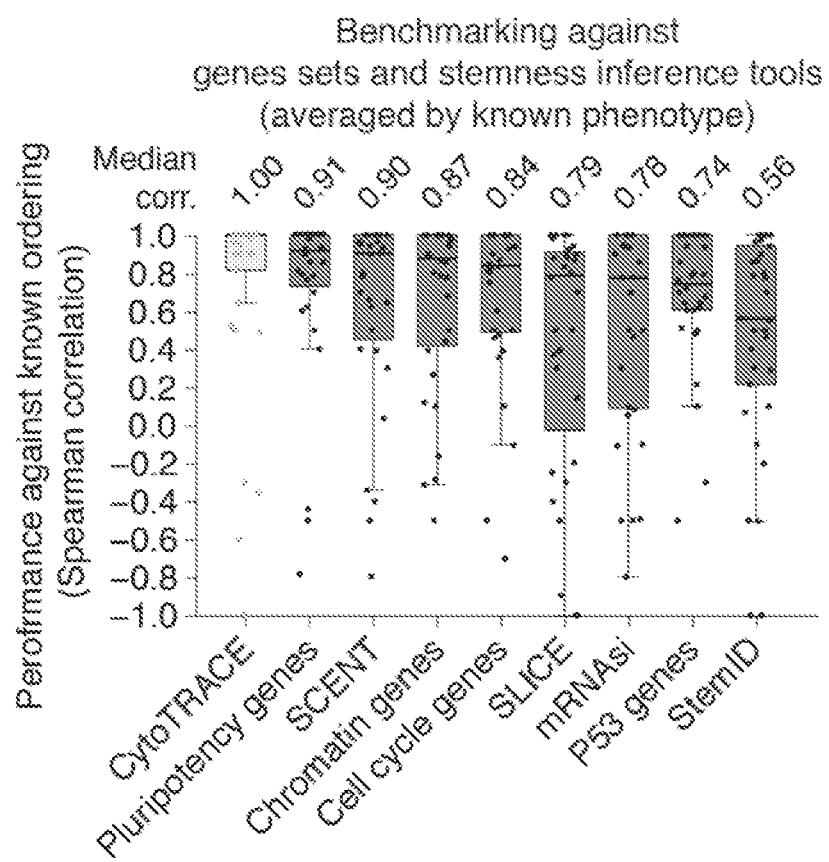
FIG. 22 provides boxplots showing the performance of CytoTRACE benchmarked against gene sets and stemness inference tools, generated in accordance with embodiments of the invention.

Next, to evaluate the generalizability of CytoTRACE, the method was validated on an expanded compendium of scRNA-seq data. scRNA-seq datasets were selected representative of diverse developmental and differentiation processes, excluding cell maturation, metabolic shifts, or response to stimuli, and for which single cell annotations of known differentiation status were available. The validation cohort consisted of 233,348 single cells and 341 phenotypes across 11 tissues, 8 platforms, and 5 species from 25 studies and 31 datasets (FIG. 21). The top differentiation-associated gene sets from the in silico screen were first benchmarked and the entropy measurements from StemID, SCENT, and SLICE on the held-out set. CytoTRACE significantly outperformed these features and correctly predicted the direction of differentiation in 85% (28 out of 33 datasets) of the validation cohort (FIGS. 18B, 20A, and 22).

Figure 23:
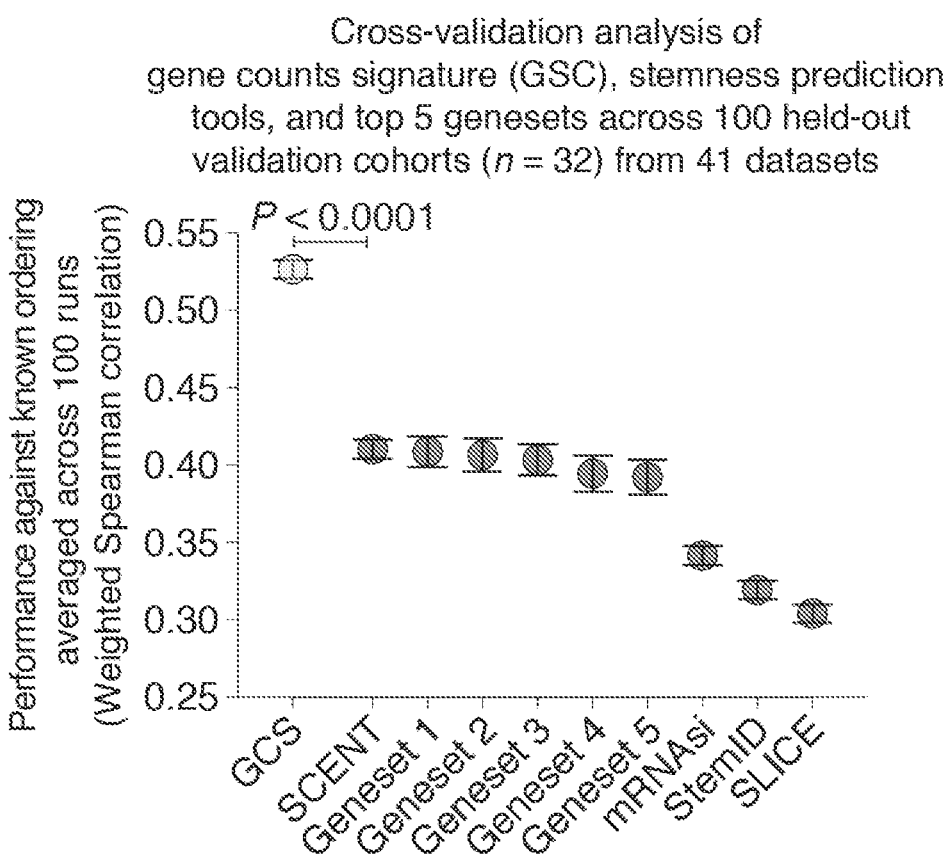
FIG. 23 provides analysis of gene counts signature (GCS) without denoising versus the performance of previous methods and top-ranking gene sets from 100 randomly split training/validation cohorts, utilized in accordance with various embodiments of the invention. In each iteration, 9 training datasets were randomly selected (to match the size of the training cohort) from a set of 41 benchmarking datasets (excluding the planaria dataset). The top 5 gene sets (of 18,706) were then determined based on their single-cell Spearman correlation with known differentiation states as described in methods. GCS, four stemness inference methods, and the top 5 gene sets were subsequently evaluated in the 32 held-out validation datasets for their ability to predict known developmental orderings. This was done at the single-cell level using weighted Spearman correlation (rho), as described in methods. The mean rho ±95% confidence interval across 100 cross-validation runs is shown for each feature. The top 5 gene sets shown represent the mean of the top 5 gene sets from all runs.
Figure 24:
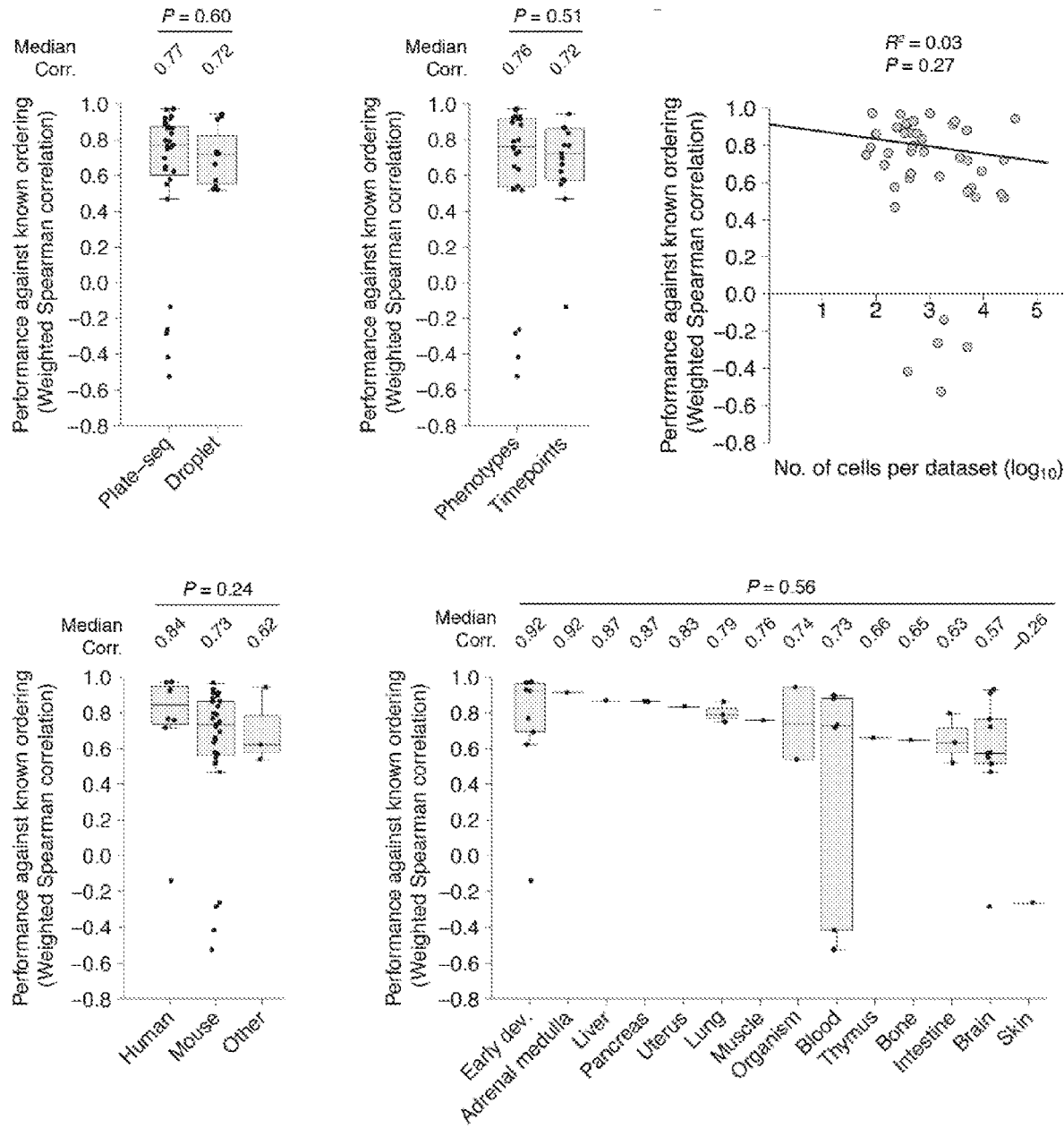
FIG. 24 provides predictive performance of CytoTRACE across platforms, species, biological systems, and experimental designs for all datasets in this study (n=42), utilized in accordance with various embodiments. Performance was evaluated as the weighted (by number of cells per phenotype) Spearman correlations between CytoTRACE and known differentiation status. The top left panel provides boxplots Performance was evaluated as the weighted (by number of cells per phenotype) Spearman correlations between CytoTRACE and known differentiation status. The top center panel provides boxplots comparing the performance of CytoTRACE in scRNA-seq datasets describing development over a time series versus differentiation of known phenotypes. The top right panel provides a scatter plot showing the association between the number of cells per dataset (x-axis) and CytoTRACE performance (y-axis). The bottom left panel provides boxplots comparing the performance of CytoTRACE in scRNA-seq datasets from mouse, human, or 'other' species (macaque, zebrafish, and planaria). The bottom right panel provides boxplots comparing the performance of CytoTRACE in scRNA-seq datasets from 14 different biological systems, including 12 distinct tissues.

CytoTRACE was benchmarked against 6 lineage trajectory inference methods that were shown to most accurately predict ordering in recent single-cell trajectory benchmarking studies. These methods, which include Embeddr (K. Capbell, C. P. Ponting, & C. Webber, bioRxiv (2015), the disclosure of which is herein incorporated by reference), Monocle DDRTree (X. Qiu, et al., Nat. Methods 14, 979-982, (2017), the disclosure of which is herein incorporated by reference), SCORPIUS (R. Cannoodt, et al., bioRxiv (2016), the disclosure of which is herein incorporated by reference), Slingshot (K. Street, et al., BMC Genomics 19, 477, (2018), the disclosure of which is herein incorporated by reference), Single-cell Trajectories Reconstruction, Exploration And Mapping of omics data (STREAM) (H. Chen, et al., bioRxiv (2018), the disclosure of which is herein incorporated by reference), and Tools for Single-Cell Analysis (TSCAN) (Z. Ji & H. Ji, Nucleic Acids Res. 44, e117, (2016), the disclosure of which is herein incorporated by reference), model the ordering of cells based on their position in a dimensionally reduced graph, but do not provide the direction of differentiation without prior indication of a root, or the least differentiated cell, as a starting point. Therefore, to fairly evaluate these methods, the ordering of cells was benchmarked without considering the direction of differentiation, or by taking the absolute value of the weighted Spearman correlations. Consistent with previous reports, SCORPIUS was the most accurate among the lineage trajectory inference methods in ordering single cells. CytoTRACE, however significantly outperformed all other features and methods in the validation cohort, irrespective of the direction of differentiation (FIGS. 18B, 20A, and 22). These results were consistent with the findings in the training cohort and were robust to the use of smoothing (FIG. 23). Moreover, no significant biases in performance were observed in relation to tissue type, species, the number of cells analyzed, time-series experiments versus snapshots of developmental states, or plate-based versus droplet-based technologies (FIG. 24).

Figure 25A:
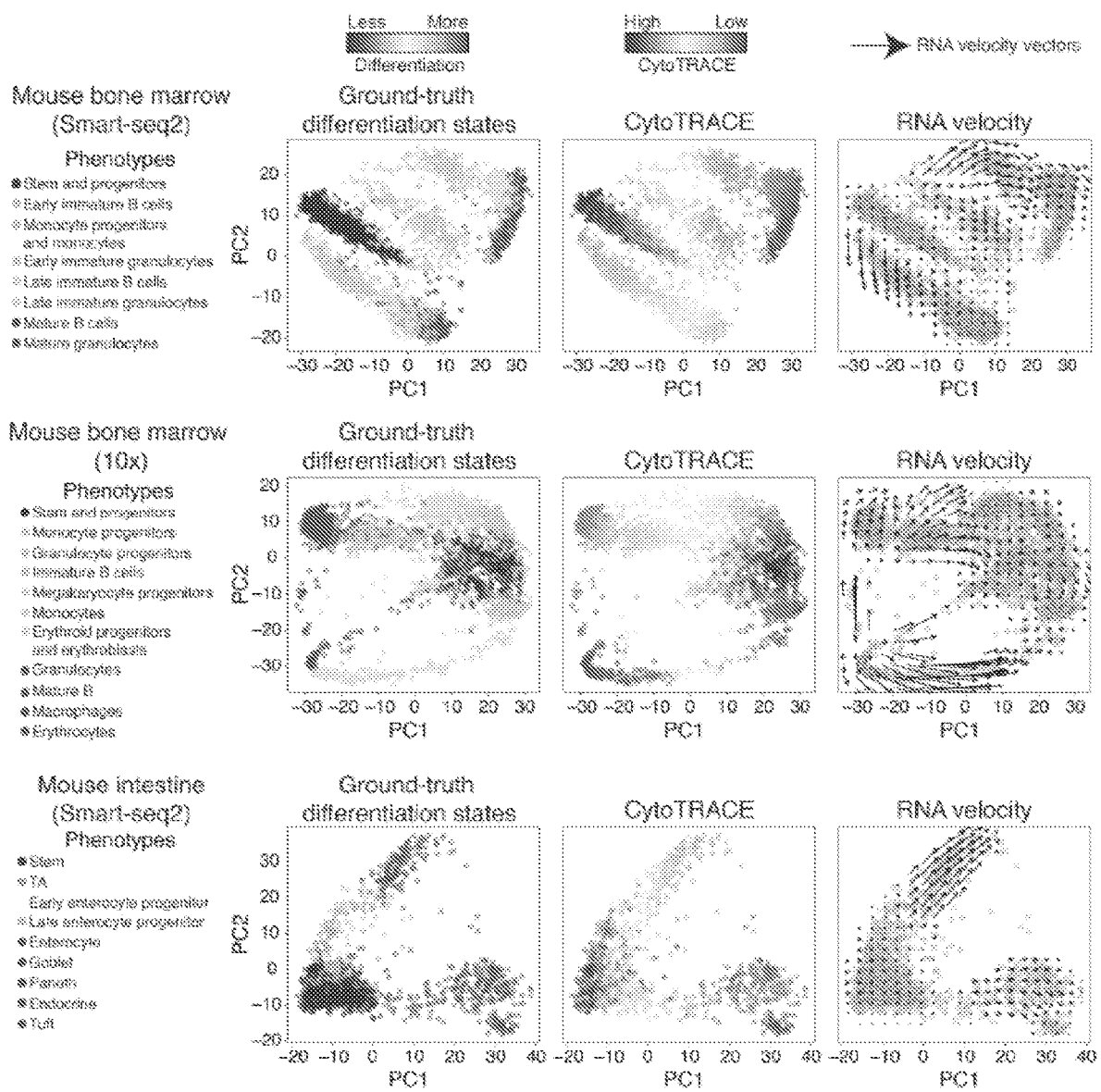

CytoTRACE was further compared with RNA velocity, a kinetic model that can predict future cell states but is limited to scRNA-seq data with continuous fate transitions (G. La Manno, et al., Nature 560, 494-498 (2018), the disclosure of which is herein incorporated by reference). To analyze RNA velocity's output, which consists of an individualized prediction for every cell (FIG. 25A), all pairs of current and future cell states spanning a known shift in developmental potential were identified (less to more, or vice versa). Each predicted trajectory was then scored against known differentiation states on five datasets with continuous developmental processes (FIG. 25B). To permit a fair comparison, CytoTRACE was evaluated on the same cells. While both methods performed similarly on an embryonic chromaffin dataset from the RNA velocity study, CytoTRACE achieved higher accuracy overall (median of 74% vs. 54%, respectively, FIG. 25C). This is likely due to the short mRNA half-lives and developmental timescales assumed by the RNA velocity model.

Figure 25D:
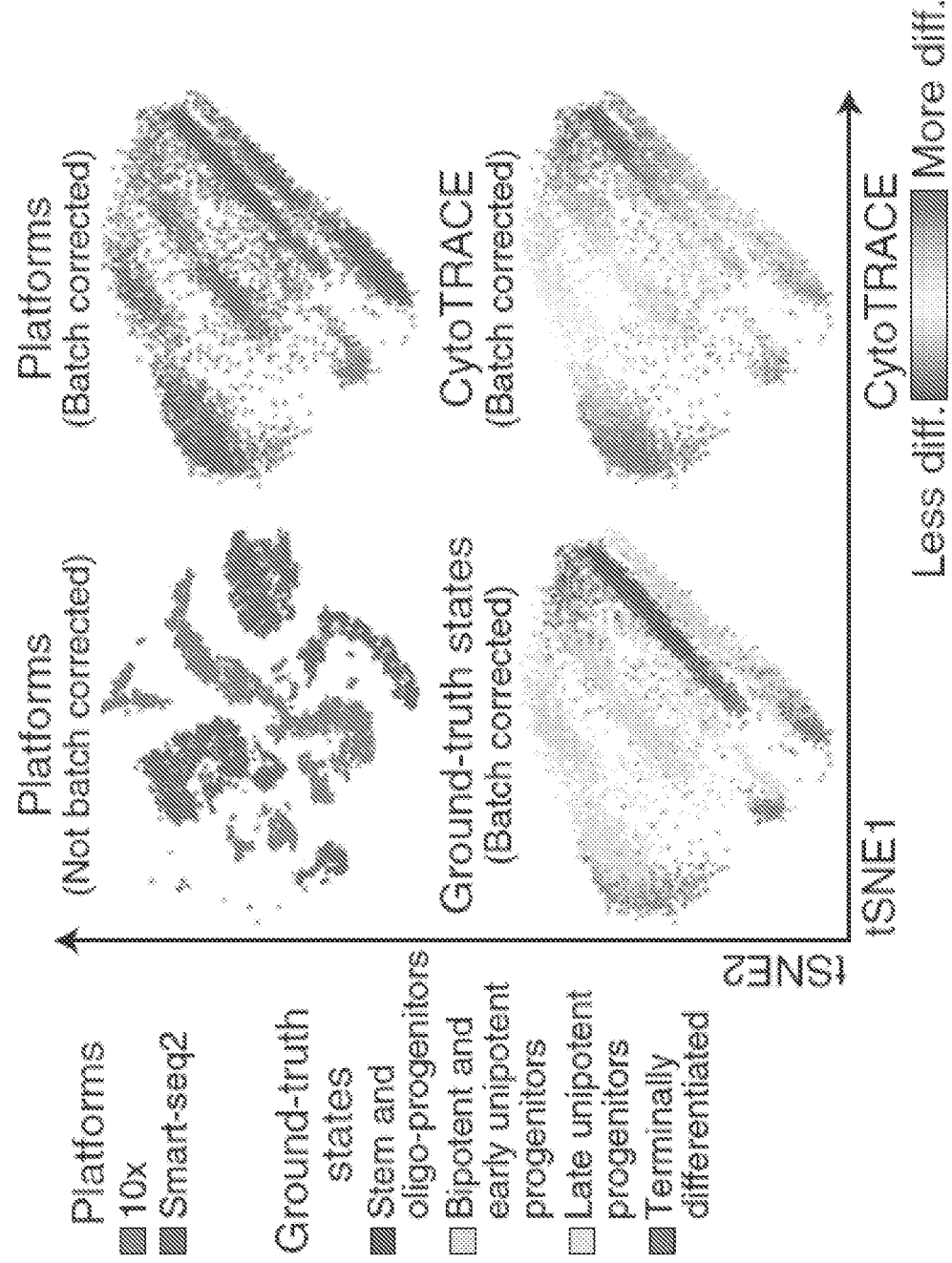
FIG. 25D provides the impact f batch correction on two datasets of mouse bone marrow differentiation: 'Bone Marrow (10x)' and 'Bone Marrow (Smart-seq2)', utilized in accordance with embodiments of the invention.

Having assessed performance on individual datasets, it was next asked whether CytoTRACE could be applied across independent scRNA-seq datasets unified by batch correction. To address this, mutual nearest neighbor and Gaussian kernel normalization techniques were leveraged from Scanorama (B. Hie, B. Bryson, and B. Berger, Nat Biotechnol 37, 685-691 (2019), the disclosure of which is herein incorporated by reference). Several datasets were merged with this approach. Regardless of whether datasets profiled on different scRNA-seq platforms were integrated (FIG. 25D) or datasets containing developmentally distinct cell types (FIG. 25E), single-cell orderings predicted by CytoTRACE were accurate.

Example 5: Differentiation-Associated Genes and Cellular Hierarchies

Figure 26:
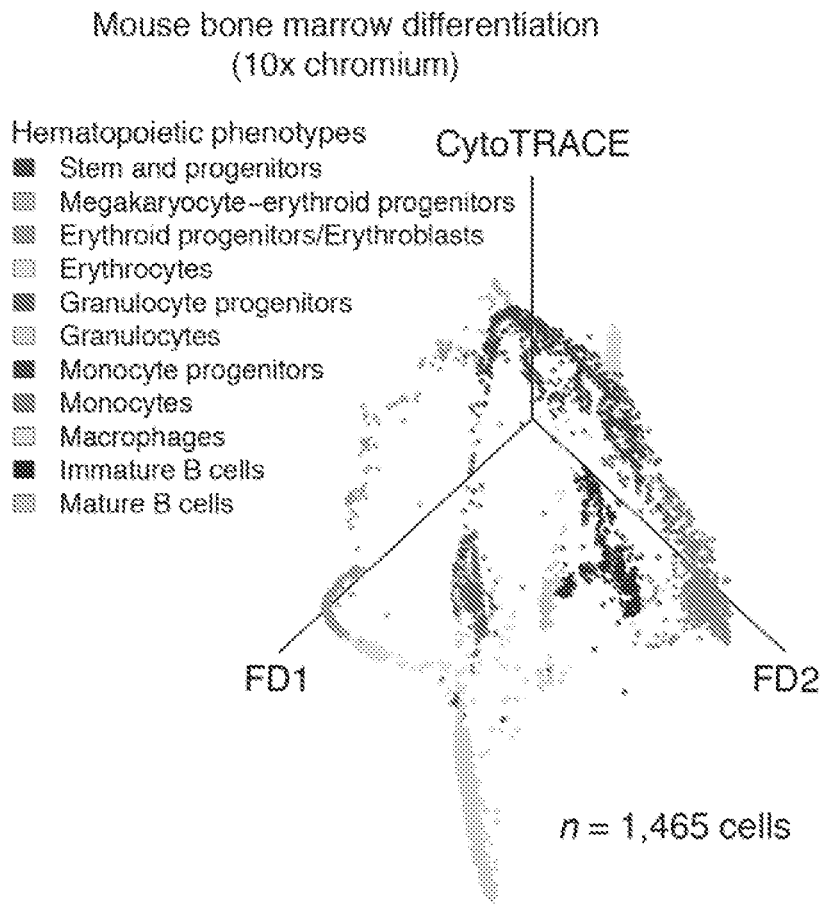
FIG. 26 provides a 3D scatter plot of mouse bone marrow differentiation from 10x chromium scRNA-seq (n=1,465 cells) with CytoTRACE on the z-axis and a force-directed layout on the x- and y-axis (FD1 and FD2, respectively), generated in accordance with embodiments of the invention.
Figure 27:
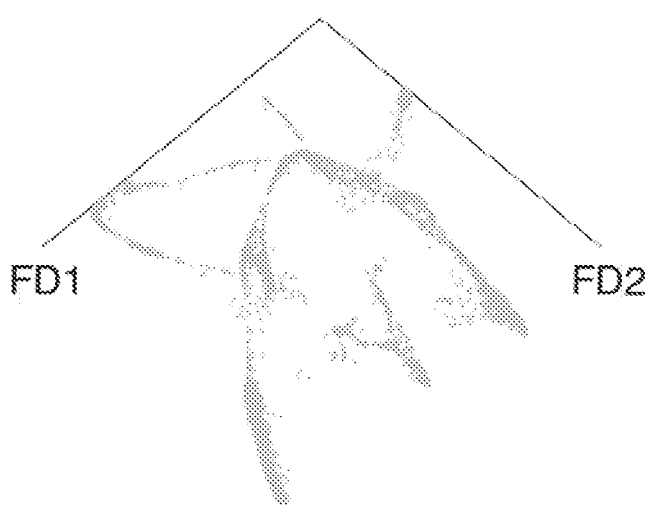
FIG. 27 provides a 2D scatter plot of mouse bone marrow differentiation from 10x chromium scRNA-seq (n=1,465 cells) with force-directed layout on the x- and y-axis (FD1 and FD2, respectively), generated in accordance with embodiments of the invention.
Figure 28:
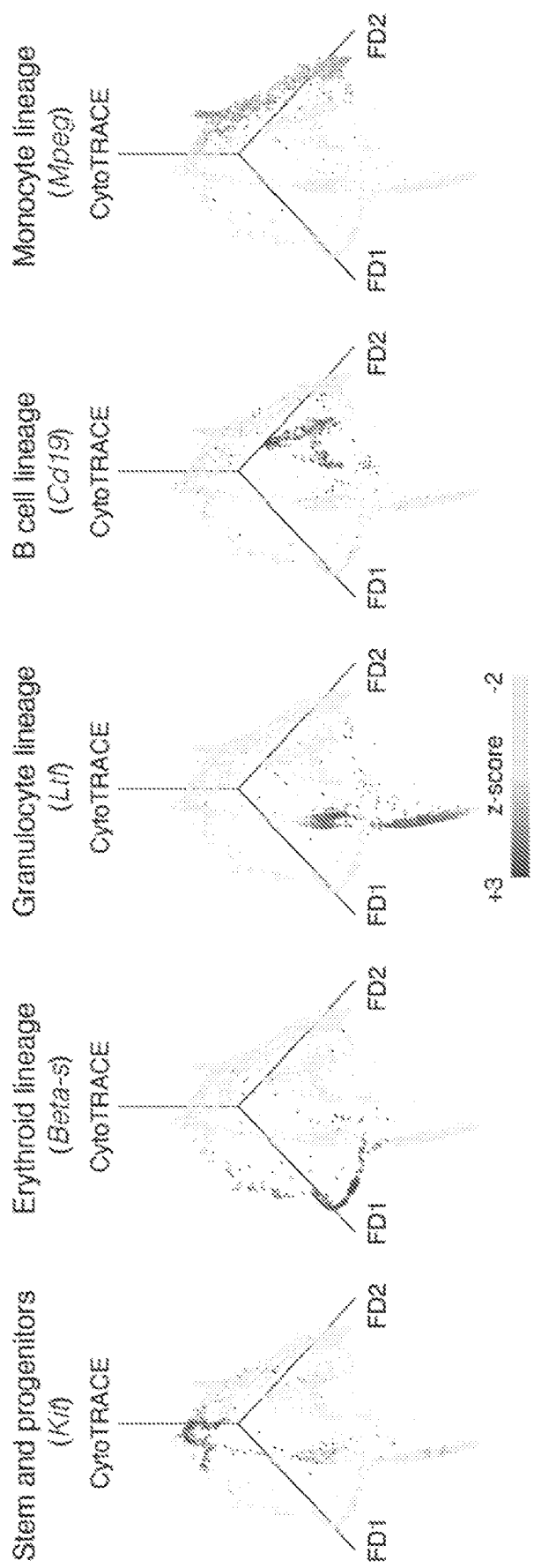
FIG. 28 provides 3D scatterplots of mouse bone marrow differentiation from 10x chromium scRNA-seq (n=1,465 cells) with CytoTRACE on the z-axis and a force-directed layout on the x- and y-axis (FD1 and FD2, respectively), split by cell type, generated in accordance with embodiments of the invention.
Figure 29:
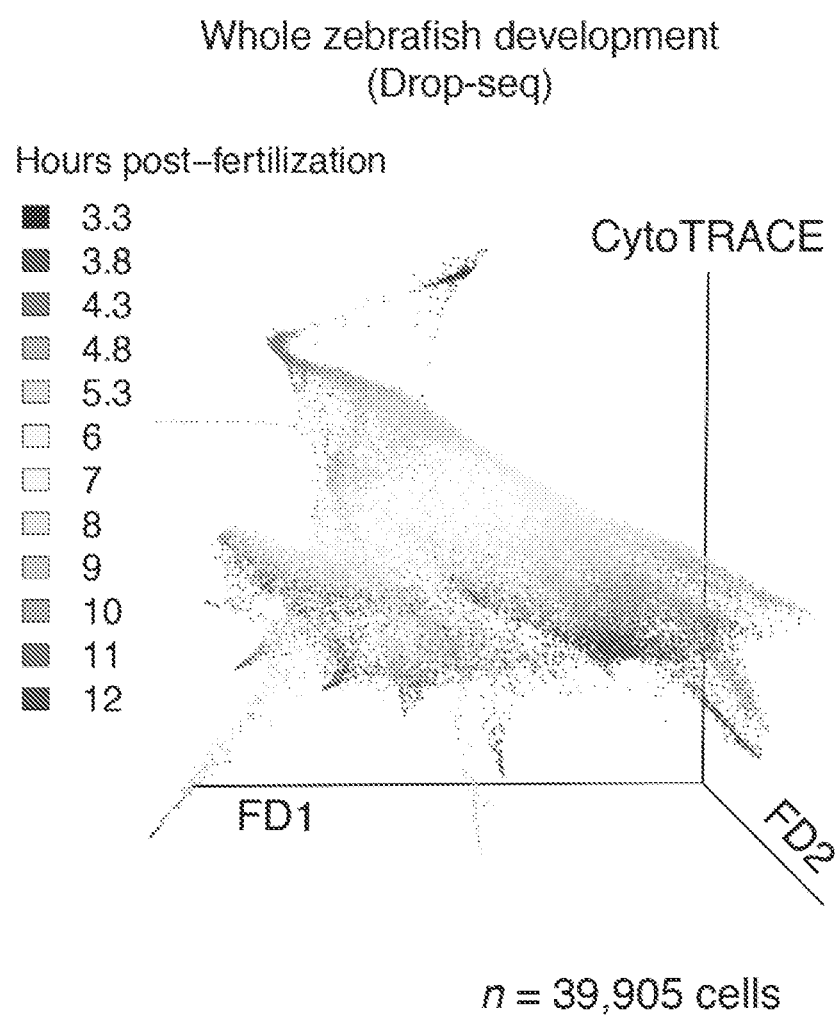
FIG. 29 provides a 3D scatter plot of whole zebrafish development from 3.3 hrs to 12 hrs post-fertilization from Drop-seq scRNA-seq (n=39,905) with CytoTRACE on the z-axis and a force-directed layout on the x- and y-axis (FD1 and FD2, respectively), generated in accordance with embodiments of the invention.

CytoTRACE predicted the order of cells in diverse types of datasets, including simple linear trajectories, such as dendritic cell differentiation, bifurcating lineages, such as skeletal stem cell differentiation, and complex, multi-branched trajectories, such as the mouse bone marrow hierarchy and whole organism development of the zebrafish. In the latter case, CytoTRACE accurately predicted the differentiation status of cells and provided a useful visual aid to inspect the dataset. 3D visualization of mouse bone marrow differentiation with CytoTRACE and a force-directed layout of 1,465 single cells revealed individual myeloid and lymphoid lineages and delineated gene expression programs from hematopoietic stem and progenitors down to terminally differentiated macrophages, B cells, and erythrocytes (FIGS. 26-28). Similarly, CytoTRACE captured the branching progression of 39,905 single cells through whole zebrafish development from 3.3 to 12 hrs of age as early stem-like cells differentiate into multiple lineage paths (FIG. 29).

Figure 30A:
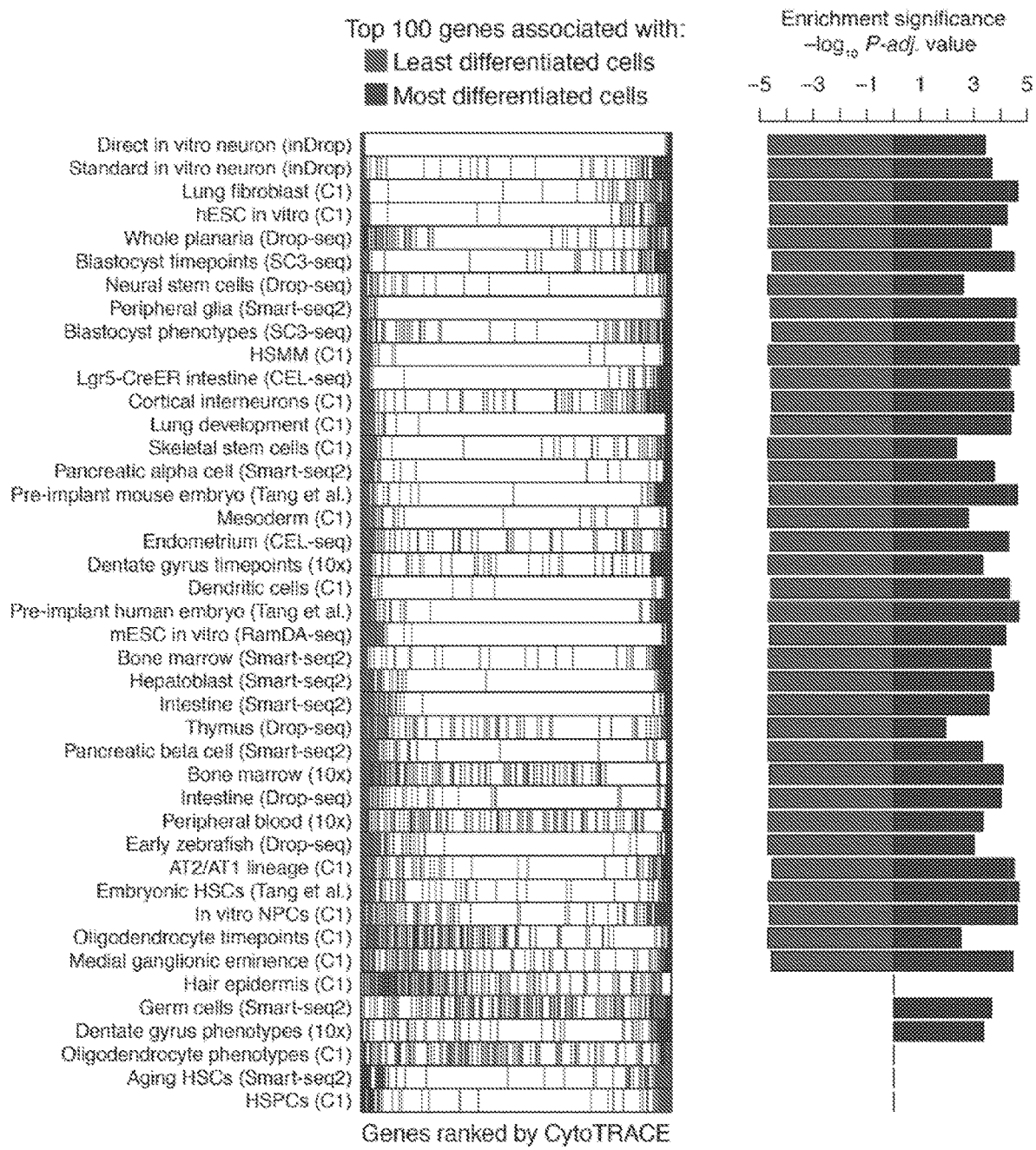
FIG. 30A provides: plots showing the enrichment of key stemness-associated (red) and differentiation-associated (blue) genes by CytoTRACE in the full cohort (n=42 datasets) (left column); and bar plots showing the statistical significance of enrichment of the stemness-associated (red) and differentiation-associated (blue) genes by CytoTRACE in the full cohort (n=42 datasets) as calculated by gene set enrichment analysis (right column), generated in accordance with embodiments of the invention.
Figure 30B:
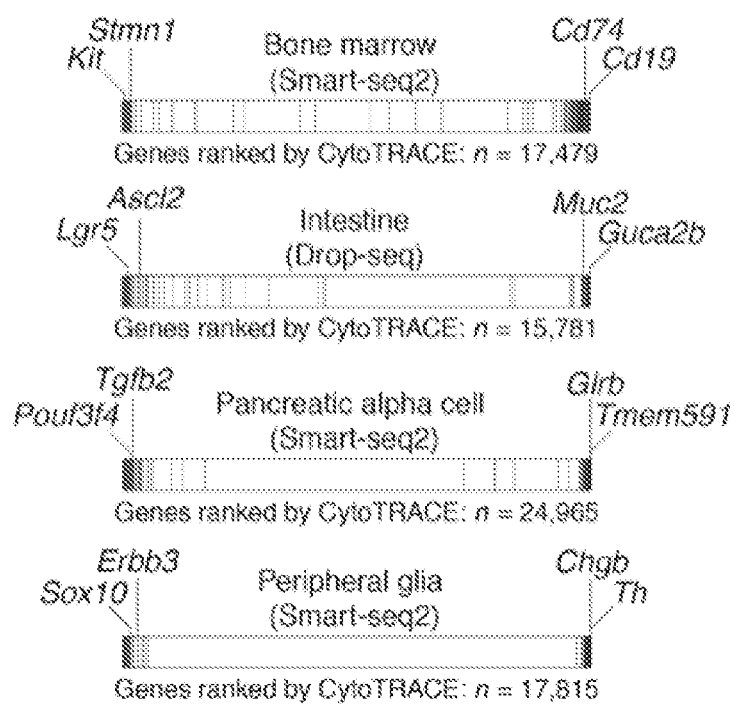
FIG. 30B provides plots showing the enrichment of key stemness-associated (red) and differentiation-associated (blue) genes by CytoTRACE in whole bone marrow (n=4, 897 cells; Tabula Muris, 2018), whole intestine (n=7,216 cells), pancreatic alpha cells (n=338 cells), and peripheral glia (n=369 cells), generated in accordance with embodiments of the invention.

Having demonstrated the utility of CytoTRACE to predict the differentiation status of single cells, its ability to identify genes associated with differentiation was tested. Stemness genes and differentiated genes were defined for each dataset as the top 100 genes uniquely expressed in the least differentiated or most differentiated cells. Next, genes in each dataset were ordered based on their correlation with CytoTRACE. It was found that stemness genes significantly associated with high CytoTRACE, while differentiation genes significantly skewed towards low CytoTRACE (FIG. 30A). Notably, without any prior information, CytoTRACE identified key genes associated with less differentiated cells, such as Kit and Stmn1 in the mouse bone marrow, Lgr5 and Axin2 in mouse intestinal crypts, Pou3f4 and Tgfb2 in mouse pancreas development, and Sox10 and Erbb3 in peripheral glia differentiation (FIG. 30B).

Figure 31A:
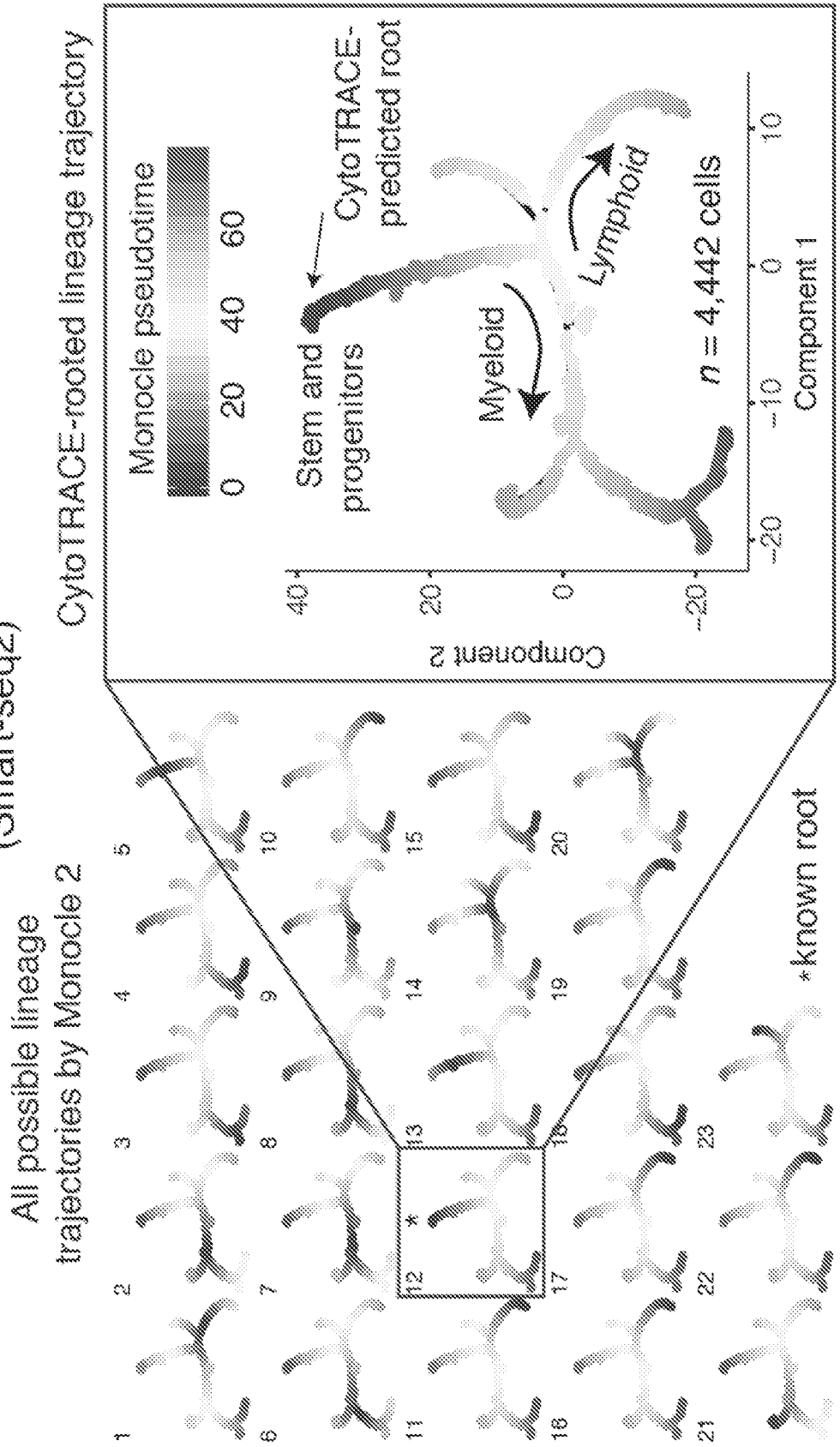
FIG. 31A provides a branch detection method (Monocle 2) in combination with CytoTRACE to delineate complex branches during mouse bone marrow differentiation (Smartseq2) without any prior information of the root, generated in accordance with embodiments.
Figure 31C:
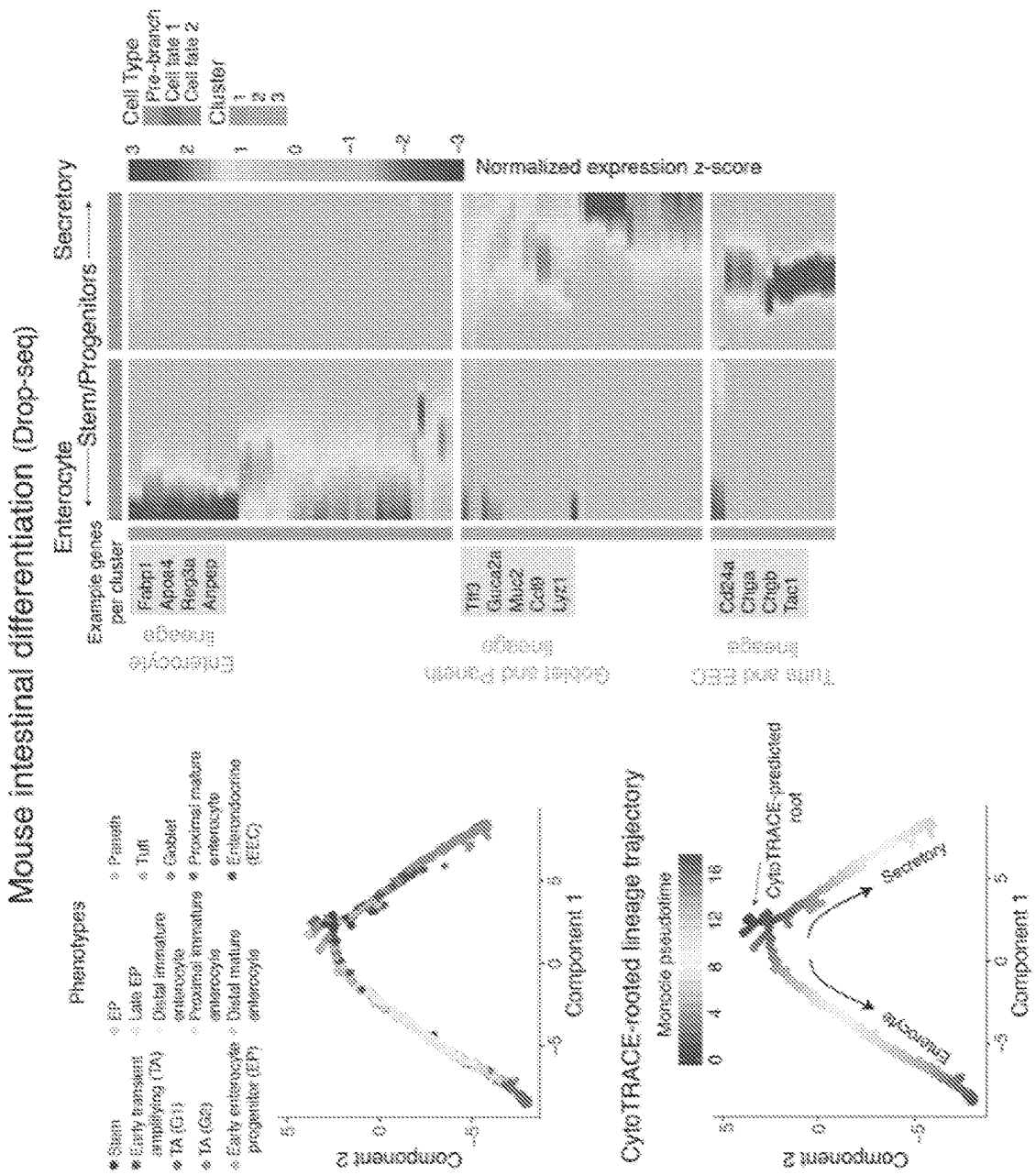

Complex lineage relationships in scRNA-seq data can also be determined with dedicated branch detection tools, such as Monocle 2, however these approaches do not predict the starting point of the biological process. For example, when applied to 4,442 bone marrow cells, Monocle 2 identified 23 possible "roots" from which to calculate pseudotime values (FIG. 31A, left). Only 1 of these 23 states is correct (4% of possibilities), which was defined as the state that is most enriched for previously annotated stem and progenitor cells (state 12 in FIG. 4B). By integrating CytoTRACE with Monocle 2, the correct root was readily identified without user input (FIG. 31A, right; and FIG. 31B). This facilitated identification of lineage-specific regulatory factors and marker genes during granulocyte, monocyte, and B cell differentiation (FIG. 31B). Similarly, when used in concert, CytoTRACE and Monocle 2 automatically determined the root, developmental ordering, and branching processes of 4,581 mouse intestinal cells, spanning stem and progenitor cells to enterocyte and secretory lineages (FIG. 31C).

Example 6: Dissection of Stem Cell and Progenitor Populations

Figure 32A:
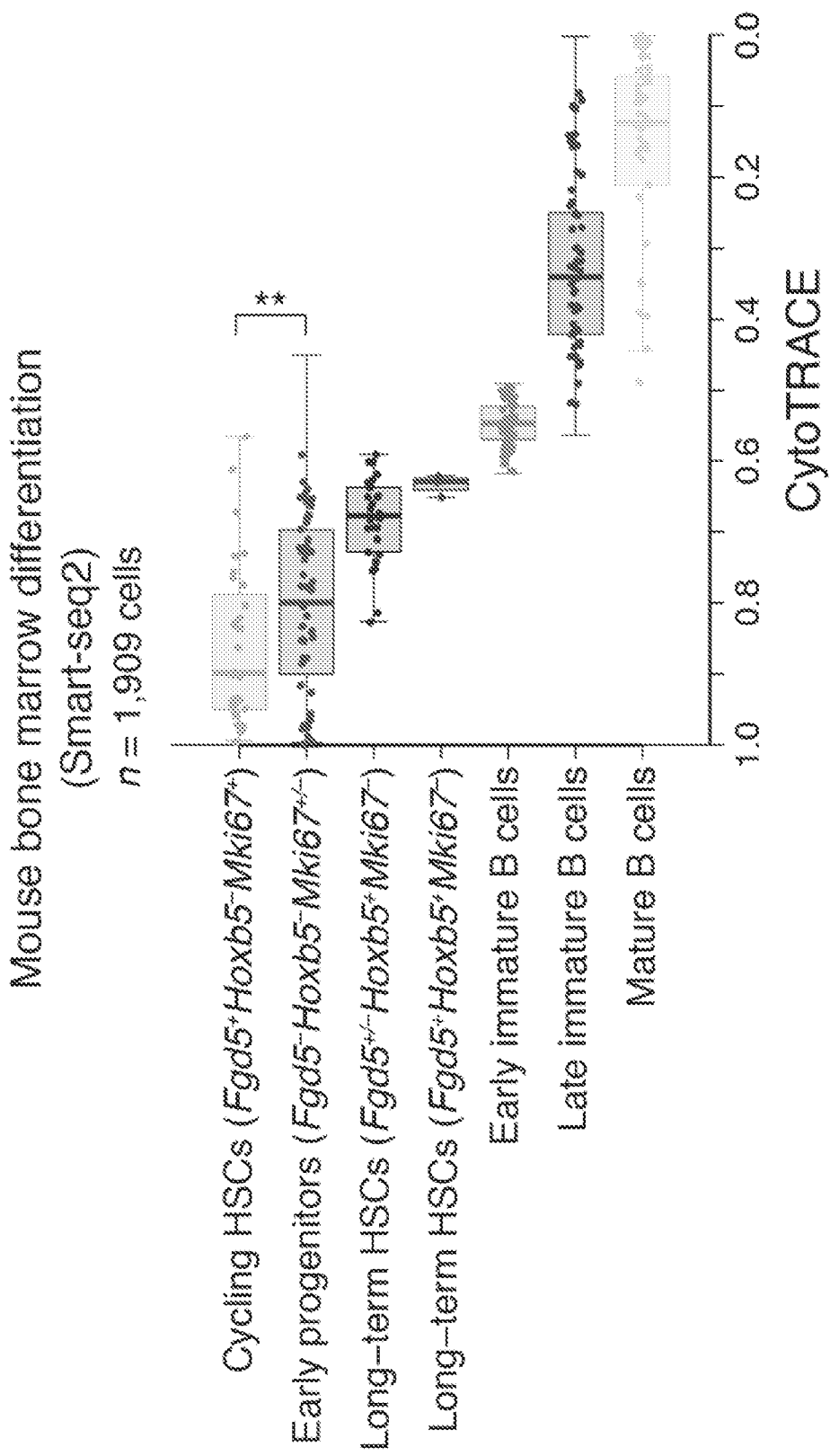
FIG. 32A provides boxplots showing CytoTRACE values for cycling HSCs (n=31), long-term/quiescent HSCs (n=30), early immature B cells (n=285), late immature B cells (n=863), and mature B cells (n=700), generated in accordance with embodiments of the invention.
Figure 32B:
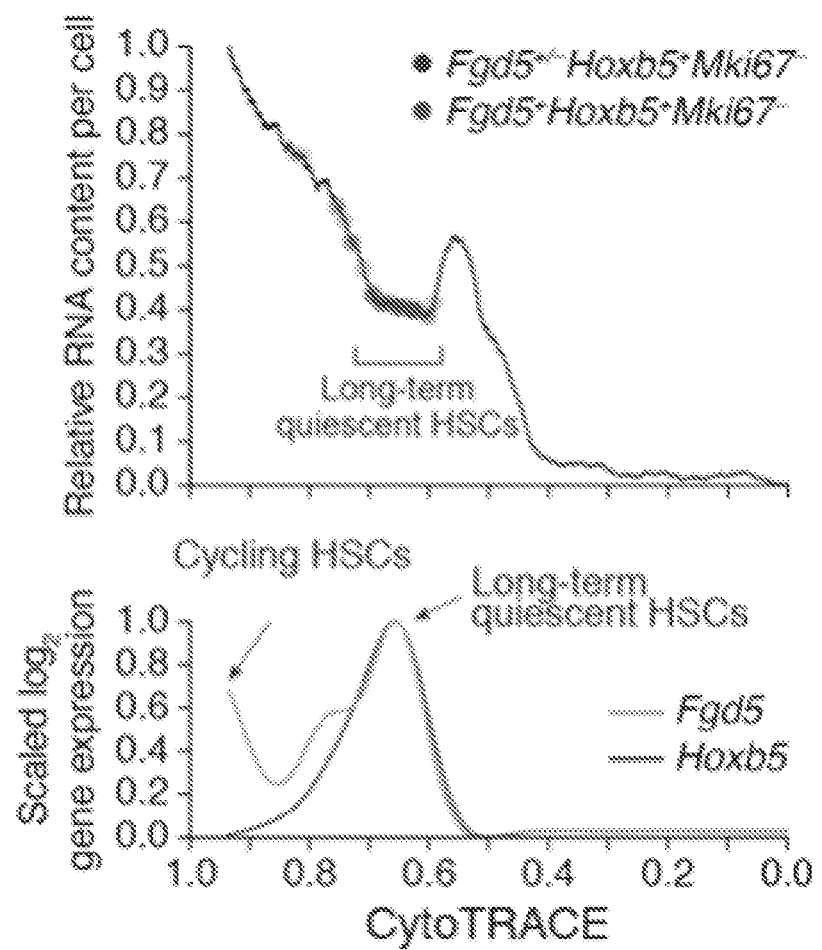
FIG. 32B provides relative RNA content per cell, shown as a function of CytoTRACE, was inferred by ERCC normalization (top panel) and Expression of Fgd5 (blue), a reporter gene for HSCs, and Hoxb5 (red), a reporter gene for long-term HSCs, in cells ordered by CytoTRACE, generated in accordance with embodiments of the invention.

It was determined whether CytoTRACE could distinguish cycling and long-term/quiescent stem cells from their downstream progenitors. As these populations are well-characterized in the bone marrow, the mouse hematopoietic system was utilized as an experimental system. While both cycling and quiescent hematopoietic stem cell (HSC) subpopulations were correctly predicted to be less differentiated, only proliferative HSCs were significantly ranked above early progenitors (FIG. 32A). This result was not unexpected, however, since quiescent cells have reduced metabolic activity and low RNA content. By devising a simple approach to visualize inferred RNA content as a function of CytoTRACE, a distinct valley in RNA abundance was observed that coincided with elevated expression of Hoxb5, a marker of long-term/quiescent HSCs (FIG. 32B). This analysis further confirms the value of CytoTRACE and suggests a novel approach for elucidating tissue-specific stem cells from scRNA-seq data.

Example 7: Application to Neoplastic Disease

After validating CytoTRACE's performance, the framework was to a system where lineage trajectories are not well characterized. Given the limited understanding of the origin of human breast cancer and the cells that maintain and propagate the malignancy, the identification of less differentiated tumor-initiating cells (TICs) and their associated genes were pursued. Increasing evidence from gene expression profiles of known breast cell types and molecular subtypes of breast cancer suggest that a subpopulation of human breast luminal progenitors (LPs) is the cell of origin in aggressive basal-like breast cancers and possibly also luminal-like breast cancers.

Figure 33A:
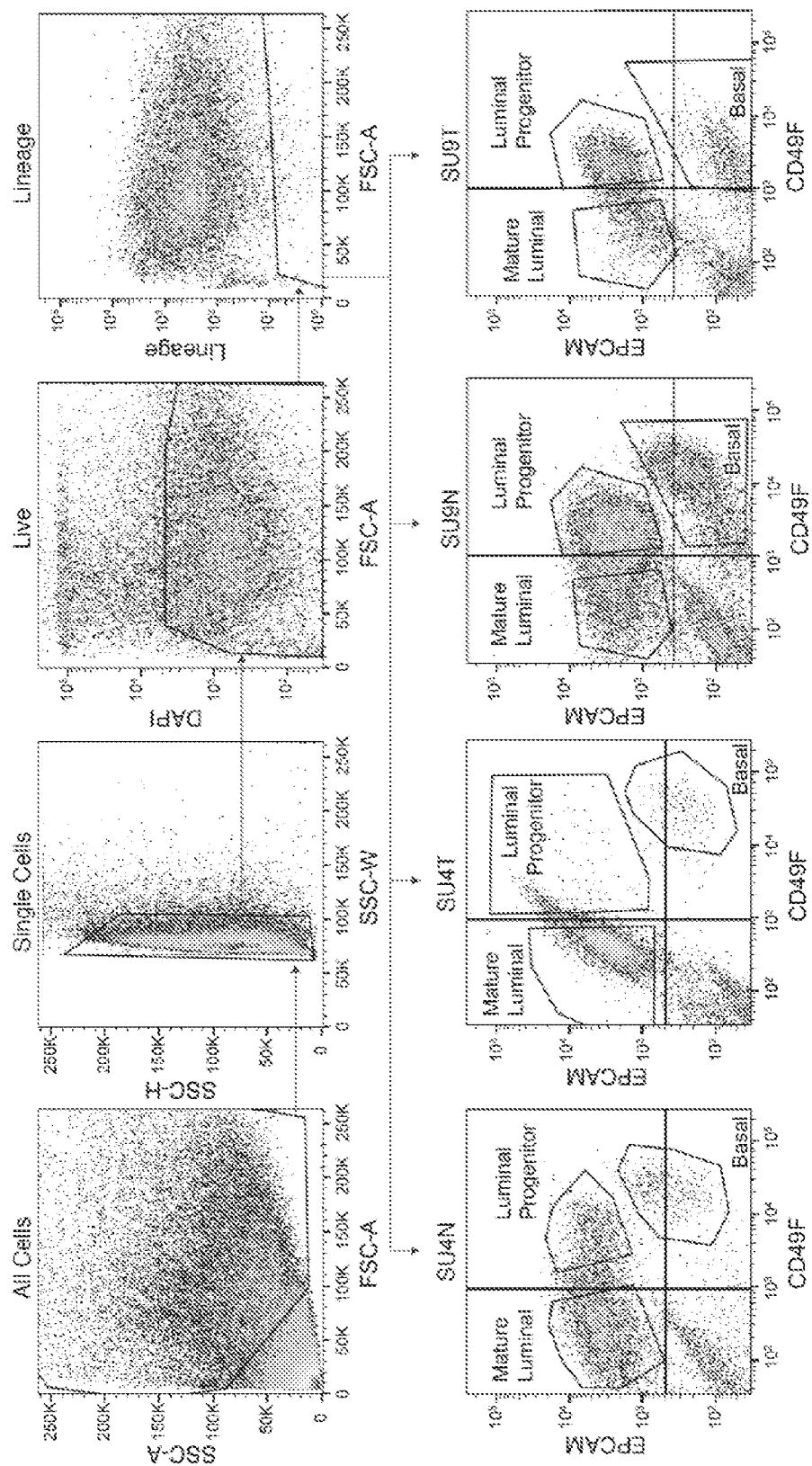
FIGS. 33A and 33B provide scatter plots demonstrating gating scheme and marker validation of epithelial subpopulations from human breast tumors and adjacent normal tissues, utilized in accordance with embodiments of the invention.
Figure 33B:
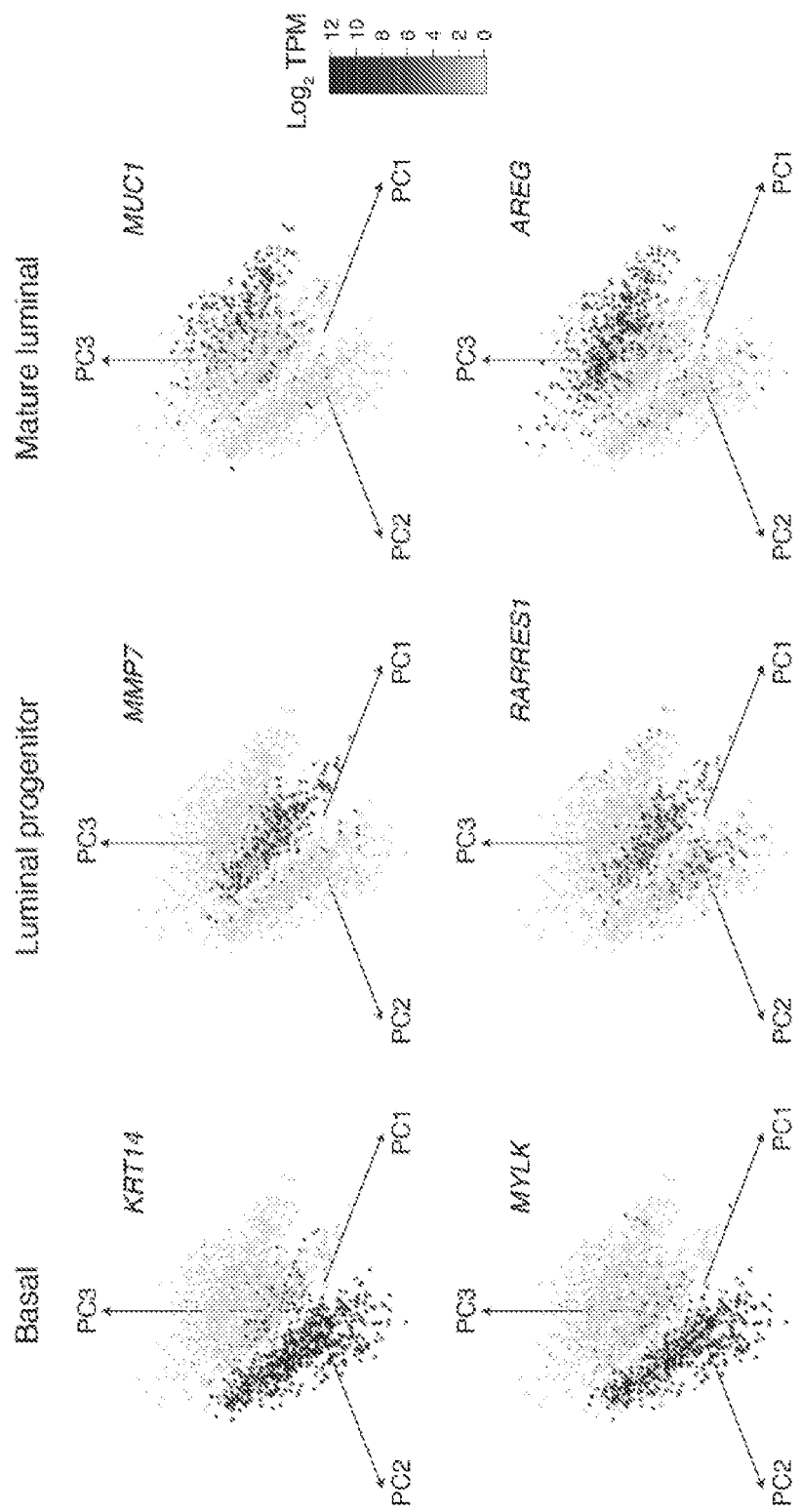
Figure 33C:
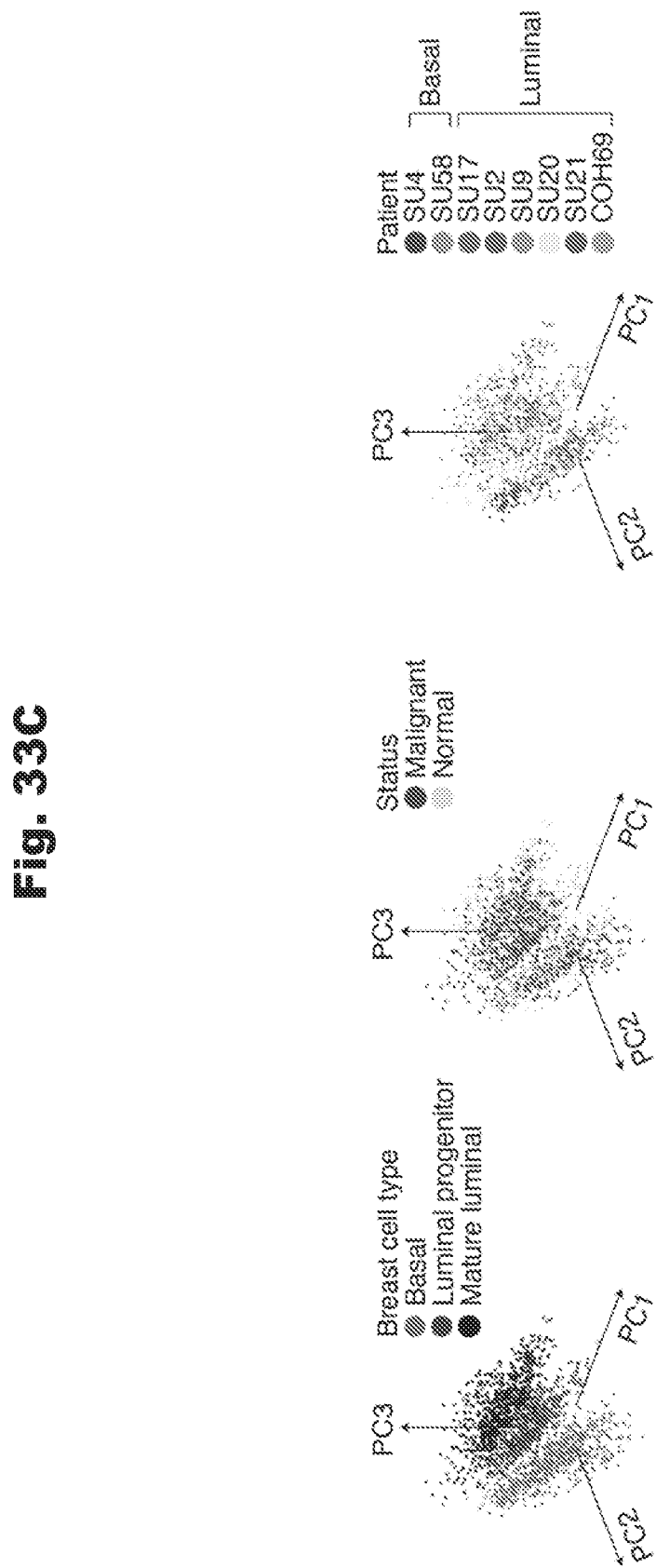
FIG. 33C provides t-SNE graphs of human breast luminal progenitors (n=439 cells) and human breast mature luminal cells (n=874 cells) showing: distribution of single cells by cluster labels by Seurat (top panel); distribution of single cells derived from the tumor or paired normal (middle panel); and distribution of single cells by patients (bottom panel), utilized in accordance with embodiments of the invention.
Figure 33F:
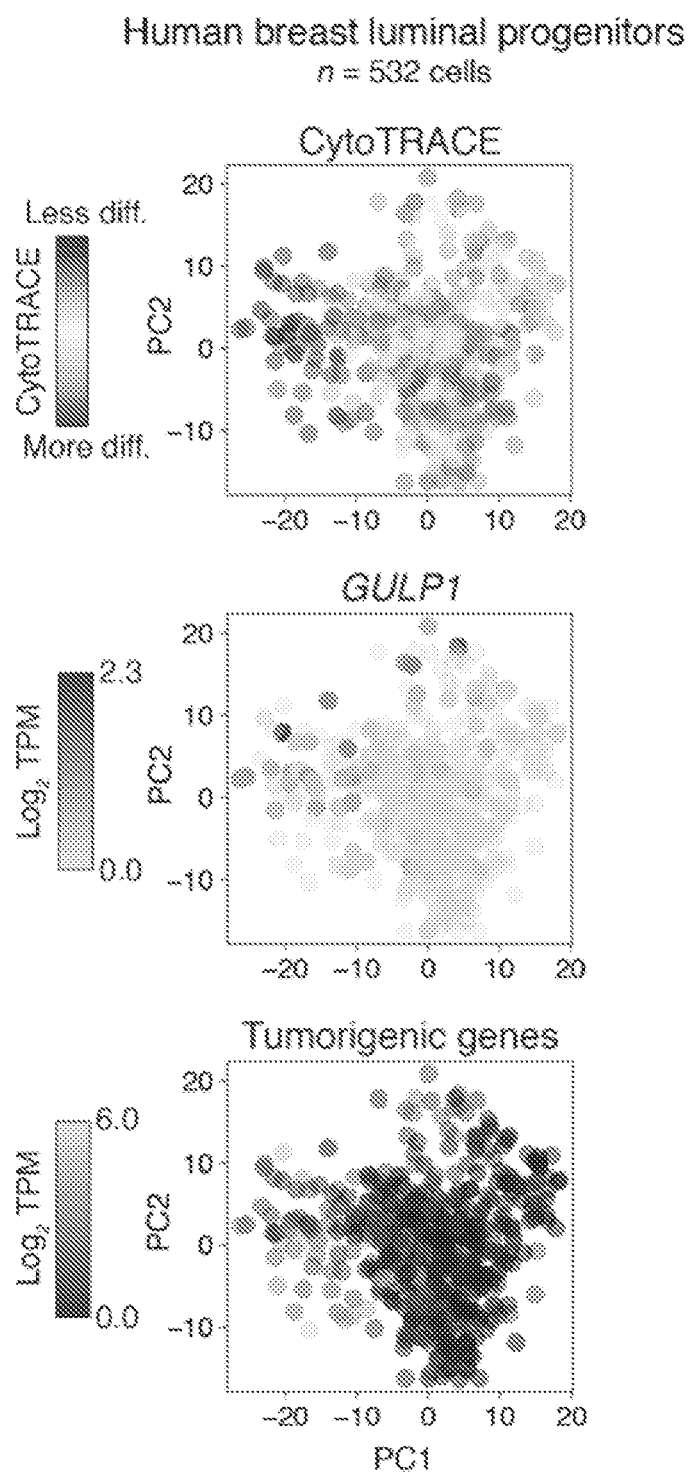
FIG. 33F provide results of differentiation, GULP1 expression, and tumorigenic gene expression in human breast luminal progenitors, generated in accordance with embodiments of the invention.

Therefore, 532 Lineage-CD49F+EPCAM+ LPs were profiled, including 319 normal and 213 malignant cells from 7 human breast cancer patients by scRNA-seq. 886 Lineage-CD49F-EPCAM+ human breast mature luminal cells (MLs) were also profiled, including 356 normal and 530 malignant cells, from 6 out of the 7 patients by scRNA-seq. Principal component analysis (PCA) of LPs and MLs revealed that cells segregated by breast epithelial type but not by tumor and normal or patient (FIGS. 33A, 33B, and 33C). Given this finding, CytoTRACE was applied on LPs and MLs separately to prioritize less differentiated cells and associated genes by compartment rather than the whole tissue. To validate CytoTRACE on LPs, genes in normal LPs were ordered by their correlation to CytoTRACE and cross-referenced with their log 2-fold gene expression enrichment in highly clonogenic ALDH+ LPs compared to less clonogenic ALDH− and ERBB3− LPs. Several known genes associated with high CytoTRACE in LPs, including ALDH1A3 and CD14, while genes involved in differentiation, such as GATA3 and MUC1, associated with low CytoTRACE (FIGS. 33D, 33E, and 33F).

Figure 34:
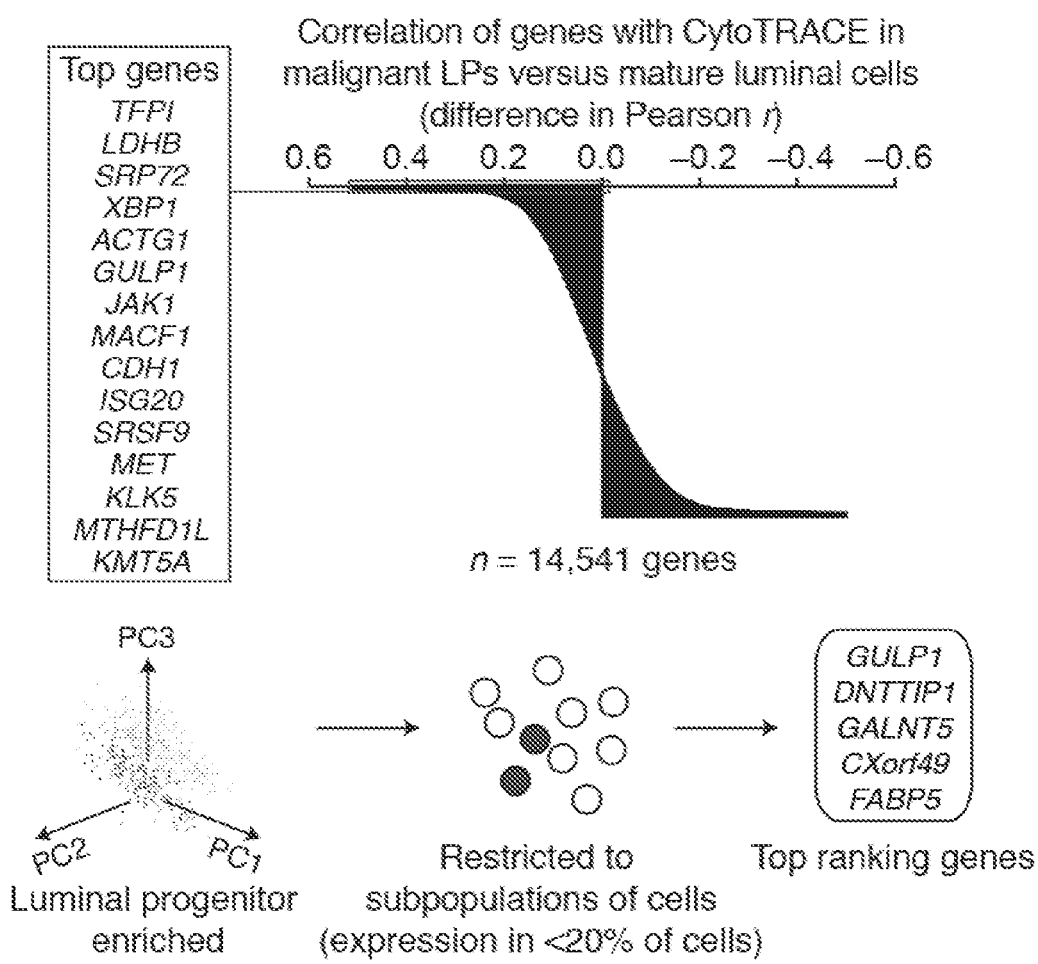
FIG. 34 provides a schema for prioritizing candidate tumorigenic genes associated with less differentiated malignant human luminal progenitors, utilized in accordance with various embodiments of the invention.
Figure 35:
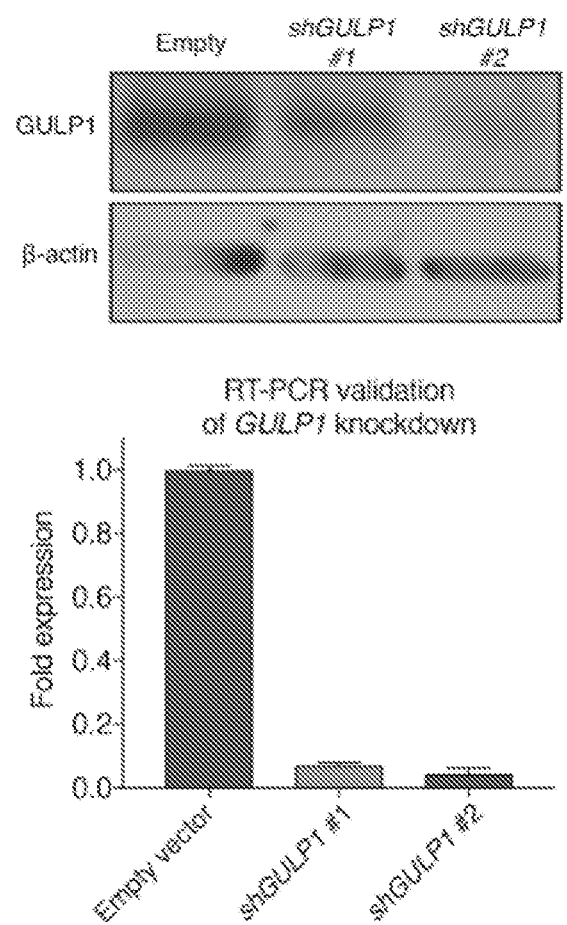
FIG. 35 provides Western blot images of GULP1 protein expression after transduction of MDA-MB-231 cells with lentivirus containing an empty vector, shGULP1-1, or shGULP1-2, generated in accordance with embodiments of the invention.
Figure 36:
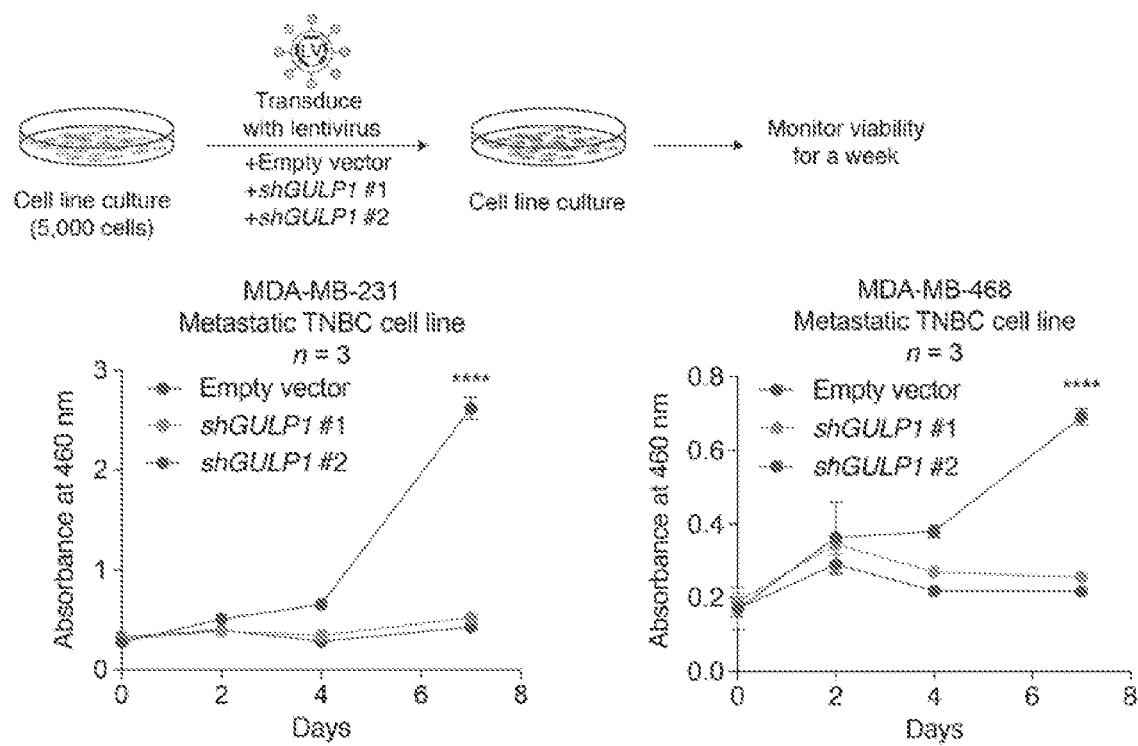
FIG. 36 provides: a Schema for measuring cell viability after shRNA knockdown of GULP1 in MDA-MB-231, a metastatic triple negative breast cancer cell line (top row); and a line graph showing growth of MDA-MB-231 after shRNA knockdown of GULP1 as measured by change in absorbance at 460 nm (y-axis) over the course of a week (x-axis) (bottom row); generated in accordance with embodiments of the invention.
Figure 37:
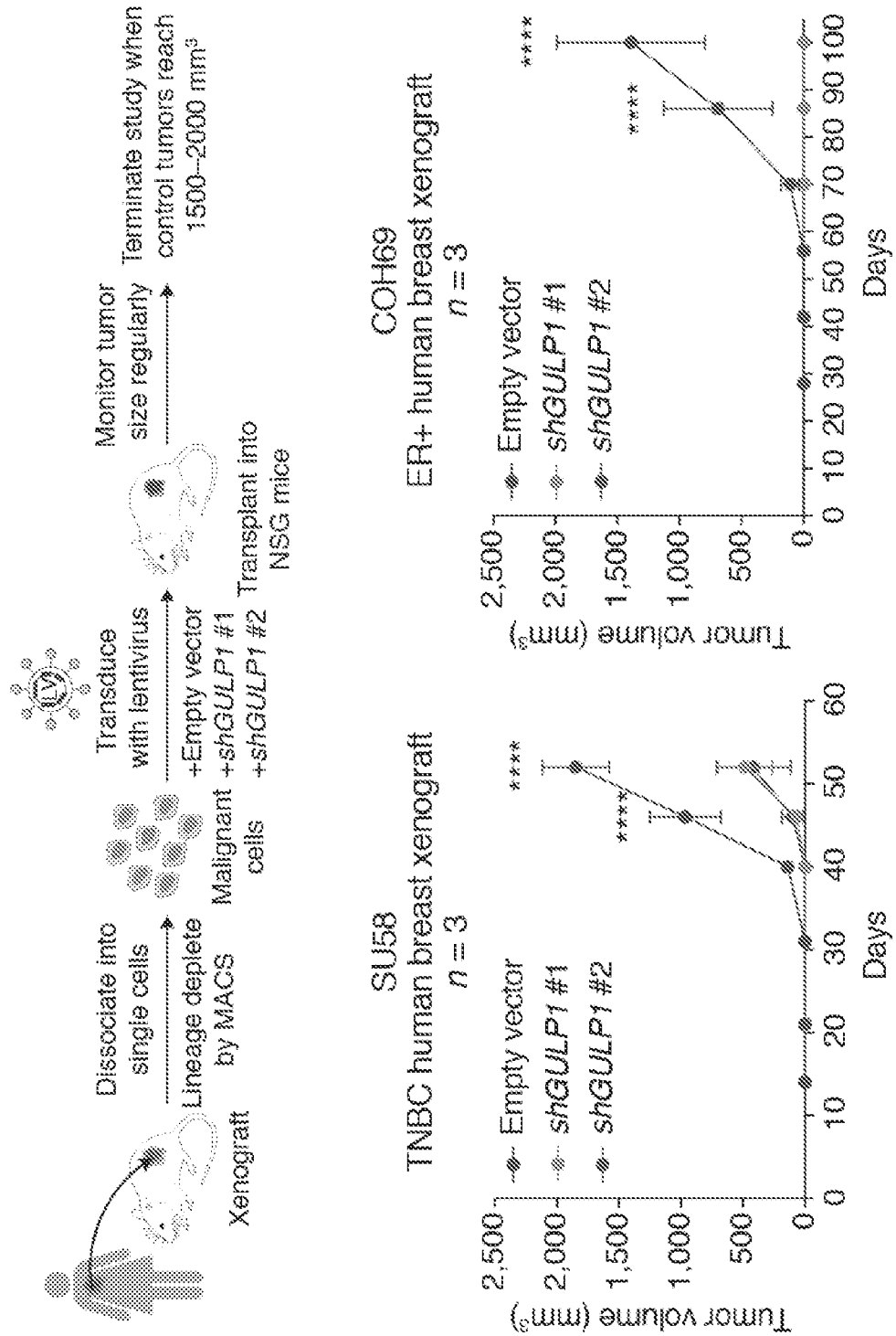
FIG. 37 provides: a Schema for shRNA knockdown of GULP1 in a human breast cancer xenograft model. Briefly, lineage-depleted breast cancer epithelia cells from patient derived xenografts were transfected with lentivirus either empty vector control or containing shRNA targeting GULP1 and transfected into immunodeficient NSG mice in triplicates (top row); and line graphs Growth of human breast cancer xenografts from two different patients with triple-negative breast cancer (bottom left panel) and ER+ luminal-type cancer (bottom right panel) after lentiviral transfection with empty vector or shRNA targeting GULP1; generated in accordance with embodiments of the invention.

It was a goal to identify a candidate gene associated with less differentiated tumor LPs. The collection of genes were initially trimmed to include only those that were expressed in fewer than 20% of tumor LPs, restricting the analysis to genes expressed by a subpopulation of cells rather than the entire compartment. Next, genes that are specifically expressed and associated with CytoTRACE in tumor LPs were selected, as compared to tumor MLs. Based on this approach, several genes were identified, including CXORF49, GALNT5, COL6A2, and GULP1, specifically associated with less differentiation in tumor LPs (likely to be TICs) (FIG. 34). Downstream validation of GULP1 was pursued as this gene is not well described in studies of human breast cancer and it ranked among the top 5 genes prioritized by CytoTRACE. The effect of GULP1 knockdown was examined by measuring cell viability of the metastatic TNBC cell line MDA-MB-231, as compared to an empty vector control (FIG. 35). GULP1 knockdown significantly reduced cell viability of MDA-MB-231 within a week as measured by a colorimetric assay for metabolic activity (FIG. 36). Next, a basal-like TNBC sample and a luminal-like ER+ human breast cancer specimen was transduced with GULP1 shRNA or an empty control vector. The transduced cell-lines were then subcutaneously xenografted the cells into immunodeficient NSG mice (n=3 mice per tumor). The tumor volumes were monitored over the course of 50-100 days and the study was terminated when the control tumors reached a size of 1500-2000 mm$^3$. Knockdown of GULP1 slowed the growth of the TNBC tumor and completely abrogated the ER+ tumor compared to empty vector controls, supporting its role in tumorigenesis (FIG. 37).

Based on these results of GULP1, several embodiments are directed to utilizing GULP1 expression as biomarker to identify TICs in neoplasms (e.g., breast cancer). The expression products of GULP1 can be identified by a number of methods, including (but not limited to) nucleic acid hybridization, polymerase chain reaction, next-generation sequencing, Sanger sequencing, western blot, immunostaining, flow cytometry, enzyme-linked immunosorbent assay (ELISA), and dot blot.

A number of embodiment are also directed to modulating expression of GULP1 in TICs. In some embodiments, GULP1 activity is repressed, which can be done by a number of methods, including (but not limited to) short-hairpin RNA, CRISPR (with appropriate enzyme), antigen binding proteins, and a small molecule antagonists. In some embodiments, repressing GULP1 expression in TICs leads to a mitigation of tumor growth. Various embodiments are also directed to increasing GULP1 activity with GULP1 expression cassettes and small molecule agonists.

Example 8: GULP1 Expression in Cancer and Recurrence

The survival v3.1.12 R package was used to analyze the association of GULP1 expression with distant recurrence-free survival (DRFS) in breast cancer using the Investigation of Serial Studies to Predict Your Therapeutic Response with Imaging and Molecular Analysis (I-SPY1) cohort (n=508 human breast cancer samples). A Cox proportional hazard model showed a hazard ratio of 1.51 with 95% confidence interval of 1.04-2.19. The survival z-score was 2.173 with a P-value of 0.03, suggesting significant association of GULP1 expression with DFRS.

Furthermore, GULP1 is associated with poor outcomes in the following cancers (type and survival z-score shown below). Z-scores greater than 2 indicate significant association with poor survival:

| GULP1 association with cancer | |
| --- | --- |
| Cancer Type | Survival z-score |
| Brain cancer-Neuroblastoma | 4.48 |
| Colon cancer | 3.19 |
| Brain cancer-Glioma | 3.134 |
| Lung cancer ADENO | 2.354 |
| Ovarian cancer | 2.307 |

Example 9: GULP1 Expression in Hematopoietic Stem Cells

Figure 38:
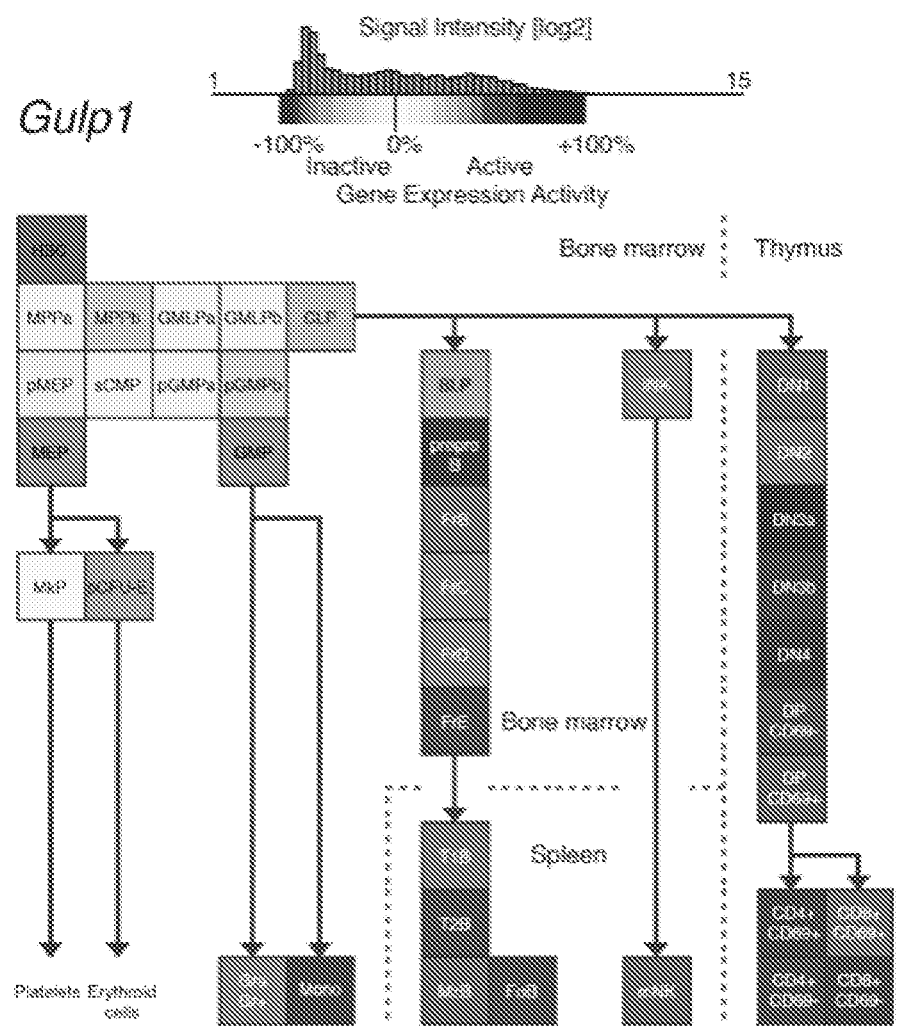
FIG. 38 provides a schema showing the expression of GULP1 within the hematopoietic stem cell lineage, utilized in accordance with embodiments of the invention.

Provided in FIG. 38 is a flow chart showing the expression of GULP1 RNA along the hematopoietic cell lineage. As can be seen, expression of GULP1 is highest in hematopoietic stem cells (HSCs) and its expression decreases in cells more differentiated. Accordingly, various embodiments utilize GULP1 expression as a biomarker that identifies HSCs. The expression products of GULP1 can be identified by a number of methods, including (but not limited to) nucleic acid hybridization, polymerase chain reaction, next-generation sequencing, Sanger sequencing, western blot, immunostaining, flow cytometry, enzyme-linked immunosorbent assay (ELISA), and dot blot.

A number of embodiment are also directed to modulating expression of GULP1 in HSCs. In some embodiments, GULP1 activity is repressed, which can be done by a number of methods, including (but not limited to) short-hairpin RNA, CRISPR (with appropriate enzyme), antigen binding proteins, and a small molecule antagonists. In some embodiments, repressing GULP1 expression in HSCs leads to an ablation of HSCs, which can be useful in the treatment of various leukemia and/or bone marrow transplantation procedures. Various embodiments are also directed to increasing GULP1 activity with GULP1 expression cassettes and small molecule agonists. In some embodiments, increasing GULP1 expression is useful in treating disorders resulting in low blood cell count (e.g., leukopenia), anemia, HIV/AIDS, hypersplenism, Kostmann's syndrome, lupus, myelodysplastic syndromes, rheumatoid arthritis, and tuberculosis.

Example 10: Analysis of Multi-Lineage Priming

Multi-lineage priming (MLP) is a phenomenon in which immature cells up-regulate lineage-specific gene expression programs prior to lineage commitment. Although MLP has a firm foundation in prior literature, efforts to measure it have generally relied upon extensive prior knowledge of lineage-specific genes or the structure of the developmental hierarchy. GCS, by comparison, is a novel measure of transcriptional diversity derived from single-cell gene counts. As an assumption-free metric, its derivation is inherently (i) agnostic to prior definitions of lineage-specific genes, (ii) robust to dropout events that disproportionately affect genes with lower expression levels (e.g., transcription factors involved in MLP), and (iii) independent of known cell fate decisions. Although GCS and MLP are defined differently, both are associated with promiscuous gene expression. It is therefore reasonable to hypothesize that MLP, GCS, and gene counts are related. If true, it is hypothesized that MLP would correlate with gene counts and to progressively decrease with differentiation, even when knowledge of developmental direction is unavailable.

To investigate this hypothesis, a series of analyses were performed using scRNA-seq datasets with known differentiation trajectories (n=9;). For each dataset, candidate MLP events were determined by analyzing the expression of "multi-lineage" gene sets in single cells. These gene sets were defined separately for each dataset using the top m marker genes per phenotype or the top m markers per differentiation state (e.g., a dataset with 4 phenotypes would have 40 marker genes if m=10). the impact of removing lowly expressed genes was also assessed, with expression thresholds of 5 and 30 selected according to estimates of how TPM/CPM values correspond to transcript counts inferred from spike-in standards (<1 and ~5 transcripts, respectively). Comparable results were also obtained when we instead removed genes based on percent expression within each cell phenotype (<5% and <10%; data not shown).

Multi-lineage genes were subsequently defined as the union of the top 10 remaining genes enriched in each phenotype (by log 2-fold or t-statistic). To quantify performance, the number of expressed genes per gene set (TPM/CPM>0) was determined and the resulting quantities was correlated against known developmental states. All results were compared against total gene counts (i.e., "whole transcriptome"). Surprisingly, while several definitions of multi-lineage genes were evaluated, they were substantially less accurate than total gene counts, and generally less accurate than random gene sets, at predicting known cell orderings. These results were not dependent on the specific value of m, as the conclusion remained the same when testing m=10 (shown), 20, and 50.

Having assessed MLP-related gene sets, it was next sought to determine whether MLP influences the performance of transcriptome-wide gene counts. Toward this end, markers were identified for every cell phenotype in each of the nine datasets (log 2 fold change >0.1; Benjamini-Hochberg adjusted p-value <0.01). Then, for every phenotype f in dataset d, multi-lineage genes, defined as the genes marking the remaining cell phenotypes in d, were removed from consideration. Despite systematically excluding multi-lineage genes, only a modest impact was observed on the association between gene counts and known orderings.

Next, Transcriptional Regulation & Epigenetic Landscape Explorer (TREL) (M. Heinaniemi et al., Nat Methods 10, 577-583 (2013), the disclosure of which is herein incorporated by reference) and BEAM (X. Qiu et al., Nat Methods 14, 309-315 (2017), the disclosure of which is herein incorporated by reference) were evaluated as alternative approaches for defining multi-lineage genes. For this analysis, a dataset of mouse bone marrow hematopoiesis profiled by Smart-seq2 (Tabula Muris) was selected, owing to its high gene coverage and complex topology. In addition, (i) mouse bone marrow development is well-characterized, (ii) lineage-specific transcription factors involved in mouse hematopoiesis were defined and evaluated in the TREL study, and (iii) BEAM is well-suited to analyzing complex lineage bifurcations, such as those that occur during hematopoiesis.

For TREL, multi-lineage transcription factors (TFs) with mutually exclusive expression patterns between sister lineages (termed "reversals") were examined. All TF reversals between (i) mouse erythroid and myeloid lineages and between (ii) mouse B cell and T cell lineages were considered. TF reversals were analyzed in two ways. In one scenario ("restricted"), we only analyzed TF reversals that are unique to a given pair of sister lineages (e.g., reversals between erythroid and myeloid lineages, but not lymphoid lineages). In the $2^{nd}$ scenario, we relaxed this constraint ("unrestricted").

For BEAM, multi-lineage genes were defined as the union of significant branch-dependent genes (Q<0.05) at the three branch-points detected during mouse bone marrow differentiation.

Once multi-lineage genes were defined, the number of detectably expressed genes per cell for each gene set was determined. Performance was compared against transcriptome-wide gene counts. As observed in the MLP analysis above, transcriptome-wide gene counts generally recapitulated developmental orderings, followed by multi-lineage genes, which were also correlated with known orderings, but to a lesser extent.

Finally, whole transcriptome gene counts was benchmarked against MLP and non-MLP-related genes using a lineage-resolved scRNA-seq atlas of C. elegans. MLP-related genes were defined based on the following criteria:
MLP genes: Genes maintained in daughter from parent ('expression_maintained_from_parent'=TRUE), divergent between sister lineages (Q<0.05, log 2 TPM ratio>3), and filtered for transcription factors ('is_TF'=TRUE).
Genes that are unlikely to participate in MLP (termed "non-MLP" genes below) were also assessed:
Non-MLP genes: Genes expressed in parent but not daughter cells (TPMparent>0, TPMdaughter=0) and not including MLP genes (defined as above but without restricting to transcription factors).
To characterize performance, the number of expressed genes per cell type for MLP genes, non-MLP genes, and the whole transcriptome were determined. The resulting quantities were compared against known orderings via weighted Spearman correlation. To ensure specificity, only MLP genes derived from a given lineage k were analyzed in k, and only cell types with evidence of MLP were assessed (at least one pair of MLP genes with mutually exclusive expression between sister lineages). For each lineage, at least 4 cell types with evidence of MLP and at least 4 evaluable MLP genes were required. In total, 55 unique lineages satisfied these criteria. To promote a fair comparison, whole transcriptome gene counts and non-MLP genes were evaluated in a lineage-specific manner using the same cell types and lineages as for MLP genes.

Example 11: Multilineage Datasets without a Common Source of Differentiation

Figure 39G:
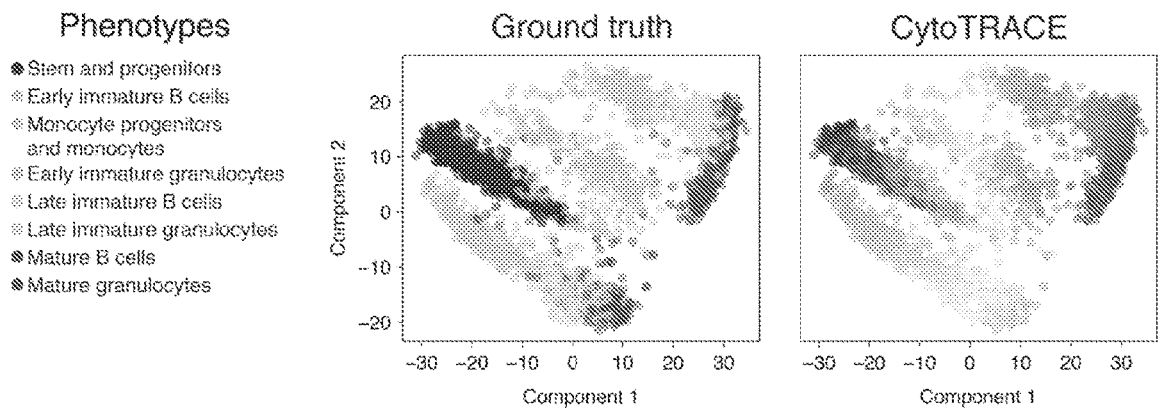
Figure 39H:
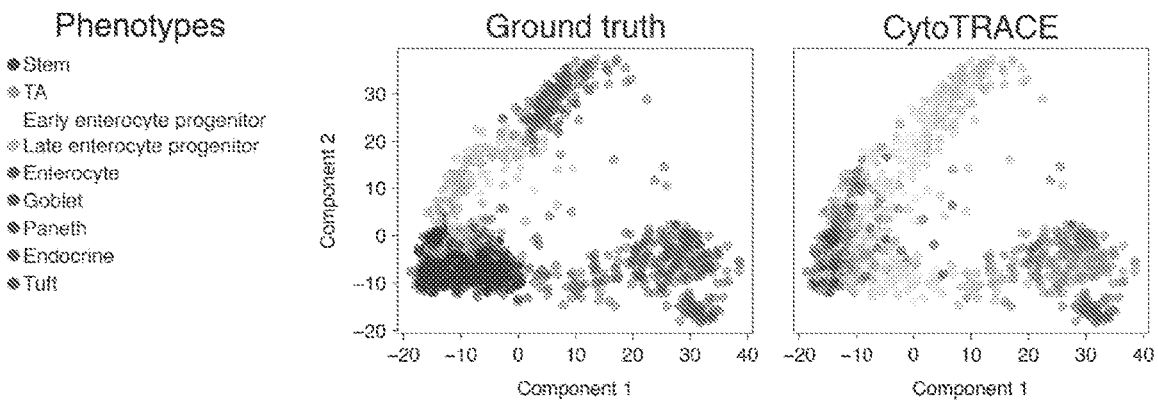
Figure 39I:
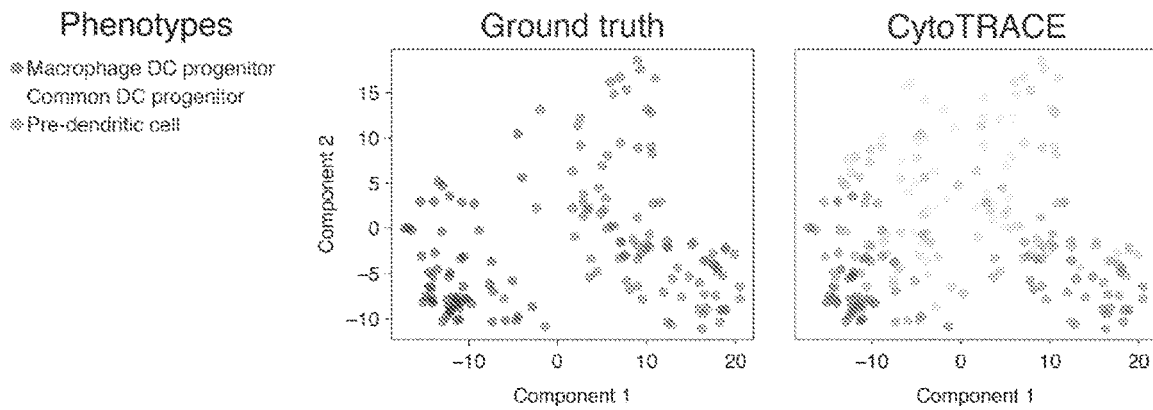

Although CytoTRACE was successfully applied to predict developmental orderings from whole organisms (zebrafish development and planaria), not every dataset has a common source of differentiation. To test the applicability of CytoTRACE in settings without a common source, two datasets of bone marrow hematopoiesis with well-characterized developmental lineages were analyzed: ('Bone marrow (Smart-seq2)' and 'Bone marrow (10x) (See FIGS. 39F and 39G). After removing all hematopoietic stem and progenitor cells (HSPCs) from these datasets, CytoTRACE was applied to the remaining cells, consisting of monocyte/macrophage, granulocyte, erythroid, and lymphoid lineages, each spanning unipotent progenitors to terminally differentiated cells. Despite eliminating HSPCs, only a modest drop in performance was observed (from Spearman rho of 0.73 and 0.91 to 0.7 and 0.9). This result indicates that a common source of differentiation, while beneficial, is not strictly required when multiple lineages from a common developmental hierarchy are analyzed.

In cases where trajectories are present from independent tissue hierarchies, it is recommend to first divide the data into disjoint trajectories, then running CytoTRACE separately on each. This can be accomplished with either Monocle 3 or existing clustering and embedding techniques (e.g., see J. Cao et al., Nature 566, 496-502 (2019), the disclosure of which is herein incorporated by reference). Once disjoint communities are identified, CytoTRACE can be used alone or in combination with Monocle 2/3 (or another branch detection technique).

Example 12: CytoTRACE Applied to Diverse Tissues from Different Species and scRNA-Seq Platforms Several examples of CytoTRACE applied to diverse tissues from different species and scRNA-seq platforms are provided in FIGS. 39A to 39I. For each figure, the developmental system and the scRNA-seq platform are labeled in the top. Each graph contains: (left) Legend indicating either a timescale or phenotypes ordered from least to most differentiated from top to bottom, (center) low-dimensional embedding highlighting the timescale or phenotypes shown on the left, (right) low-dimensional embedding highlighting the predicted differentiated states (least to most=red to blue) by CytoTRACE.

Methods Supporting Exemplary Embodiments

Human Subjects
Human breast specimens were collected after obtaining informed written consent from patients under protocols approved by the Stanford University and City of Hope Institutional Review Boards (IRB #4344). Breast tumor and paired normal tissue were collected from the primary site during breast cancer surgery at Stanford Hospital and City of Hope National Medical Center. Samples were collected from 5 patients with luminal-like breast cancer and 2 with basal-like breast cancer. Tumor specimens were obtained from all 7 patients and paired normal were obtained from 6 out of the 7. All samples were analyzed by flow cytometry and human breast luminal progenitors and mature luminal cells were sorted for scRNA-seq. For two patients, COH69 and SU58, the tumor cells were lineage-depleted and transplanted into NSG mice to form xenografts.

Assembly of Gold-Standard Datasets

Gold-standard datasets were selected based on two general criteria: (1) availability of a complete scRNA-seq gene expression table with minimal gene filtering and (2) availability of annotations of the known differentiation status of each single cell. The training cohort (n=9) was curated to include datasets popularly used in published stemness prediction tools and representative datasets of multi-branching hematopoiesis and neuronal differentiation. The validation cohort (n=33) was curated to include a wide diversity of datasets representative of different developmental and differentiation processes. Datasets were selected from a recent benchmarking study of lineage trajectory inference tools and from the public domain using the following criteria:

Datasets described a developmental or differentiation process, not including cell maturation, metabolic shifts, or response to stimuli.

Datasets provided experimentally confirmed ground truth labels and differentiation status.

Datasets described a unique differentiation or developmental processes with the exception of datasets from different species or platforms.

Datasets with batches, or technical groups that did not include cells from every phenotype described were excluded.

Datasets describing in vitro differentiation of a heterogeneous population with time point labels as the only ground truth for differentiation status were excluded.

Unless otherwise indicated, all datasets were pre-processed by the following procedures. Gene expression tables, as provided by the authors, were normalized for sequencing depth by rescaling the total number of reads per single cell to a million and then $\log_2$-normalizing with a pseudo-count of 1 ($\log_2+1$). Cells with fewer than 10 detectable genes or no detectable genes among the top 1000 most dispersed genes (calculation described in 'Overview of CytoTRACE') were removed. In datasets with batches, or technical groups containing more than one cell from each phenotype described, batch correction was applied using ComBat in the R sva package (for more on ComBat, see W. E. Johnson, C. Li & A. Rabinovic, (2007), cited supra).

Exceptions to the pre-processing pipeline above are rationalized below:

Aging HSCs: Long-term hematopoietic stem cells (LT-HSCs), short-term hematopoietic stem cells (ST-HSCs), and multipotent progenitors (MPPs) from old and young were combined into one table to include all single cells from the study without introducing redundancy in the validation cohort.

Dentate Gyrus, Peripheral Blood, Neural Stem Cell, Planaria, Thymus, and Zebrafish: Due to runtime and memory limits of several lineage trajectory inference methods, these datasets were downsampled to 6,000 single cells for input into all measures and methods, except STREAM, for which these datasets were downsampled to 2,000 single cells.

Human Embryo: Two cells from the morula stage, 'Morula #1-Cell #3', 'Morula #1-Cell #8', were excluded as outliers as they clustered with cells from the late blastocyst stage.

Human Skeletal Muscle Myoblasts (HSMM): Interstitial mesenchymal cells were considered contaminants and therefore excluded from the dataset.

Neural Stem Cells: The E15.5 neural stem cells were acquired from a different technical batch and therefore excluded from the dataset.

Thymus: Only hematopoietic cells, selected based on Ptprc expression greater than 0 RPM, were considered in this dataset.

Skeletal Stem Cells: Skeletal cells from diabetic mice were excluded and only the wildtype skeletal populations were considered in this dataset.

In Silico Screen for Measures Associated with Differentiation

The in silico screen for measures of differentiation was performed with 17,810 gene sets from the Broad Institute's Molecular Signatures Database v6.2 (MSigDB), encompassing all 8 major collections (hallmark, positional, curated, motif, computational, GO, oncogenic, and immunogenic gene sets), 3 stemness prediction tools, StemID, SCENT, and SLICE, and gene counts, or the total number of detectable genes. Gene set measures were calculated by taking the geometric mean of all genes in a set for each single cell. Each stemness prediction tool was applied to the datasets using default settings recommended by the authors. For SCENT, the default protein-protein network provided by the authors was used to calculate entropy. For SLICE, all scRNA-seq datasets derived from human and macaque were analyzed with the human gene-gene Kappa similarity matrix, while datasets derived from mouse and zebrafish were analyzed with the mouse gene-gene Kappa similarity matrix. Gene counts was calculated as the total number of genes per single cell using the default raw counts or normalized tables publicly available from each study.

To numerically represent differentiation status, each single cell was assigned a rank based on its ground truth phenotype label and expected position in the spectrum of differentiation, where the minimum rank is the least differentiated cell and the maximum rank is the most differentiated cell. As previously done to benchmark the stemness prediction tools, each measure in the screen was then mean aggregated by rank in each dataset. To quantify the association of each measure with differentiation status, the mean values were correlated with the predicted phenotype order, or rank, by Spearman's rank correlation. The phenotype correlations were averaged across all datasets in the training cohort for each of the 17,814 features and ranked from most associated with stemness ("1"; most positively correlated with differentiation status) to most associated with differentiation ("17,814"; most negatively correlated with differentiation status).

Overview of CytoTRACE

Although gene counts reliably predicts the ordering of cells by known differentiation status when mean aggregated by phenotype, it is a noisy measure for predicting the ordering of single cells. The noisiness in gene counts may be due to mRNA capture inefficiency upon lysis, PCR amplification biases, differences in sequencing depth, or other technical confounders during scRNA-seq. Computational methods (e.g., CytoTRACE) was developed that denoises gene counts by leveraging covariant gene expression and applying a smoothing procedure across transcriptionally similar cells.

Cytotrace: Gene Counts Signature

As single-cell RNA-sequencing was designed to capture gene expression, not gene counts, it was reasoned that genes whose expression patterns correlate with gene counts might better predict the ordering of single cells by differentiation status. Indeed, a gene counts signature (GCS), defined as the geometric mean of genes that are most correlated with gene counts, outperformed all evaluated features in the training cohort. Although GCS was robust across a broad range of gene set sizes in the training cohort (n=5 to 1,000 genes), the top 200 genes maximized performance, albeit only slightly. The top 200 genes throughout these examples are used as input to CytoTRACE.

Furthermore, the most positively correlated genes were particularly selected for ordering rather than the most negatively correlated genes for several reasons. Differentiation trajectories are intrinsically divergent processes, in which often a single phenotype branches into multiple, diverse phenotypes. Through the course of differentiation, the most positively correlated genes capture the loss of stemness, while the most negatively correlated genes capture gain of differentiation phenotypes. Although for linear trajectories, both the most positively correlated and most negatively correlated genes can accurately recapitulate differentiation status, in more complex trajectories, the most negatively correlated genes are confounded by the mixtures of differentiated cell phenotypes associated with low gene counts. Therefore, the most positively correlated genes are robust to the hierarchical shape of the differentiation trajectories.

GCS is broadly defined as the geometric mean of genes that are most correlated with gene counts in each dataset. As a gene expression surrogate for gene counts, it was found that GCS captures differentiation states more robustly than gene counts alone. Furthermore, since it is defined for every dataset independently, the biological basis of GCS is not necessarily shared across diverse developmental systems. In fact, in a comparison of the functional themes that are enriched by GCS in each study, no single gene set or theme was consistently enriched across datasets (table S5). We did however observe general trends in some datasets toward higher levels of chromatin regulation and cellular metabolism in cells with higher GCS values. We also found that GCS is not simply a readout of multi-lineage priming. These results suggest that future investigations of the association between gene counts and differentiation are likely to uncover new mechanisms of stem cell regulation and lineage commitment.

Cytotrace Data Preparation

Several pre-processing steps were taken to prepare the data for downstream analysis. First, the gene expression table was normalized for sequencing depth by rescaling the total number of reads per single cell to a million. Cells with fewer than 10 detectable genes or no detectable genes among the top 1000 most dispersed genes (calculation described below) were removed. In datasets with batches, or technical groups containing more than one cell from each phenotype described, batch correction was applied using ComBat in the R sva package.

Previous studies have demonstrated that transcript counts, or the relative abundance of RNA transcripts prior to lysis, more accurately represent gene expression data compared to read counts and improve the detection of differentially expressed genes (see X. Qiu, et al., *Nat Methods* 14, 309-315 (2017), cited supra; and D. Grun, L. Kester & A. van Oudenaarden, *Nat Methods* 11, 637-640 (2014), the disclosure of which is herein incorporated by reference). Transcript counts can be achieved by using unique molecular identifiers (UMI) or exogenous RNA standards (e.g., ERCC), but not all platforms use UMIs, e.g., plate-based methods such as Smart-seq2, and spike-ins are not always added to samples. Census is an algorithm that uses the rate of mRNA capture in full-length scRNA-seq methods to computationally infer transcript counts from read counts without UMIs or 'spike-in' standards. In this study, it was found that there is a near identical relationship between gene counts per single cell and the transcript counts per single cell inferred by Census. Given the ease of calculating gene counts and the advantages of Census transformation, each single-cell transcriptome was rescaled to $G_j$, the total number of detectable genes cell j, as follows:

$$X_{ij}^* = G_j \cdot \frac{X_{ij}}{\sum_{q=1}^{n} X_{qj}}, \forall i \in \{1, \ldots, n\}, \forall j \in \{1, \ldots, k\}$$

where X is an n×k matrix with n genes and k single-cell transcriptomes in non-log linear space, and $X_{ij}$ is the quantity of transcripts or reads assigned to gene i in cell j for TPM and CPM matrices, respectively. The resulting gene expression matrix X* was $\log_2$-normalized with a pseudo-count of 1. It was found that by using X* to derive GCS, as opposed to the original matrix X, one could obtain a larger gain in performance over gene counts alone (P=0.006 vs. 0.04, respectively; paired two-sided t-test). This transformation was applied as a pre-processing step for GCS and CytoTRACE throughout these examples and within various embodiments.

Cytotrace: Smoothing Covariant Gene Expression Across Transcriptionally Similar Cells Although capturing the covariant gene expression by GCS significantly improved the association with single cell differentiation status from gene counts, GCS was still observably noisy with considerable intra-phenotype variance. Assuming transcriptionally similar cells occupy similar differentiation status, a two-step smoothing procedure to improve upon GCS using nearest neighbor graphs.

First, the normalized expression matrix X* was converted into a Markov process capturing local similarity between cells. In brief, X* was filtered to a set of genes expressed in at least 5% of cells. The dispersion index was calculated for each gene by taking the ratio of its variance to its mean across all cells. The top 1,000 most dispersed genes were selected and used to compute a k×k similarity matrix, D, where $D_{ij}$ is the Pearson product-moment correlation coefficient between cells i and j. The similarity matrix was then converted to a Markov matrix, A, by setting (i) all diagonal elements to 0 and (ii) all correlations less than the null similarity coefficient $\partial$ to 0, then normalizing the sum of each row to 1. The null similarity coefficient $\partial$ was estimated by bootstrapping 10,000 random Pearson product-moment correlation coefficients between cells i and j, where i≠j. In practice, the null coefficient computed by bootstrapping was nearly identical to the mean of D after setting diagonal entries to zero. The latter approach was applied to estimate $\partial$ (by default) to improve running time.

Next, a two-step smoothing procedure was applied to iteratively refine the estimate of the GCS vector (denoted by $\overline{GCS}$). First, non-negative least squares regression (NNLS; R package: nnls v1.4) was applied to solve the following optimization problem:

$$\vec{X}^* = \arg\min \vec{X}_{\geq 0} \| A \vec{X} - \overline{GCS} \|_2$$

where $\overrightarrow{GCS_R} = A\vec{x}*$. Because A is often collinear due to the presence of transcriptionally similar cells, the solution to NNLS, denoted by vector $\vec{x}*$, is generally sparse without requiring regularization or parameterization (unlike Lasso, for example). As a result, the use of NNLS allows $\overrightarrow{GCS}$ to be explained as a function of distinct transcriptional neighborhoods in A (denoted by $\overrightarrow{GCS_R}$), resulting in a smoother representation and improved performance over $\overrightarrow{GCS}$. To further refine $\overrightarrow{GCS_R}$, a diffusion process was simulated, which was applied for 10,000 iterations (t=1, ..., 10000) or until convergence (mean($|\vec{d}_{t+1} - \vec{d}_t|$)≤1×10$^{-6}$):

$$\vec{d}_{t+1} = \alpha \cdot A \cdot \vec{d}_t + (1-\alpha) \cdot \vec{d}_0$$

where $\vec{d}_0 = \overrightarrow{GCS_R}$ and α=0.9. Unlike NNLS, which identifies nonnegative coefficients that best explain $\overrightarrow{GCS}$ as a function of A, the diffusion process iteratively adjusts $\overrightarrow{GCS_R}$ based on the probability structure of the Markov process defined in A.

It was reasoned that using two orthogonal approaches for smoothing would leverage different, but synergistic, information from the adjacency matrix to denoise GCS. While NNLS solves a least-squares regression problem by finding the coefficients that best fit GCS to the adjacency matrix, diffusion iteratively adjusts GCS based on local weights in the adjacency matrix. In fact, the combined use of NNLS followed by diffusion It was determined that combining the two approaches yielded better performance than either approach alone. improved the correlation with known differentiation status compared with either alone. Different values of the α parameter in diffusion were also tested, which affects the contribution of diffusion to $GCS_R$ and determined α=0.9 to be most optimal.

After GCS has been smoothed by NNLS and diffusion, the values are ranked, producing CytoTRACE, the predicted order of single cells by their differentiation status. Specifically, the output of diffusion (i.e., vector $\vec{d}_{t+1}$) was converted to rank-space, yielding $\overrightarrow{cytotrace}$, a vector of length k containing the predicted developmental ordering of every cell in X.

Benchmarking

Gene sets, stemness prediction tools, and lineage trajectory inference methods were benchmarked on 44 datasets for their ability to order single cells and phenotypes by the ground truth ordering provided by the authors of each study. Only datasets with cellular differentiation processes and ground truth labels for the expected ordering of single cells were selected. Within these datasets, only phenotypes involved in a known differentiation process described by the authors were included.

Each single cell was assigned a rank based on its ground truth phenotype label and expected position in the spectrum of differentiation, where min{rank} is the least differentiated cell and max{rank} is the most differentiated cell. Phenotype correlation was calculated as the Spearman correlation between the mean of the predicted order per rank and the expected order of phenotypes, or rank. Single cell correlation was calculated as the Spearman correlation between the predicted order by the metric and the expected order of each single cell as provided by the authors, weighted by the total number of cells per rank (R package: weights).

For STREAM, the root was assigned to be the cluster with the highest fraction of the least differentiated cell. For Scorpius, Embeddr, Monocle, and TSCAN, the curves were reoriented to align with the direction of differentiation. Notably, for datasets with multiple lineages (i.e., "Dentate Gyrus," "Bone Marrow 10×," "Bone Marrow Smart-seq," "Mesoderm Differentiation," "Lung Fibroblast"), only the whole dataset was reoriented to align with the direction of differentiation, but individual lineages were not. Therefore, STREAM, Scorpius, Embeddr, Monocle, and TSCAN were penalized if lineage predictions were reversed despite provision of a root or direction of differentiation. Unlike the other tools, Slingshot draws multiple curves per dataset as opposed to a single curve through the low dimensional graph. Therefore, for Slingshot, each curve drawn by the method was evaluated separately and the absolute value of each curve's correlation with ground truth differentiation status was mean aggregated.

Benchmarking RNA Velocity

RNA velocity was run using velocyto.py v0.17.13 (Python) and velocyto.R v0.6 (R package) as per instructions provided online (velocyto.org). For the 'Chromaffin differentiation (Smart-seq2)', 'Dendritic cell differentiation (C1)', and 'Intestine differentiation (Smart-seq2)' datasets (table S1), raw reads were downloaded from the Sequence Read Archive (NCBI) and trimmed for base call quality (PHRED score>20) and adapter sequences using skewer (93) v0.2.2. Trimmed reads were then aligned to the mm10 reference genome (GRCm38.p5, GENCODE vM15) using STAR (94) v2.5.4b, generating sorted bam files. For the 'Bone marrow differentiation (Smart-seq2)' and 'Bone Marrow (10×)' datasets (table S1), sorted bam files and the corresponding GTF file ('mm10-plus') were downloaded from the Chan Zuckerberg Initiative's scRNA-seq repository.

Loom files containing spliced, unspliced, and spanning reads were then generated from the bam files and corresponding GTFs using the velocyto.py v0.17.13 (Python) command line tool. Data processing and cell clustering was performed using the pagoda2 v0.1.0 package in R with the default settings recommended in the online tutorial. For datasets with >1,500 cells, the kNN parameter in the 'gene.relative.velocity.estimates' function was set to 70; small and large neighborhood sizes, n, were set to 100 and 300 when calculating velocity fields with the 'show.velocity.on.embedding.cor' function. For datasets with 51,500 cells, kNN was set to 5; small and large neighborhood sizes were set to 30 and 100, respectively.

To benchmark RNA velocity, a scoring scheme was devised to quantify the accuracy of cell ordering. RNA velocity generates a velocity vector for each single cell that points from a "source" cell to a predicted future cell state, indicated by the head of the arrow. The cell closest to the head of the arrow by Euclidean distance (in the low dimensional embedding) is the "sink", or the cell predicted to be downstream of the source. For all pairs of "source" and "sink" cells where there is also an expected change in known differentiation status, we evaluated the accuracy of RNA velocity to predict the correct ordering. CytoTRACE was also assessed using the same pairs of cells.

Rationale for RNA velocity benchmarking strategy: One potential way to define pseudotime with RNA velocity is to run a principal curve analysis on the low dimensional embedding and then use velocity vectors to orient the direction of the trajectory. While this approach is potentially reasonable for simple developmental trajectories, principal curves are often suboptimal for modeling trajectories with multiple branches. Moreover, velocity vectors can point in multiple opposing directions along a principle curve, complicating attempts to unambiguously orient it (e.g., 10× bone marrow). Therefore an alternative approach was selected that allows the direction of individual velocity vectors to be directly evaluated.

Sub-Sampling Routine to Improve Runtime Performance

The smoothing process implemented in CytoTRACE is suboptimal for very large scRNA-seq datasets. Therefore, a faster approach was devised that applies the CytoTRACE smoothing framework (NNLS and diffusion) to randomly selected subsamples of the original dataset without replacement. Briefly, for datasets with ≥5,000 cells, all cells are first divided into bins of 1,000 cells (by default) for pre-processing steps, merged together to generate the gene counts signature, and then parceled back into the same bins prior to regression- and diffusion-based smoothing. Using this routine, the runtime of CytoTRACE scaled linearly with the number of cells analyzed without impacting performance on large datasets. All runtime tests were performed on a single core of a Linux machine equipped with a CPU Intel Xeon E5-2680 V3 2.50 GHz. Using this hardware configuration, the fast implementation of CytoTRACE is expected to take approximately 22 min and 225 min to analyze 100 k and 1 M cells, respectively.

Stem Inference and Cell Trajectory Methods

All stem inference and cell trajectory methods were applied using default settings recommended by the authors unless otherwise stated. The scripts to run each method are available on Github.

3D Graphs Using a Force-Directed Layout and CytoTRACE

For visualization of mouse bone marrow differentiation and whole zebrafish development, CytoTRACE values were plotted as the third dimension to a 2D force-directed layout of each dataset. Force directed layouts were generated using the ForceAtlas2 graphing algorithm (M. Jacomy, et al., *PLoS One* 9, e98679 (2014), the disclosure of which is herein incorporated by reference), implemented as part of the scanpy package (F. A. Wolf, P. Angerer, & F. J. Theis, *Genome Biol.*, 19, 15 (2018), the disclosure of which is herein incorporated by reference), to visualize scRNA-seq data. Briefly, the data was dimensionally reduced to the top 40 principal components and a manifold was fit to the data using Uniform Manifold Approximation and Projection. This manifold was then used to compute distances between single cells to generate a neighborhood graph. Each single cell was represented by a node and was connected by edges to its 50 nearest neighbors. The ForceAtlas2 algorithm initially placed nodes randomly on a plane and then performed a physics-based simulation. Nodes exerted repulsive forces on each other and edges exerted attractive forces, while a force of gravity ensured the graph remained centered.

Chromatin Accessibility Analysis Using Paired RNA-Seq and ATAC-Seq Data

Reads were aligned to UCSC Genome Browser hg38 with bwa-mem, and filtered for quality (-q 30 -f 0x2) and duplicates (Picard MarkDuplicates). Reads aligned to scaffolds and chrY or chrM were discarded. Reads were shifted (+4/−5) to reflect true Tn5 insertion sites. For each biological replicate (reads from technical replicates were pooled), peaks were called using MACS2 (—call-summits —nomodel —nolambda —shift 100 —extsize 200 -p 0.1). To generate a master atlas of most reproducible peaks, an IDR <0.05 filter was applied to pairwise combinations of biological replicates. Resulting peaks from all replicates and cell types were pooled, and overlapping peaks were merged using bedtools merge. This approach yielded a total of n=202,804 peaks for data from Loh et al., and n=324,434 peaks for data from Corces et al.

For peak shape visualization, peaks were centered to their summit (defined as base with maximum coverage) and adjusted to a width of 1 kb. For each peak, 100 bins of 10 bp width were generated, and per-bin coverage was calculated. Peaks were then re-centered to the bin with maximum coverage, followed by CPM normalization of counts per replicate. CPM values were averaged across biological replicates, log 2 transformed, and sorted by total signal per peak. For plotting, values were capped at 0.15 CPM for Loh et al., and at 0.3 CPM for Corces et al.

2 kb TSS regions were defined around TSSs of all hg38 genes in the HUGO database (+/−1 kb). Reads in TSS regions were counted and normalized to CPM. Genes were filtered for those present in both the HUGO database of genes, and published RNA-Seq data (n=16,522 scRNA-Seq.; n=18,305, bulk RNA-Seq).

For aggregate analysis of scRNA-Seq: the fraction of cells expressing each gene was calculated. Genes were sorted by decreasing fractions and ATAC TSS signal, respectively. Corresponding TSS signals and fractions, respectively, were smoothed by computing median values over a 500-gene sliding window. For plots of individual single cells, a 100-gene sliding window was used.

For bulk RNA-Seq: published expression values were TPM-normalized and average expression was calculated per cell type. Genes were sorted by decreasing average expression and ATAC TSS signal, respectively. Corresponding TSS signals and average expression, respectively, were smoothed by computing median values over a 500-gene sliding window.

Tissue Processing

Primary and xenografted tumors were mechanically dissociated into >1-2 mm$^3$ pieces with a razor blade and then digested at 37° C. with 1500 U collagenase and 500 U hyaluronidase in Advanced DMEM/F12 (Thermo Fisher Scientific), 2 mM Glutamax (Invitrogen), and an antibiotic/antimycotic mix containing 120 µg/ml penicillin, 100 µg/ml streptomycin, and 0.25 µg/ml amphotericin-B (PSA) for 4-6 hrs with hourly pipetting for 5 min. After digestion, cells were treated with ACK lysis buffer to deplete red blood cells and then incubated with 10 U dispase to further dissociate tissue into single cells and 1000 U DNase I to prevent cell clumping. Cells were filtered through a 70 µm nylon mesh and washed with staining buffer containing 2% fetal bovine serum (FBS) and PSA in Hank's Balanced Salt Solution (HBBS).

Flow Cytometry

Single cell suspensions were stained with fluorescent antibodies to prepare for fluorescent-activated flow cytometry. To reduce nonspecific antibody binding, single cells were blocked with 10 µg/mL rat IgG (Sigma-Aldrich) on ice for 10 minutes. Cells were then stained, in the dark, on ice for 30 minutes with combinations of antibodies and concentrations listed in Table 1. Flow cytometry was performed with a 130 µm nozzle on a BD FACSAria II with BD FACSDiva software. For all experiments, side scatter and forward scatter profiles (area and width) were used to eliminate debris and cell doublets. Dead cells were eliminated by excluding 4',6-diamidino-2-phenylindole (DAPI) positive cells (Molecular Probes). For flow cytometry of primary human breast cells, breast epithelial cells were enriched by negative gating of lineage cells expressing CD45, CD31, CD3, CD16, or CD64. Human breast luminal progenitors were then gated as CD49F+/EPCAM+ and human breast mature luminal cells as CD49F−/EPCAM+.

For flow cytometry of xenografted cells, human epithelial cells were enriched by negative gating of cells expressing H-2Kd, the murine MHC Class I molecule. All data analysis was performed using Flowjo v10.

Lentivirus Production

Lentivirus was produced by transfecting 293T cells with Packaging Plasmid Mix (Cellecta) and subcloned pRSI12 shRNA expression plasmids using Lipofectamine 2000 (Thermo Fisher Scientific) as per manufacturer's instructions. Supernatants were collected at 48 hrs and 72 hrs, filtered with a 0.45 μm filter, and precipitated with Lentivirus Precipitation Solution (Alstem LLC) as per manufacturer's instructions. Lentivirus was resuspended in 1/100 of the original volume. Viral titers were determined by flow cytometry analyses of RFP+293T cells infected with serial dilutions of concentrated virus.

Xenograft Tumor Cell Transduction and Engraftment

Dissociated single cells from xenografts were stained with biotin-conjugated anti-H-2Kd antibody and then anti-biotin microbeads (Miltenyl BioTec, Cat #130-090-485) to deplete mouse cells using autoMACS (Miltenyl BioTec). Tumor cells were transduced with pRSI12 (empty vector), shGULP1-1(5'-TGCATACACCTGAAGCTTTAT-3'), and shGULP1-2 (5'-TCCTAAAGTGGAGTTGCAAAT-3'), at a MOI=25 for knockdown experiments. MOI was calculated based on infection in 293T cells using the formula Titre (TU/ml)=(N*P)/(V*D) where N=number of cells, P=Percentage infection (between 10-20%), V=volume of virus, D=Dilution fold. The transduced cells were washed and resuspended in staining media containing 50% matrigel and injected into the fourth abdominal fat pad by subcutaneous injection at the base of the nipple of female NSG mice (20,000 cells/mouse). Mice were monitored every week for tumor growth and measured using calipers to plot tumor volume V=L*W*H. Experiment was terminated when tumors from either control or knockdown reached 1500-2000 mm$^3$ in size.

Cell Viability Assay

Cell viability assay was performed with MDA-MB-231, a human metastatic breast cancer cell line, after transduction with lentivirus containing an empty vector, shGULP1-1, or shGULP1-2 at a seeding density of 5000 cells. Cell viability was measured at Day 0, 2, 4, and 7 by incubating cells with WST-1 Cell Proliferation Reagent (Roche) at 1:10 (v/v) final dilution at 37° C. and 5% CO2 for 1-4 hrs and analyzing absorbance at 450 nm on a SpectraMax M3 Bioanalyzer (Molecular Devices). To correct for the effect of media, background absorbance was measured in a blank well. Thus, the background corrected signal for each sample was $A_{corrected}$=Absorbance$_{experimental}$−Absorbance$_{background}$.

Single Cell Capture and RNA Extraction

Cells were dissociated into a single cell suspension and prepared for flow cytometry as described under "Flow Cytometry" above. Single cells were sorted into 96-well plates of lysis buffer (1 U/μL RNase inhibitor (Clontech, Cat #2313B), 0.1% Triton (Thermo Fisher Scientific, Cat #85111), 2.5 mM dNTP (Invitrogen, Cat #10297-018), and 2.5 μM oligo dT30VN (IDT, special order) in nuclease-free water (Thermo Fisher Scientific, Cat #10977023)), centrifuged at maximum speed for 30 s at 4° C., snap frozen on dry ice, and then stored at −80° C. ERCC (External RNA Controls Consortium) ExFold RNA Spike-In Mixes (Invitrogen, Cat #4456739)) was added at 1:600,000 dilution to each lysis reaction to be processed in parallel to cellular mRNA.

Whole-Transcriptome Amplification, Library Preparation, and Sequencing

Single cell cDNA libraries were constructed using the Smart-seq2 protocol with minor modifications. Briefly, cDNA from single cell RNA was generated by oligo-dT primed reverse transcription with MMLV SMARTScribe reverse transcriptase (Clontech, Cat #639538) and a locked template-switching oligonucleotide (TSO; Exiqon, special order). This was followed by 25 cycles of PCR amplification, which was the optimal number of cycles determined to obtain cDNA concentration of at least 0.05-0.32 ng/μL from each human skeletal lineage cell, using KAPA HiFi hotStart ReadyMix (Kapa Biosystems, Cat #KK2602) and ISPCR primers (IDT; IDT, special order). Amplified cDNA was then purified using 0.6× volume Agencourt AMPure XP beads (BECKMAN COULTER, Cat #A63882) to remove oligos smaller than 500 base pairs (bp). The resulting cDNA concentration and size distribution for each well was determined on a capillary electrophoresis-based fragment analyzer (Advanced Analytical). Based on this analysis, the cDNA concentration was then normalized to a desirable concentration range of 0.05-0.32 ng/μL by diluting the amplified cDNA from each well. The cDNA was tagmented, uniquely barcoded, and PCR enriched using the Nextera XT DNA Library Prep kit (Illumina, Cat #FC-131-1096). Libraries were then pooled and purified to remove fragments smaller than ~400 bp using 0.6× volume Agencourt AMPure XP beads. Pooled libraries were quantified by Bioanalyzer (Agilent), using High Sensitivity DNA analysis kit, and fluorometrically, using Qubit dsDNA HS Assay kits and a Qubit 2.0 Fluorometer (Invitrogen), and the final concentration was adjusted to 2 nM. The pooled libraries were then sequenced on NextSeq 500** (Illumina) to obtain 2×151 bp paired-end reads at a depth of 1-4.5×106 reads/cell.

Analysis of Gene Counts in Non-Cycling and Cycling Cells

The number of unique transcripts expressed by a cell can be influenced by multiple factors, including metabolic activity, secretory function, and cell cycle status. To measure the effect of cell cycle status on the association of gene counts with differentiation, single cells in each dataset were stratified into 'cycling' and 'non-cycling' groups based on their expression of cell cycle genes. Cell cycle genes were selected from the 'GO_CELL_CYCLE' (GO: 0007049) gene set, and expression was calculated as the geometric mean of the gene set for each single cell. To stratify single cells into 'cycling' and 'non-cycling', a two-component Gaussian mixture model was fit to each dataset in the training cohort (mclust v5.3, R package), and defined the threshold as the expression value at which a cell has an equal probability of being classified as 'cycling' and 'non-cycling' (posterior probability=0.5). Bimodality was tested by performing a Chi-square test on the difference of the log likelihoods of a two-component Gaussian mixture model versus a single-component Gaussian mixture model. Datasets with insufficient evidence of bimodality (Chi-square P≥0.05), and datasets with fewer than 10 cells assigned to 'cycling' or 'non-cycling' were excluded from the analysis. For each qualified dataset in the training cohort (n=5, i.e. 'HSPCs (C1)', 'hESC in vitro (C1)', 'HSMM (C1)', 'Lung development (C1)', 'AT2/AT1 lineage (C1)', and 'in vitro NPCs (C1)', table S1), performance was calculated as described above.

Analysis of Gene Counts and Pluripotency Genes During Human Embryonic Development Single cell transcriptomes of 12 experimentally-validated, purified cell phenotypes from two publicly available in vitro plate-based datasets, 'Pre-implant human embryo (Tang et al.)' and 'Mesoderm (C1)' were utilized (table S1). The ground truth order for each phenotype was determined by first binning it into a known potency group and then ordering based on definitions provided by authors of the studies or experimentally validated elsewhere. These phenotypes, from least to most differentiated with ranked developmental stage indicated by Roman numeral in parenthesis, included, (i) zygote (21), (ii) 2-cell (21), (iii) 4-cell (21), (iv) 8-cell (21), (v) morulae (21), (vi) human embryonic stem cell (26), (vii) anterior primitive streak (26), (viii) paraxial mesoderm (26), (ix) somitomere (26), (x) early somite (26), (xi) dermomyotome (26), and (xi) sclerotome (26). The late blastocyst (21) from 'Pre-implant human embryo (Tang et al.)' (table S1) was omitted as it includes heterogenous cell types with different developmental potencies. To fairly compare across different datasets with varying sequencing depths, raw reads were acquired for each dataset from the Sequence Read Archive and aligned to the GENCODE v25 reference transcripts (GRCh38.p7) using Salmon (80) v0.7.2 with flags -I IU for paired-end reads, -I U for single-end reads, and —seq-bias for both. All single-cell transcriptomes were down-sampled to 1 million mapped reads prior to analysis. The number of genes per cell (gene counts) and ssGSEA (73) of pluripotency genes (14) were calculated as described above (see 'In silico screen for features associated with differentiation').

Analysis of Gene Counts Across Mouse Cellular Ontogeny

Analysis of mouse cellular ontogeny was restricted to plate-based scRNA-seq experiments capturing in vivo developmental processes in mice. These criteria were selected owing to the superior capture rates of plate-seq technologies and the availability of mouse datasets covering in vivo processes with well-defined phenotypes across all potency levels. In vivo processes were prioritized to avoid alterations in gene expression induced by in vitro systems. The ground truth order for each phenotype was determined by first binning it into a known potency group and then ordering based on definitions provided by authors of the studies or experimentally validated elsewhere. These phenotypes, from least to most differentiated with ranked developmental stage. To fairly compare across different datasets with varying sequencing depths, raw reads were acquired for each dataset from the Sequence Read Archive and aligned to the GENCODE vM15 reference transcripts (GRCm38.p5) using Salmon (80) v0.7.2 with flags -I IU for paired-end reads, -I U for single-end reads, and —seq-bias for both. For all cells with greater than 1 million mapped reads (n=3,875), single cell transcriptomes were down-sampled to 1 million reads and gene counts were recalculated as described below 'Dependency of gene counts on the number of reads per cell.' For cells with fewer than 1 million mapped reads (n=1,184), a linear regression model was learned from the relationship between gene counts and the log number of reads at down-samples of 10%, 20%, 30%, 40%, 50%, 60%, 70%, 80%, and 90% and used to predict the expected gene counts at 1 million reads (mean $R^2$=0.997±0.002).

Analysis of Gene Counts During *C. elegans* Embryogenesis

For the analysis of *C. elegans* embryogenesis, a recently published lineage-resolved molecular atlas of *C. elegans* embryogenesis (J. S. Packer et al., Science, eaax1971 (2019), the disclosure of which is herein incorporated by reference) was utilized and the number of detectably expressed genes per cell (TPM>0) was determined for all anatomical cell types with annotated single-cell transcriptomes (Table S6 in Packer et al.). Weighted Spearman was applied correlation to assess concordance between single-cell gene counts and developmental time points across all unique experimentally-determined lineages with available scRNA-seq data (n=456 lineages encompassing 46,054 single cell transcriptomes). Lineages were defined as all simple paths with at least three annotated cell types between the root ("P0") and annotated leaves (terminal cells with available scRNA-seq data) of the directed *C. elegans* lineage tree using the all_simple_paths function from igraph v1.2.4.1 in R (input data: lineage_tree_tbl.rds in the VisCello R package).

The radial treemap plot was produced using ggraph v1.0.2 (R package). Across 1,015 distinct cell types spanning 456 unique lineage paths, a consistent decrease in transcriptional diversity during *C. elegans* embryogenesis was observed, with a median weighted rho of 0.77 when assessed at the single-cell level (per our scoring scheme defined in 'Performance assessment and benchmarking' above)), and a median rho of 1 when averaged by phenotype. Moreover, this result significantly improved when GCS was applied to each lineage at the single-cell level (median weighted rho=0.91, P<2e-16, two-sided paired Wilcoxon), further validating the association between GCS/gene counts and developmental potential.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method to infer a differentiation status and identify a differentiation-status biomarker from single-cell RNA sequencing of a tissue comprising a mixed population of cells in which the biomarker is prognostic of disease outcome, comprising:
   obtaining single cell RNA transcriptome sequencing results of tissues comprising a mixed population of cells, wherein the sequencing was performed on each single cell individually and each cell's sequencing result includes the cell's gene expression;
   generating a matrix of cell×cell's gene expression for the population of cells from the sequencing results;
   determining a gene count signature for the population of cells, wherein the gene count signature is a surrogate for whole transcriptome gene counts and defined as a geometric mean of the expression level of each gene of a set of five or more genes that are most correlated with gene counts within the population of cells;
   computing a gene count signature metric for each cell;
   determining the differentiation status of each cell of the population of cells relative to each other based on ranking each cell's smoothed gene count signature metric, wherein cells having a smoothed gene count signature metric indicative of lower gene counts are more differentiated than cells having a smoothed gene count signature metric indicative of higher gene counts;
   wherein each cell's smoothed gene count signature metric comprises denoising the gene count signature metric by:
      identifying transcriptionally similar cells within the population of cells utilizing a neighboring technique and the matrix of cell×cell's gene expression; and
      smoothing the gene count signature metric by:
         applying a regression technique to determine coefficients that best fit the gene count signature to the neighboring technique; and simulating a diffusion process to iteratively adjust the gene count signature for a number of iterations or until convergence;

identifying a differentiation-status biomarker that is expressed in a subset of cells of the population of cells, wherein each cell of the subset of cells is determined to have the same differentiation status by their smoothed gene count signature metric rank, wherein the differentiation-status biomarker is uniquely expressed within the subset of cells as compared to the whole population of cells establishing that the differentiation-status biomarker is a gene product indicative of the differentiation status of the subset of cells, wherein the subset of cells has a putative effect on disease prognosis based on its differentiation status;

determining the biomarker is prognostic of disease by modulating gene expression of the biomarker in an experimental model that is representative of the disease;

performing a prognostic assay on a patient tissue sample comprising a mixture of cells having varying degrees of differentiation, wherein the prognostic assay comprises one of the following:

detecting RNA expression of the biomarker within the patient tissue sample by nucleic acid hybridization; or detecting protein expression of the biomarker within the patient tissue sample by immunodetection.

2. The method of claim 1 further comprising:
obtaining the tissues comprising a mixed population of cells;
separating the tissues into individual cells;
extracting RNA from each individual cell; and
sequencing each individual cell's RNA to yield a single cell sequencing result for each individual cell, wherein each single cell sequencing result includes each cell's gene expression profile.

3. The method of claim 1, wherein the tissues are derived from one or more tissue biopsies, wherein the tissue is selected from: blood, brain, lymph node, thymus, bone marrow, spleen, skeletal muscle, heart, colon, stomach, small intestine, kidney, liver, skin, and lung.

4. The method of claim 1, wherein the tissues comprise a neoplasm.

5. The method of claim 1, wherein each cell's gene expression is normalized for sequencing depth by rescaling a total number of reads per single cell.

6. The method of claim 1, wherein cells having a total number of detectable genes below a certain threshold are removed from further analysis.

7. The method of claim 1, wherein the number of genes in the set of genes is between 5 and 1000.

8. The method of claim 1, wherein the genes in the set of genes consist of between 5 and 200 genes, wherein the set of genes are the top genes that are most correlated with gene counts, as determined using the obtained single cell sequencing results.

9. The method of claim 8, wherein expression of each gene of the set of genes is positively correlated with total gene count.

10. The method of claim 1, wherein the neighboring technique is one of: an adjacency matrix, similarity matrix, or a Markov process.

11. The method of claim 1 further comprising:
ordering the cells based on their differentiation status.

12. The method of claim 1 further comprising:
identifying at least one cell of the population of cells to be one of: a tumor initiating cell, a stem cell, a progenitor cell, or a differentiated cell based on the differentiation status.

13. The method of claim 1 further comprising:
performing an immunodetection technique on a second mixed population of cells to label a subset of cells that expresses the differentiation-status biomarker; and
performing flow cytometry to isolate the labeled subset of cells from the second mixed population.

14. The method of claim 1,
wherein modulating gene expression of the biomarker in an experimental model comprises
the use of one of: a short-hairpin RNA, CRISPR, antigen binding protein, a small molecule antagonist, and a small molecule agonist.

15. The method of claim 1, wherein the disease is cancer, the subset of cells determined to have the same differentiation status is one or more of: progenitor cells, tumor initiating cells, cancer stem cells, or quiescent cells.

16. The method of claim 15 further comprising:
treating the patient with a therapy based on the prognostic indication of the disease provided by detection of RNA expression of the biomarker or protein expression of the biomarker.

17. The method of claim 16, wherein the subset of cells determined to have the same differentiation status comprises a quiescent cancer stem cell; wherein the method further comprises:
administering a chemoquiescence agent and a chemotherapeutic agent to the patient.

18. A method to identify quiescent stem cells within a plurality of cells and identify biomarkers of the quiescent stem cells within a cancer, comprising:
obtaining single cell RNA transcriptome sequencing results of tissues comprising a mixed population of cells, wherein the sequencing was performed on each single cell individually and each cell's sequencing result includes the cell's gene expression, wherein the tissues comprise a cancer tissue;
generating a matrix of cell×cell's gene expression for the population of cells from the sequencing results;
determining a gene count signature for the population of cells, wherein the gene count signature is a surrogate for whole transcriptome gene counts and defined as a geometric mean of the expression level of each gene of a set of five or more genes that are most correlated with gene counts within the population of cells;
computing a gene count signature metric for each cell;
identifying stem cells by determining a differentiation status of each cell of the population of cells relative to each other by;
determining the differentiation status of each cell of the population of cells relative to each other based on ranking each cell's smoothed gene count signature metric, wherein cells having a smoothed gene count signature metric indicative of lower gene counts are more differentiated than cells having a smoothed gene count signature metric indicative of higher gene counts, wherein the stem cells are a subset of cells identified within the population having a shared differentiation status;

wherein each cell's smoothed gene count signature metric comprises denoising the gene count signature metric by:
  identifying transcriptionally similar cells within the population of cells utilizing a neighboring technique and the matrix of cell×cell's gene expression; and
  smoothing the gene count signature metric by:
    applying a regression technique to determine coefficients that best fit the gene count signature to the neighboring technique; and
    simulating a diffusion process to iteratively adjust the gene count signature for a number of iterations or until convergence;
for each cell of the identified stem cells, determining the cell's total RNA content;
identifying quiescent stem cells within the identified stem cells by determining a quiescent status of each cell of the plurality of stem cells relative to each other;
wherein the quiescent status is based on the total RNA content, wherein cells having lower RNA content are more quiescent than cells having higher RNA content;
identifying a quiescence-status biomarker that is expressed in the quiescent stem cells, wherein the quiescence-status biomarker is uniquely expressed within the quiescent stem cells as compared to the other stem cells establishing that the quiescence-status biomarker is a gene product indicative of quiescent stem cells in cancer;
determining the quiescence-status biomarker is prognostic of quiescent status within cancer stem cells by modulating gene expression of the quiescence-status biomarker in an experimental cancer model comprising quiescent stem cells; and
performing a prognostic assay on a patient tissue sample comprising cancer tissue, wherein the prognostic assay comprises one of the following:
  detecting RNA expression of the biomarker within the patient tissue sample by nucleic acid hybridization; or
  detecting protein expression of the biomarker within the patient tissue sample by immunodetection.

* * * * *